(12) United States Patent
Kim et al.

(10) Patent No.: US 11,672,338 B2
(45) Date of Patent: Jun. 13, 2023

(54) BATHROOM FACILITY COMPRISING MIRROR CABINET DEVICE AND SINK CABINET DEVICE

(71) Applicant: LG ELECTRONICS INC., Seoul (KR)

(72) Inventors: Seongho Kim, Seoul (KR); Jeongyun Kim, Seoul (KR); Jong Seok Kim, Seoul (KR); Daeyun Park, Seoul (KR); Inhyung Yang, Seoul (KR); Ung Je Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 430 days.

(21) Appl. No.: 16/758,956

(22) PCT Filed: Oct. 25, 2018

(86) PCT No.: PCT/KR2018/012767
§ 371 (c)(1),
(2) Date: Apr. 24, 2020

(87) PCT Pub. No.: WO2019/083310
PCT Pub. Date: May 2, 2019

(65) Prior Publication Data
US 2020/0347585 A1 Nov. 5, 2020

(30) Foreign Application Priority Data

Oct. 25, 2017 (KR) .................. 10-2017-0139211
Nov. 7, 2017 (KR) .................. 10-2017-0147301
(Continued)

(51) Int. Cl.
*A47B 67/00* (2006.01)
*H04L 12/28* (2006.01)

(52) U.S. Cl.
CPC ........ *A47B 67/005* (2013.01); *H04L 12/2803* (2013.01); *A47B 2220/0077* (2013.01)

(58) Field of Classification Search
CPC ....... A47B 67/00; A47B 67/005; A47B 67/02; A47B 2067/025; A47B 2220/0077;
(Continued)

(56) References Cited

U.S. PATENT DOCUMENTS 2,449,207 A * 9/1948 Guyon .................. A47B 77/08
34/90
3,732,702 A * 5/1973 Desch ..................... F25B 21/02
312/226
(Continued)

FOREIGN PATENT DOCUMENTS

DE 10305311 A1 * 8/2004 ............ A47B 77/06
JP 2009-5952 A 1/2009
(Continued)

OTHER PUBLICATIONS

Translation JP2009131433A, 9 pages (Year: 2009).*
(Continued)

*Primary Examiner* — Andrew M Roersma
(74) *Attorney, Agent, or Firm* — Birch, Stewart, Kolasch & Birch, LLP

(57) ABSTRACT

A bathroom facility in which bathroom furniture is combined with home appliances for use in bathrooms is disclosed. The bathroom facility according to the present disclosure comprises: a mirror cabinet device attached to the wall of a bathroom; and a sink cabinet device mounted to the floor of the bathroom and including a bathroom sink. The mirror cabinet device includes a cooler and a charging box for charging small home appliances, and the sink cabinet device includes a drawer type towel management unit and a drawer type console.

12 Claims, 39 Drawing Sheets

(30) Foreign Application Priority Data

| | | |
|---|---|---|
| Nov. 13, 2017 | (KR) | 10-2017-0150762 |
| Nov. 15, 2017 | (KR) | 10-2017-0152517 |
| Nov. 15, 2017 | (KR) | 10-2017-0152518 |
| Nov. 16, 2017 | (KR) | 10-2017-0153364 |
| Nov. 20, 2017 | (KR) | 10-2017-0155156 |

(58) Field of Classification Search
CPC ......... A47B 77/04; A47B 77/06; A47B 77/08; H04L 12/2803
See application file for complete search history.

(56) References Cited

U.S. PATENT DOCUMENTS

| | | | | |
|---|---|---|---|---|
| 4,663,621 A | * | 5/1987 | Field | A61B 50/10 600/479 |
| 5,577,819 A | * | 11/1996 | Olsen | A47B 81/00 312/209 |
| 9,675,172 B2 | * | 6/2017 | Pandorf | A47B 67/02 |
| 2008/0278047 A1 | * | 11/2008 | Diemel | F25D 21/14 312/224 |
| 2013/0173811 A1 | | 7/2013 | Ha et al. | |
| 2017/0038058 A1 | * | 2/2017 | Cano | F21V 33/004 |
| 2017/0181541 A1 | * | 6/2017 | Stanley, Jr. | F16B 1/00 |
| 2018/0310711 A1 | * | 11/2018 | Kuhn | A47B 67/02 |
| 2019/0055764 A1 | * | 2/2019 | Zhu | E05D 11/0081 |

FOREIGN PATENT DOCUMENTS

| | | | | |
|---|---|---|---|---|
| JP | 2009-131433 A | | 6/2009 | |
| JP | 2010-011941 A | | 1/2010 | |
| JP | 2014-214594 A | | 11/2014 | |
| KR | 1999-0046113 A | | 6/1999 | |
| KR | 2003-0094161 A | | 12/2003 | |
| KR | 200423138 Y1 | * | 7/2006 | A47B 67/00 |
| KR | 10-2013-0080487 A | | 7/2013 | |
| WO | WO-2016199434 A1 | * | 12/2016 | A47B 67/02 |

OTHER PUBLICATIONS

Translation JP2010011941A, 8 pages (Year: 2010).*
Extended European Search Report, dated Jul. 6, 2021, issued in European Patent Application No. EP 18870672 (9 pages).

* cited by examiner

BATHROOM FACILITY COMPRISING MIRROR CABINET DEVICE AND SINK CABINET DEVICE

TECHNICAL FIELD

The present disclosure relates to a bathroom facility device integrating bathroom furniture with a home appliance, and more particularly, to a bathroom facility device including a sink cabinet device including a bath sink and a mirror cabinet device attached to the wall.

BACKGROUND

Various types of convenience products such as electric toothbrushes, electric shavers, and hair dryers are used in bathroom spaces in which bath sinks, bathtubs, and shower booths are disposed. Examples of bathroom furniture include a mirror cabinet attached to the wall and a sink cabinet including a bath sink.

Bathroom furniture and the facility used in bathrooms have been considered as separate components. Electrical appliances are powered through power outlets disposed on the bathroom walls and are stored in the bathroom furniture.

As various types of home appliances used in bathrooms are provided, bathroom furniture including embedded power outlet is introduced, but multi-taps may only be embedded in and disposed in the furniture.

The present disclosure provides a bathroom facility device integrating various types of facilities used in the bathroom with bathroom furniture.

SUMMARY

Technical Problem

The present disclosure provides a bathroom apparatus that may perform a function as furniture and various types of functions as electronic products by integrating bathroom devices, which are separated into furniture and electronic products.

The present disclosure also provides a wireless control device of a bathroom facility device to automatically perform a wireless communication function by control modules of bathroom appliances of bathroom facility devices even if the bathroom facility devices are disposed or added for the first time.

The present disclosure further provides a wireless control device of a bathroom facility device in which a plurality of home appliances of the bathroom facility device are in association with one another to be integrated-controlled and managed in an organic manner.

The present disclosure further provides a bathroom facility device in which a plurality of home appliances of the bathroom facility device are in association with one another by a voice recognition-based artificial intelligence device to organically integrate, control, and manage them.

The present disclosure further provides a bathroom facility device that may conveniently and safely use electronic products of the bathroom facility devices to improve convenience of using a bathroom.

The present disclosure further provides a power management device that monitors power use of electronic products and outlets of the bathroom facility device in real time, integrates, and manages them in association with one another, thereby preventing a risk of short circuit and overload.

The present disclosure further provides a bathroom control system and a control method capable of sensing an environment inside a bathroom and adjusting the bathroom environment to maintain a comfortable state of the bathroom.

The present disclosure further provides a bathroom control system and a control method through which a user may comfortably use the bathroom by automatically driving facilities when the user uses the bathroom.

The present disclosure further provides a bathroom control system and a phone event display method through which a phone event received at a mobile phone is displayed in the bathroom to execute the phone event in the bathroom by the user.

The present disclosure further provides a bathroom control system and a phone event display method through which the user in the bathroom is notified of reception of the phone event using various types of facilities in the bathroom and to automatically adjust the bathroom environment to be suitable for the execution of the phone event by driving the facilities.

Technical Solution

According to the present disclosure, a bathroom facility device includes a mirror cabinet device including an external mirror and a sink cabinet device including a bath sink. The mirror cabinet device includes a cooler that cools a cooling space in an accommodation space and a charging box that accommodates a power plug, and the sink cabinet device includes a drawer type towel management that heats or dries stored towels, and a drawer type console that accommodates small home appliances.

According to the present disclosure, the bathroom facility device includes the mirror cabinet device and the sink cabinet device connected to each other through wired or wireless communication and operated by an integrated operation switch.

According to the present disclosure, a wireless control device of a bathroom facility device includes a wireless communication control module configured to automatically connect to control modules of the home appliances disposed in each of the mirror cabinet device and the sink cabinet device to control the home appliances. The wireless communication control module is configured to automatically connect to the control modules of home appliances disposed in the mirror cabinet device or the sink cabinet device. The power devices are organically controlled with one another according to a preset program.

According to the present disclosure, a bathroom facility device includes a mirror cabinet device including an external mirror and a sink cabinet device including a bath sink. The wireless control device of the bathroom facility device includes a wireless communication module configured to automatically pair with the control module of the power devices respectively disposed in each of the mirror cabinet device and the sink cabinet device to control each of the power devices.

The wireless communication module includes a first wireless control module configured to automatically pair with the control modules of the power devices disposed in the mirror cabinet device to control the power devices and a second wireless control module configured to automatically pair with the control modules of the power devices disposed in the sink cabinet device to control the power devices. The first wireless control module and the second wireless control module organically control the power devices according to a preset program.

According to the present disclosure, the bathroom facility device includes an artificial intelligence device configured to automatically wireless connect to the home appliances disposed in each of the sink cabinet device and the mirror cabinet device and monitor an operation state of each of the home appliances, and control each of the home appliances based on voice recognition. The artificial intelligence device is configured to automatically connect to the control module of each of the home appliances disposed in the mirror cabinet device or the sink cabinet device through a preset near field communication (NFC) such as Zigbee. The artificial intelligence device also determines the operation of each of the home appliances disposed in the bathroom facility devices and organically controls the home appliances.

According to the present disclosure, the bathroom facility device includes a mirror cabinet device including an exterior mirror and a sink cabinet device including a bath sink. The power management device of the bathroom facility device includes a power management module that monitors the power supply of the power devices disposed in the mirror cabinet device and the sink cabinet device, and an overload state of a power outlet in real time and controls the power supply.

The power management module includes a first power management that controls power on/off of power devices and a first power outlet disposed in a mirror cabinet device and a second power management that controls power on/off of power devices and a second power outlet disposed in the sink cabinet device. The power management module further includes an integrated manager that integrates and manages electrical connection among the power devices controlled by the first power management and the second power management.

The power management module determines whether an outlet cover of the power outlet disposed in the drawer type console of the sink cabinet device is opened, and when the opening state of the outlet cover of the second power outlet is determined, the power management module sequentially cuts off at least one preset power device.

In a bathroom control system according to the present disclosure, after sensing an internal environment of the bathroom by various types of sensing members disposed in the sink cabinet device and/or the mirror cabinet device in the bathroom, if the internal environment is not identical to a set environment, a convenience device disposed in the bathroom is driven to allow the bathroom environment to be the set environment.

A temperature sensor that measures a temperature inside the bathroom, a humidity sensor that measures humidity, and an odor sensor that measures a degree of odor may be used as a sensing member that senses the bathroom environment. The convenience device driven for environment adjust may include a hot air supplier that supplies hot air to a heater, a dehumidifier, a ventilation system disposed in the bathroom and into the bathroom.

In the present disclosure, a display, a speaker, and a microphone are disposed in the bathroom to execute, in the bathroom, the phone event received at the mobile phone by the user. As the phone event may be transmitted only when the user is in the bathroom, the control system of the present disclosure detects that the user is in the bathroom by various types of sensing means disposed in the bathroom and determines whether to transmit the phone event into the bathroom.

The detection that the user is in the bathroom may be performed based on use of the sink faucet of the bathroom, use of a bathtub faucet of the bathroom, use of a shower, detection of a human body by a human body sensing sensor, and detection of illumination of a beauty lamp.

Notifications of reception of phone events to users in the bathroom may be performed through notifications via a speaker or display, adjustment of an amount of water discharged from the sink faucet or the bathtub faucet, or the shower, illumination of a light emitting diode (LED) disposed at one side of the bath sink, or control of brightness of the lamp disposed in the bathroom.

Advantageous Effects

According to the present disclosure, a bathroom apparatus integrates small home appliances used in a bathroom and control devices that control indoor air of the bathroom into a mirror cabinet device or a sink cabinet device, thereby improving user convenience and improving efficiency of space utilization.

According to the present disclosure, the bathroom facility device operates the mirror cabinet device and the sink cabinet device through an integrated operation switch, thereby improving convenience of use.

Further, even if the bathroom facility devices are disposed or added in a space near the bathroom for the first time, control modules of the bathroom appliances of the bathroom facility devices are automatically connected through wireless communication, thereby improving user convenience and user satisfaction.

Further, the plurality of bathroom appliances of the bathroom facility device are in association with one another to be organically controlled or managed, thereby improving electrical safety of home appliances and user satisfaction in convenience.

According to the present disclosure, the power management device of the bathroom facility device is integrated with bathroom furniture and bathroom appliances, thereby improving user convenience and efficiency of space utilization. Further, a power supply of a plurality of power devices disposed in the bathroom facility device and an overload state of the power outlet are monitored in real time and the power supply is automatically controlled, to safely use the power devices to improve reliability.

In the present disclosure, after sensing environment inside the bathroom, the environment, such as a temperature, humidity, a degree of odor, and the like, is automatically adjusted to be in an optimal state as necessary, to use the bathroom in the optimal state by the user.

In addition, in the present disclosure, automatic drying of a user who has finished a shower, automatic drying of towels, automatic illumination of a beauty lamp, and automatic defrosting of the mirror in the bathroom are performed to use the bathroom comfortably by the user.

According to the present disclosure, as the bathroom facility device displays a phone event in the bathroom, users may execute the phone event even if the user may not have the mobile phone in the bathroom, thereby preventing a defect or a failure thereof that may occur when the user holds a mobile phone in the bathroom with a lot of moisture.

In addition, according to the present disclosure, the bathroom facility device automatically determines that the user is in the bathroom and notifies the user using the bathroom for the user to easily determine the reception of the phone event, to thereby accurately transmit the phone event to the user in the bathroom.

DETAILED DESCRIPTION

Configurations shown in embodiments and drawings described herein are merely the most preferred embodiments of the present disclosure and do not represent all of the technical ideas of the present disclosure. It can be understood that various equivalents and variations that may replace them can be made at the time of filing the present disclosure. In addition, terms used herein are defined in consideration of functions in the present disclosure, which may vary according to the intentions or customs of users and operators. Therefore, the definitions of these terms should be made based on the overall description set forth herein.

A bathroom facility device including a sink cabinet device and a mirror cabinet device according to an embodiment of the present disclosure is described below.

Figure 1:
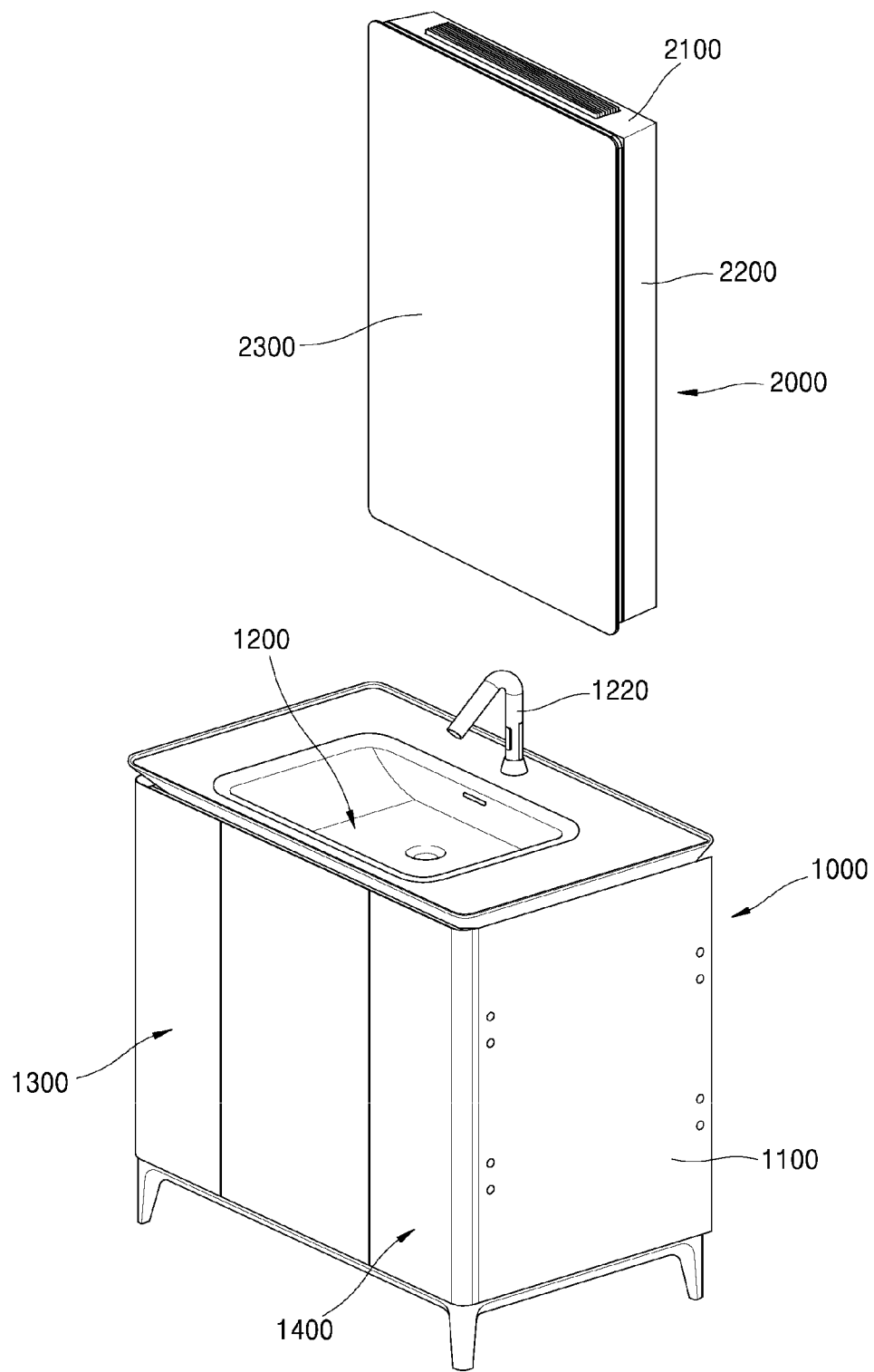
FIG. 1 is a perspective view showing a bathroom facility device including a sink cabinet device and a mirror cabinet device according to an embodiment of the present disclosure.

FIG. 1 is a perspective view showing a bathroom facility device including a sink cabinet device and a mirror cabinet device according to an embodiment of the present disclosure.

As shown, according to an embodiment of the present disclosure, the bathroom facility device includes a mirror cabinet device 2000 attached to the wall and a sink cabinet device 1000 disposed on the floor and including a bath sink 1200.

The mirror cabinet device 2000 includes a mirror cabinet body 2100 that provides structural strength and defines appearance and a mirror door 2300 that opens and closes a front surface thereof.

The mirror cabinet body 2100 may define an accommodation space and may use the accommodation space by opening the door 2300.

In addition, a cooler 2400 (see FIG. 2) that cools contents to a low temperature and a charging box 2500 (see FIG. 2) may be disposed in the mirror cabinet body 2100.

In addition, the mirror cabinet body 2100 may include a mood lamp panel 2200 at a side surface thereof to illuminate an interior space of the bathroom.

The sink cabinet device 1000 includes a sink cabinet body 1100 that provides structural strength and defines appearance, a bath sink 1200 including a faucet 1220, a drawer type towel management 1300 that stores and manages towels, and a drawer type consoler 1400 that accommodates small home appliances such as hair dryers.

Figure 2:
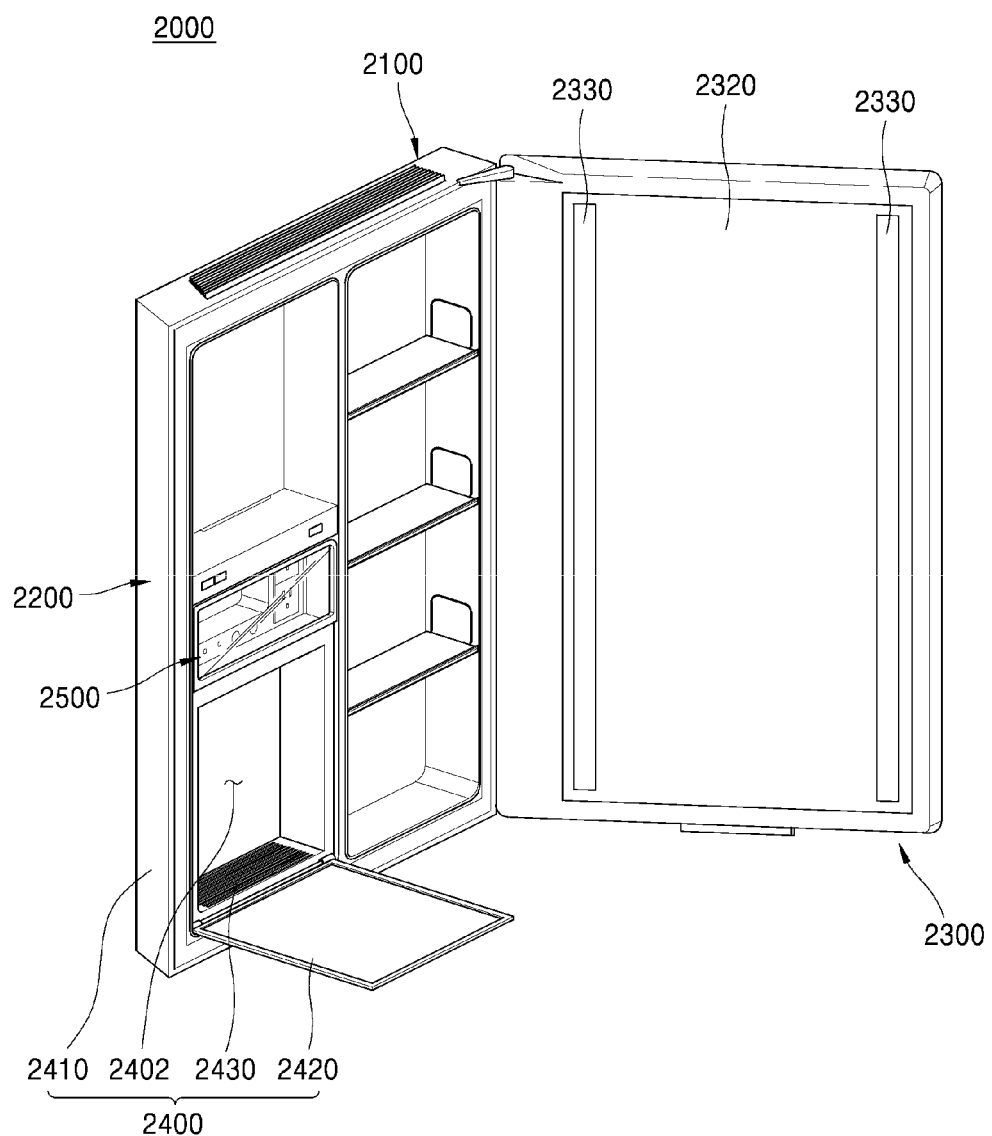
FIG. 2 shows opened mirror door and cooler of a mirror cabinet device of a bathroom facility device according to an embodiment of the present disclosure.
Figure 3:
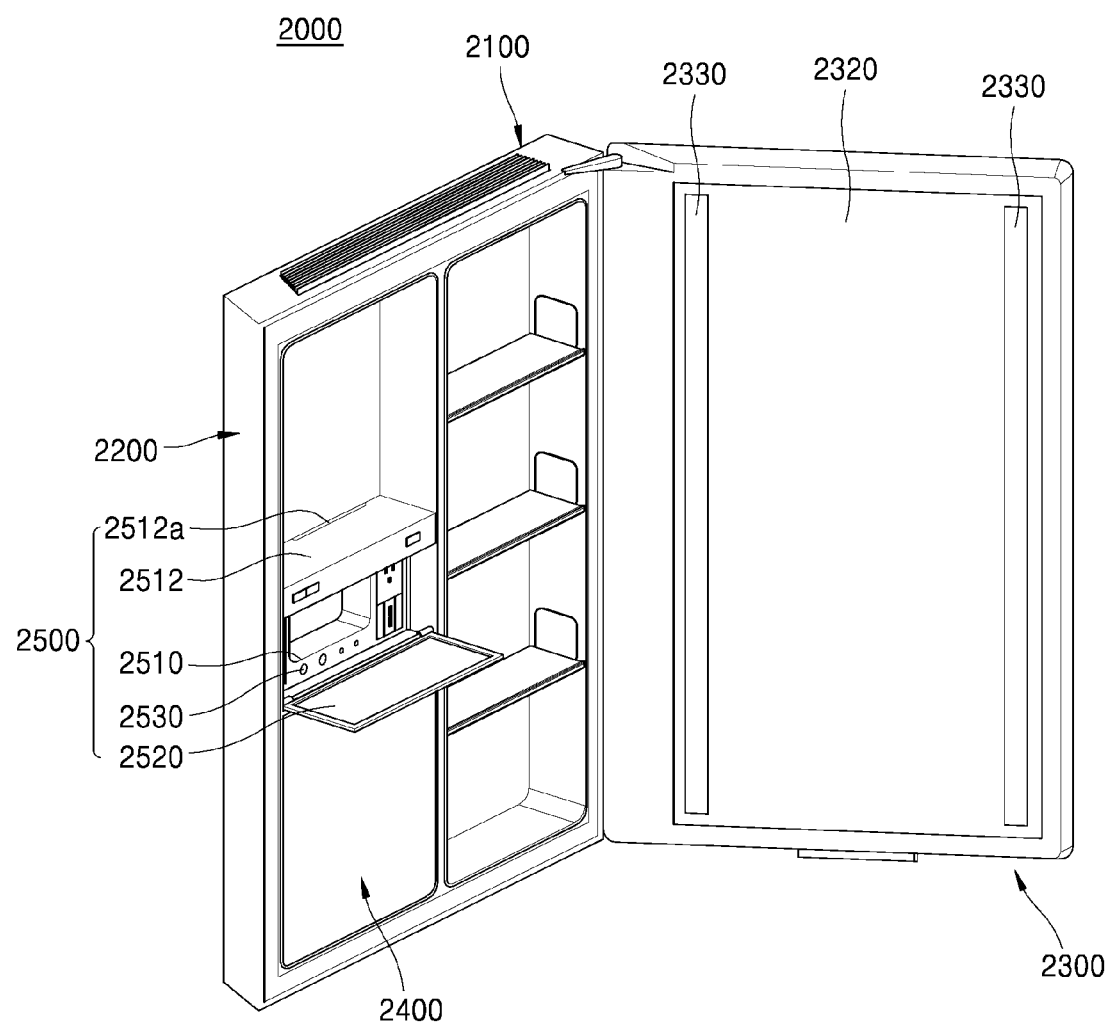
FIG. 3 shows opened mirror door and charging box of a mirror cabinet device of a bathroom facility device according to an embodiment of the present disclosure.

FIG. 2 shows opened mirror door and cooler of a mirror cabinet device of a bathroom facility device according to an embodiment of the present disclosure. FIG. 3 shows opened mirror door and charging box of a mirror cabinet device of a bathroom facility device according to an embodiment of the present disclosure.

As shown, according to an embodiment of the present disclosure, a mirror cabinet device 2000 includes a mirror cabinet body 2100 that defines an accommodation space and a mirror door 2300 connected to one side of the mirror cabinet body 2100.

The mirror cabinet body 2100 may include a mood lamp panel 2200 at both sides. The mood lamp panel 2200 may provide a soft light to the wall of the bathroom space. The mood lamp panel 2200 may perform a welcome lighting function by turning on the lamp when the mood lamp panel 2200 senses user's approach. As shown, the mood lamp panel 2200 may cover a side surface of the mirror cabinet body 2100, thereby providing excellent aesthetic qualities when the mood lamp panel 2200 is turned on and obtaining lamp effects by illuminating an entire side surface.

In this case, a sensor that detects a user's approach may be disposed in the mirror cabinet device 2000 or a sensor disposed in the sink cabinet device 1000 may be used.

The mirror door 2300 includes an external mirror on an outer surface in a closed state. In addition, the mirror door 2300 includes an interior mirror 2320 on an inner surface exposed to the user in an open state. A beauty lamp 2330 may be disposed around the interior mirror 2320.

The mirror door 2300 may further include a defrost sheet (not shown) that heats the exterior mirror or the interior mirror 2320 to remove water drops on the surface of the mirror.

In the shown embodiment, the beauty lamp 2330 may be disposed at both sides of the interior mirror 2320, may be disposed at an upper portion and a lower portion of the interior mirror 2320, and may also be disposed inward the interior mirror 2320.

The beauty lamp 2330 preferably performs a function of a color temperature control. The user uses the interior mirror 2320 to put on make-up. When the user puts on the make-up, the color of the makeup face that the user sees through the mirror may look differently depending on the lamp conditions (e.g., color temperature, brightness, and the like).

The beauty lamp 2330 adjusts the color temperature or the brightness of the lamp, thereby allowing the user to put on the make-up under desired lamp conditions.

The color temperature control of the beauty lamp 2330 may be operated through an integrated operation switch 3000 described below.

The mood lamp panel 2200 disposed at the side of the mirror cabinet body 2100 and the beauty lamp 2330 disposed on the inner surface of the mirror door 2300 preferably use surface-emitting lamp to obtain a uniform lamp effect.

The surface-emitting lamp may include an LED as a light source and a plurality of optical means (e.g., a diffusion sheet, a light guide plate, and the like) that equalize the light emitted from the light source.

A cooler 2400 and a charging box 2500 each may be disposed in the mirror cabinet body 2100.

The cooler 2400 may be used to store cosmetics, beverages, and the like. The cooler 2400 may cool an internal space using a thermoelectric element.

In the shown embodiment, the cooler 2400 is disposed at a left lower portion of the mirror cabinet body 2100 and the position of the cooler 2400 is not limited thereto.

The cooler 2400 includes a cooler body 2410 that defines an accommodation space 2402, a cooler door 2420 that opens and closes the accommodation space 2402, and a cooler 2430 that cools the accommodation space 2402. The cooler 2430 preferably uses a thermoelectric element (e.g., a Peltier element) rather than a refrigerant cycle.

Cooling is performed in a first area (e.g., a cooler) and heating is performed in a second area (e.g., a heating portion) when electricity is applied to the Peltier element. In some cases where the cooler is configured using the Peltier element, cold air of the cooler of the Peltier element may be preferably circulated through the accommodation space 2402 and the heat of the heating portion may be preferably discharged to an outside of the mirror cabinet device.

The heat of the heating portion may be discharged after heating or drying a portion of the inner space of the mirror cabinet device.

The charging box 2500 performs a function for storing small home appliances used in a bathroom, such as electric shavers, electric toothbrushes, epilator, and massage devices and for charging.

The charging box 2500 includes a charging box body 2510 that defines appearance, a plurality of power outlets 2530 disposed in the charging box body 2510, and a charging box door 2520 that defines appearance of the power outlet 2530.

The power outlet 2530 is disposed in a space recessed inside the charging box body 2510 and a charging box door 2520 is preferably closed when a plug of each of small home appliances is connected to the power outlet 2530 in the charging box body 2510.

The charging box door 2520 may be provided to open and close a portion of the power outlet, may be opened to be plugged in or unplugged, and may be closed in other cases.

The charging box door 2520 may include a transparent window made of transparent material or semi-transparent material.

The charging box door 2520 has an effect of improving aesthetics to prevent wires from being exposed to the exterior and blocking permeation of moisture or foreign matters into the power outlet 2530.

A top plate 2512 of the charging box body 2510 functions as a support surface to place the small home appliances. A portion of the top plate 2512 is preferably cut and the cut portion functions as a wire hole 2512a.

When placing the small home appliances on the top surface, a power line may be connected, through the wire hole 512*a*, to the inside of the charging box body 2510 in which the power outlet 2530 is disposed, and thus, the power line is not exposed in appearance.

In the shown embodiment, the charging box 2500 is disposed on the cooler 2400. Both the charging box 2500 and the cooler 2400 are electrical appliances requiring power supply and the charging box 2500 and the cooler 2400 may be disposed to be adjacent to each other, thereby simplifying electrical wires inside the mirror cabinet device 2000.

In addition, the charging box 2500 and the cooler 2400 may be disposed adjacent to each other and the cooler body 2410 and the charging box body 2510 may be integrated.

Although not shown, the charging box 2500 may further include a wireless power supply that performs contactless wireless charging on a wireless charging device. In some cases where the charging box 2500 includes the wireless power supply, the charging may be performed by placing a charging object on the wireless power supply, thereby improving user convenience.

Figure 4:
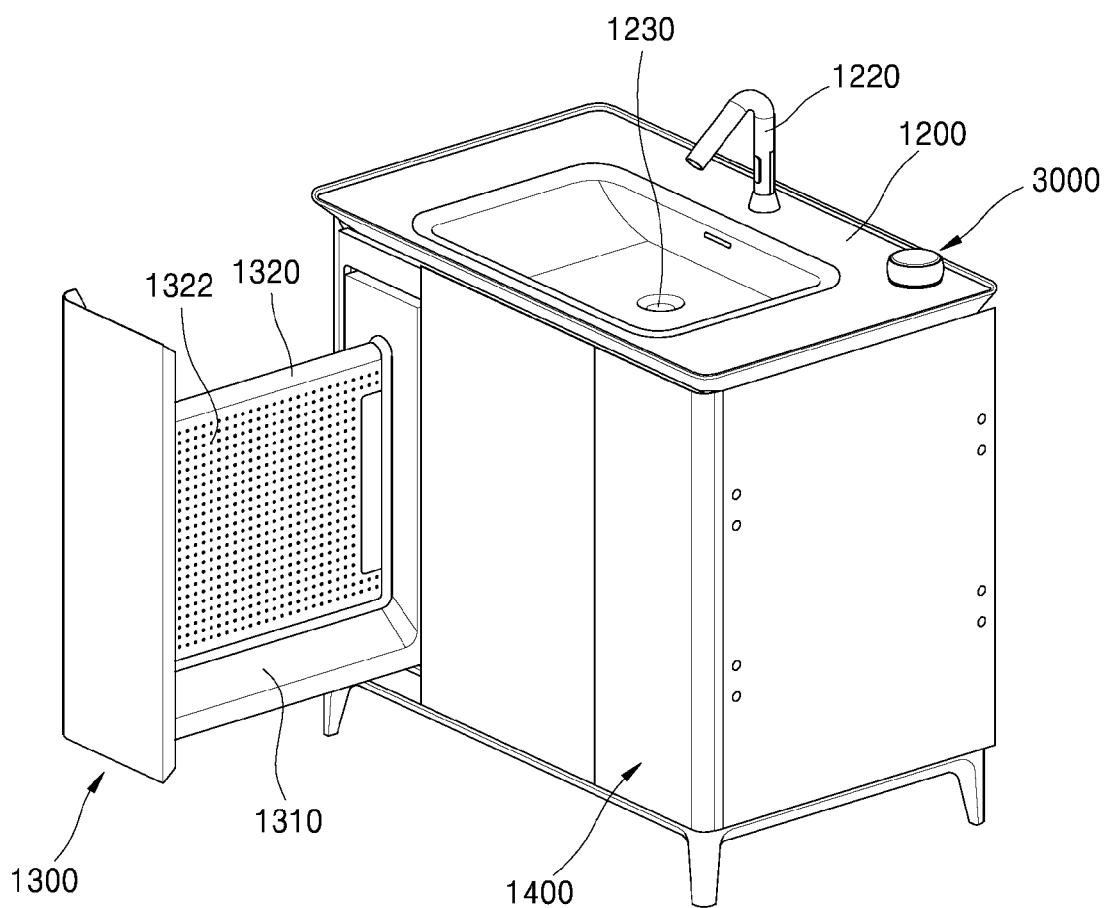
FIG. 4 shows a drawer type towel management pulled out from a sink cabinet device of a bathroom facility device according to an embodiment of the present disclosure.
Figure 5:
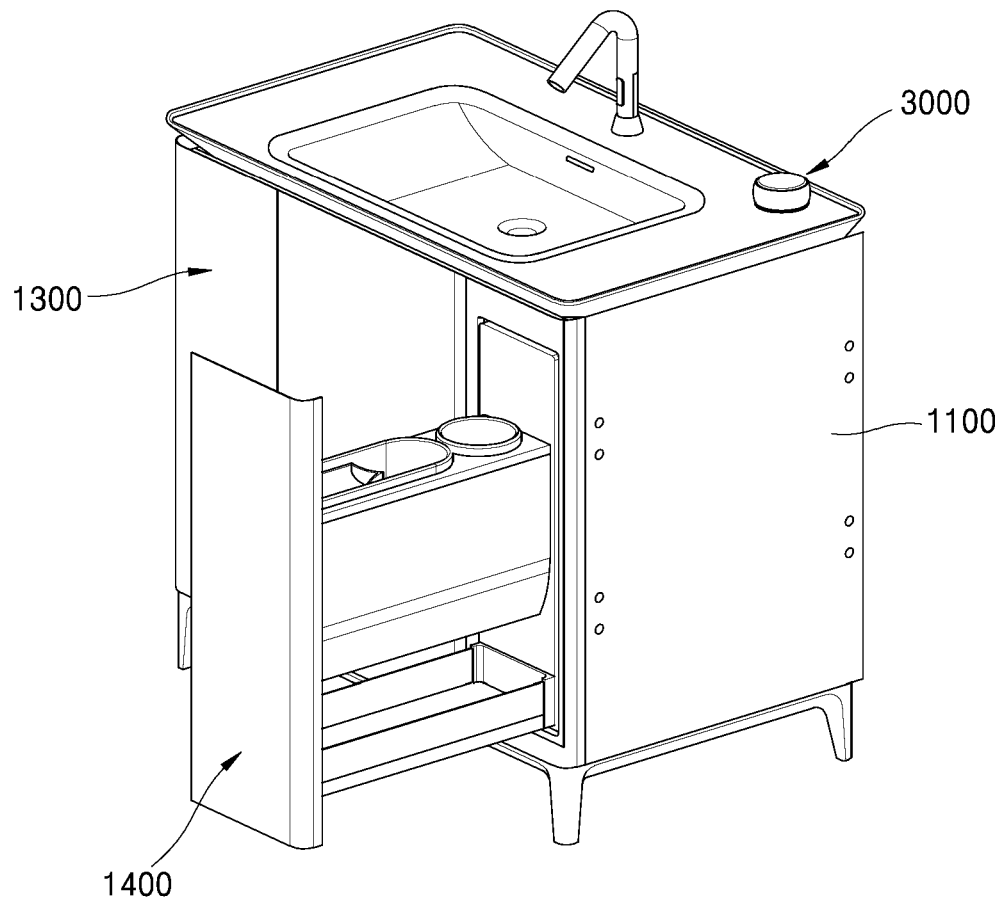
FIG. 5 shows a drawer type console pulled out from a sink cabinet device of a bathroom facility device according to an embodiment of the present disclosure.

FIG. 4 shows a drawer type towel management pulled out from a sink cabinet device of a bathroom facility device according to an embodiment of the present disclosure. FIG. 5 shows a drawer type console pulled out from a sink cabinet device of a bathroom facility device according to an embodiment of the present disclosure.

A sink cabinet device 1000 is disposed on the floor of the bathroom space and is integrated with a bath sink 1200 including a faucet.

The sink cabinet device 1000 includes a sink cabinet body 1100, a bath sink 1200, a drawer type towel management 1300, and a drawer type console 1400.

The bath sink 1200 includes a bath sink body 1210, a faucet 1220, and a pop-up valve 1230 disposed at a bottom of the sink body.

The bath sink body 1210 may be made of a light-transmitting material. In some cases where the bath sink body 1210 is made of the light-transmitting material, the bath sink body 1210 may further include a bath sink lamp at a lower portion (or inside) of the sink body 1210.

The light of the bath sink lamp is guided by the bath sink body 1210 to produce a soft light. The bath sink body 1210 made of the light-transmitting material performs a light guiding function for optically guiding the light and a diffusion function for evenly diffusing a light.

A faucet 1220 of the bath sink 1200 is connected to a water supply pipe and the pop-up valve 1230 is connected to a drain pipe. The water supply pipe to which the faucet 1220 is connected may include a cold water pipe and a hot water pipe.

The faucet 1220 may include an additional handle to adjust an amount and a temperature of water discharged based on operation of the handle.

An electronic valve is disposed to control the faucet 1220 and a temperature and an amount of water supplied through the faucet 1220 may be electronically controlled. The operation may be performed by the integrated operation switch described below or through sensing by an additional sensing sensor.

Meanwhile, in the shown embodiment, the drawer type towel management 1300 is disposed on the left side of the sink cabinet device 1000 and the drawer type console 1400 is disposed on the right side, but the left and right arrangement thereof may be changed.

In some cases where the sink cabinet device 1000 has a long lateral length, a plurality of drawer type towel managements 1300 or drawer type consoles 1400 may be disposed, and a drawer that only defines an accommodation space may be further included.

The drawer type towel management 1300 functions to heat or dry the stored towels. The drawer type towel management 1300 includes a towel management body 1310 connected to the cabinet body 1100 and pulled out in a drawer type, and a heat transfer plate 1320 that functions as a supporter to support towels.

The heat transfer plate 1320 is preferably made of metal having high thermal conductivity. The heat transfer plate 1320 may have an 'inversed U'-shaped cross-section and may have cavities. The heated air is supplied into the heat transfer plate 1320 to heat the heat transfer plate 1320.

In addition, the heat transfer plate 1320 may define a plurality of cavities 1322 on a surface facing the towel. The heating air introduced into the heat transfer plate 1320 through the cavity 1322 may be supplied to the towels.

A heater and a blowing fan may be included to supply heated air into the heat transfer plate 1320. In this case, the heater and the blowing fan may be disposed at a lower portion of the cabinet body.

The heater and the blowing fan may also function to supply heated air to other portions as well as supplying the heated air to the drawer type towel management 1300.

For example, the heater and the blowing fan have a structure capable of changing a flow path of the heated air to supply the heated air below the sink cabinet device 1000 and to dry the bathroom floor or a rug placed on the bathroom floor.

Alternatively, the heater and the blowing fan may function to supply the heated air upward from the lower portion of the sink cabinet device 1000 and to dry the body of the user located in front of the sink cabinet device.

Figure 6:
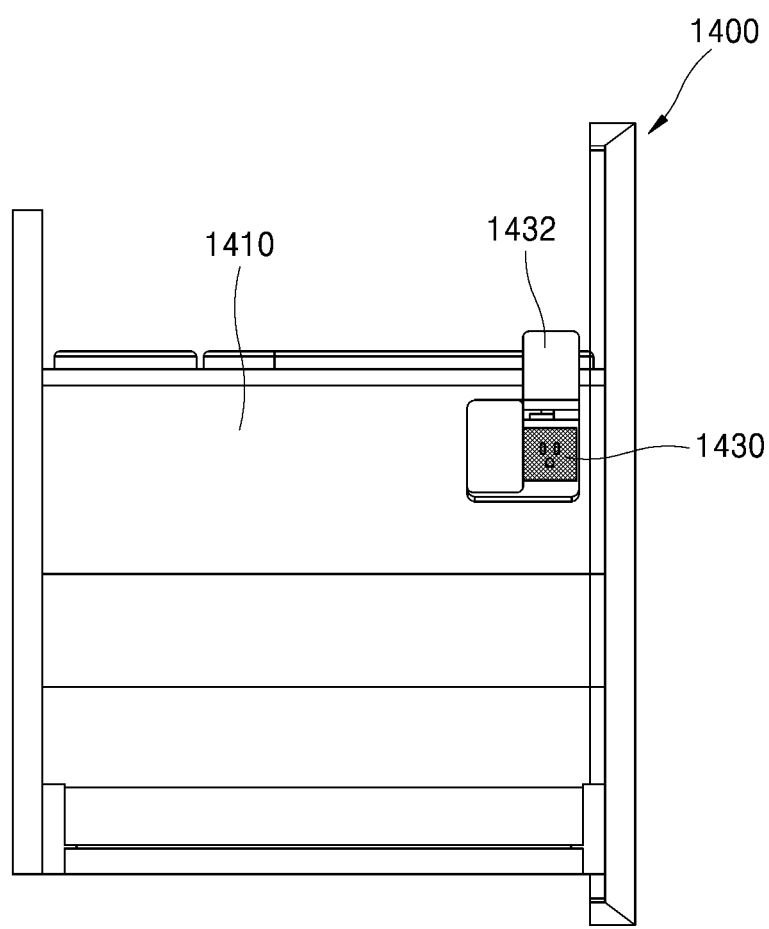
FIG. 6 shows an inner surface of a drawer type console of a sink cabinet device of a bathroom facility device according to an embodiment of the present disclosure.

FIG. 6 shows an inner side surface of a drawer type console of a sink cabinet device of a bathroom facility device according to an embodiment of the present disclosure.

A drawer type console 1400 functions to accommodate and store small home appliances such as hair dryers or curling irons and to supply power to the small home appliances.

The drawer type console 1400 includes a drawer type console body 1410 pulled out from the sink cabinet body 1100, a power outlet 1430 disposed at a side surface of the console body 1410, and an outlet cover 1432 that opens and closes the power outlet 1430. An outlet cover 1432 may be opened to insert a power plug to the power outlet 1430.

In addition, when the plug is plugged into the power outlet 1430, it is preferable that the drawer type console 1400 may not be retracted into the sink cabinet body.

Products such as hair dryers used by pulling out from the drawer type console 1400 are electric heating devices that use a large amount of electric current. The products are accommodated into the drawer type console 1400 when electric heating devices are turned on, thereby causing a concern of failure or fire occurring due to overheating.

The drawer type console 1400 is pulled out to use the small home appliance. After that, in order to retract the drawer type console, the power plug plugged into the drawer type console 1400 may be removed.

The outlet cover 1432 preferably transmits an opening and closing signal to a power management that manages the power of the sink cabinet device 1000. For example, the outlet cover 1432 includes an opening/closing sensing sensor and the outlet cover 1432 preferably transmits information on the opening and closing state to the power management.

As described above, according to the present disclosure, the sink cabinet device 1000 includes a built-in dryer. The dryer built in the sink cabinet device 1000 may also use a large amount of current. If the dryer and the hair dryer are used at the same time, there is a possibility of failure or fire occurring due to use of over-current.

The power management functions to prevent occurrence of the over-current. If the power management detects that the outlet cover 1432 is open, the power management expects that a high-current product will be used and stops operations of other high-current products (e.g., dryers or drawer type towel managements).

According to the present disclosure, the sink cabinet device may further include a sensor that senses approach of the body of the user or positions of the user's hands in the bath sink.

According to the present disclosure, the bathroom facility device may further include an integrated operation switch 3000 that controls and operates the mirror cabinet device and the sink cabinet device.

Figure 7:
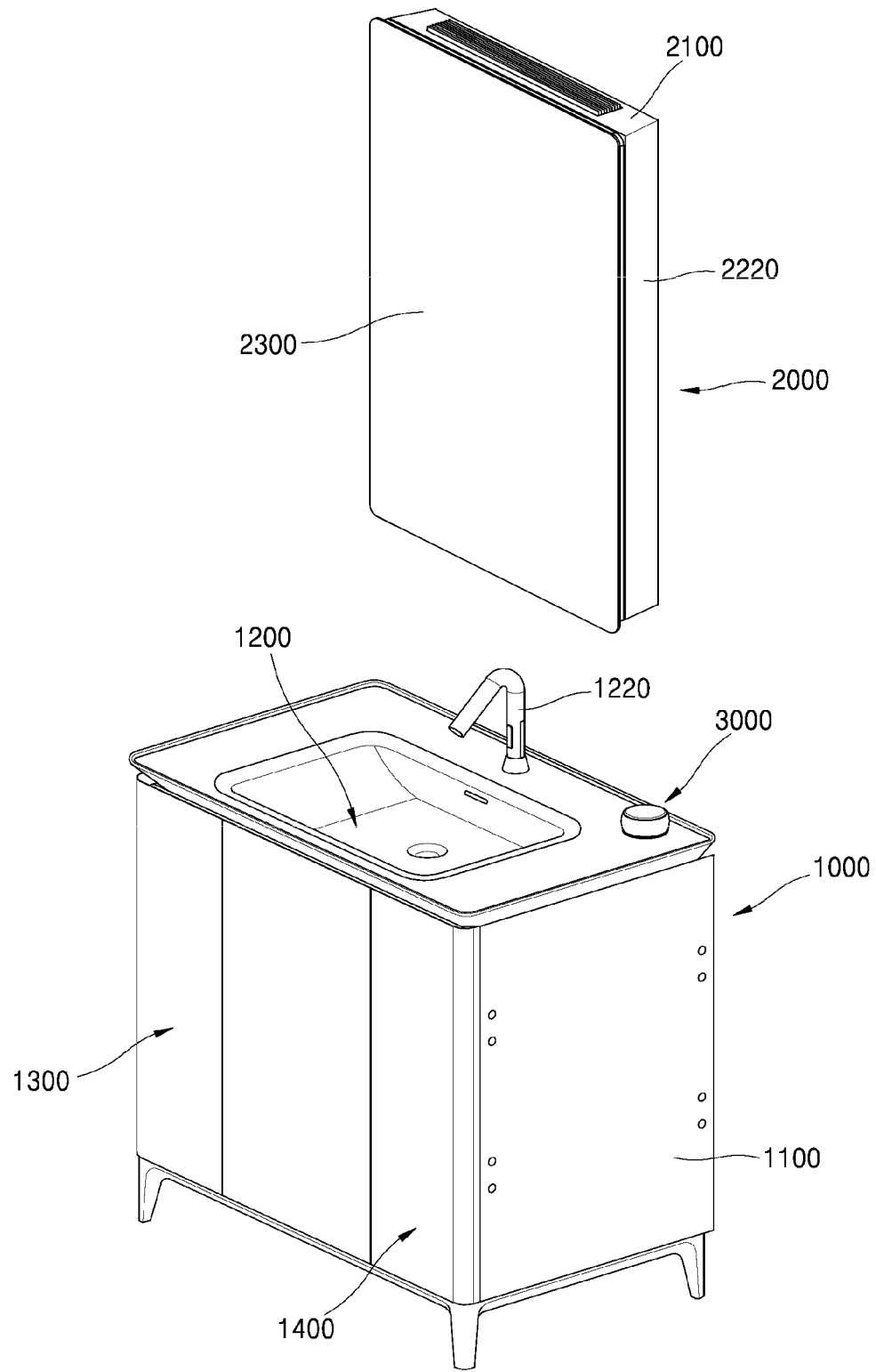
FIG. 7 shows a bathroom facility device in which an integrated operation switch is attached to a sink cabinet device according to an embodiment of the present disclosure.

FIG. 7 shows a bathroom facility device in which an integrated operation switch is attached to a sink cabinet device according to an embodiment of the present disclosure.

An integrated operation switch 3000 may be a jog dial type integrated operation switch including a display. In the shown embodiment, the integrated operation switch 3000 is a jog dial type integrated operation switch having a vertical shaft, and is attached to the sink cabinet device 1000.

The integrated operation switch 3000 may be separated from the sink cabinet device 1000 and disposed independently. For example, the jog dial type integrated operation switch having a horizontal axis may be attached to the wall or the mirror cabinet device.

A manipulating object may be selected through a display and a desired degree may be adjusted by turning a dial.

For example, an amount of water discharged may be adjusted by turning the dial clockwise to adjust the amount of water discharged from the faucet. The temperature may be increased by turning it clockwise to adjust the temperature of the water discharged from the faucet. Adjusting the color temperature of the beauty lamp may be adjusted in a similar manner.

A method of selecting an adjustment object by turning the dial may also be used.

When the dryer is operated using the integrated operation switch, an air volume of the dryer or an operating time (of a timer) of the dryer may be operated or set.

According to the present disclosure, the mirror cabinet device 2000 and the sink cabinet device 1000 may be connected to each other through wired or wireless communication to allow the operations of the sink cabinet device 1000 and the mirror cabinet device to be in association with each other.

For example, the position of the user may be sensed by a sensor disposed in the mirror cabinet device 2000, and when the user approaches the mirror cabinet device 2000, a mood lamp of the mirror cabinet device 2000 may be turned on.

The integrated operation switch 3000 may be used for controlling the faucet of the sink cabinet device and may be used for manipulating the color temperature of the beauty lamp of the mirror cabinet device.

The operation of the mirror cabinet device 2000 and the operation of the sink cabinet device 1000 may be performed through the operation of the integrated operation switch 3000 and a complicated switch for the operation of components may be integrated into one, thereby implementing beautiful appearance and improving user convenience.

The wireless control device of the bathroom facility device includes a wireless communication control module 4000 automatically connected to control modules of home appliances disposed in each of the mirror cabinet device 2000 and the sink cabinet device 1000 and to monitor and control the home appliances.

The wireless communication control module 4000 is automatically connected to the control modules of the home appliances disposed in each of the mirror cabinet device 2000 and the sink cabinet device 1000 in real time to maintain a connection state. Even if the mirror cabinet device 2000 or the sink cabinet device 1000 is added to the bathroom or an adjacent space, the wireless communication control module 4000 is automatically connected to the control module of the home appliances disposed in the added mirror cabinet device 2000 or sink cabinet device 1000.

The wireless communication control module 4000 monitors the operation of each of the home appliances in real time through the control modules of the home appliances disposed in each of the mirror cabinet device 2000 and the sink cabinet device 1000. Home appliances set according to the preset process are controlled to be operated in compatible with each other or the operations thereof are controlled to be stopped. In some cases where a specific home appliance such as lamp disposed in the mirror cabinet device 2000 is used, a control operation may be performed, for example, prevention of the operation of home appliances such as a lamp disposed in the sink cabinet device 1000.

The wireless communication control module 4000 may be disposed in at least one of the mirror cabinet device 2000 or the sink cabinet device 1000. For example, the wireless communication control module 4000 may be disposed in the at least one of the mirror cabinet device 2000 or the sink cabinet device 1000, or may be mounted at a side of an outer surface or on a front surface.

The wireless communication control module 4000 may be disposed in the bathroom wall, may be configured as a mobile device, and may be built in the integrated operation switch 3000. In the present disclosure, an example is described in which the wireless communication control module 4000 is mounted on the front surface of the mirror cabinet device 2000, and the detailed configuration and operation features of the wireless communication control module 4000 are described below in more detail with reference to the accompanying drawings.

Figure 8:
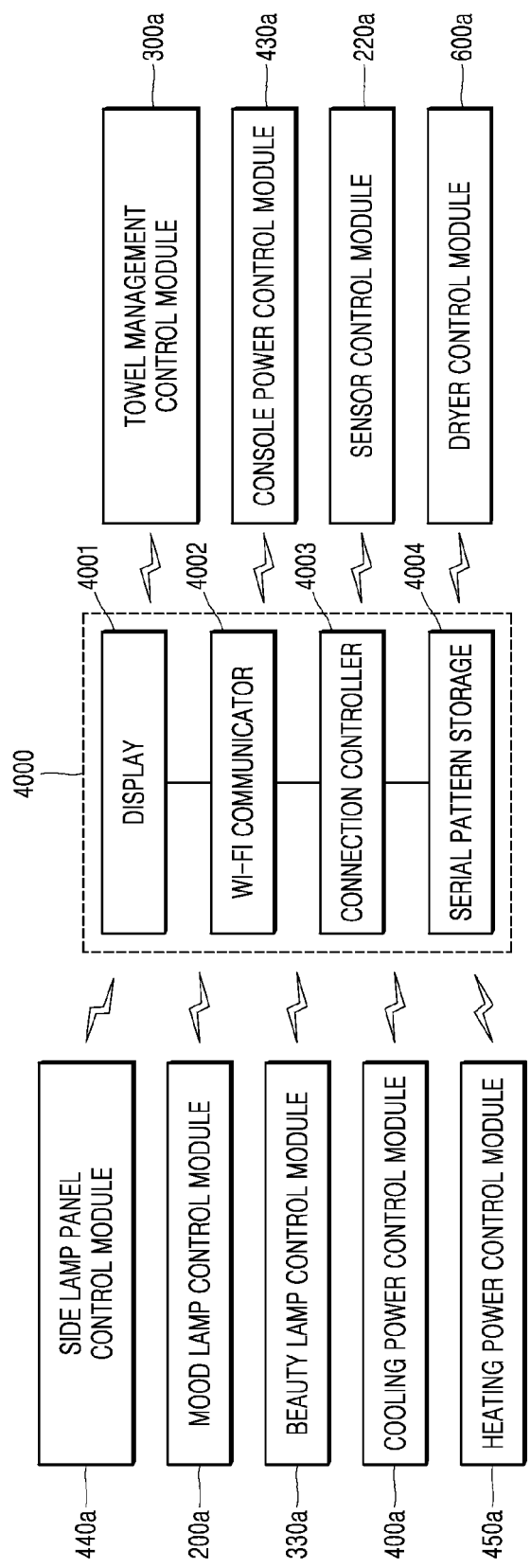
FIG. 8 is a block diagram showing connection between wireless communication control modules and control modules of a bathroom facility device according to the present disclosure in detail.

FIG. 8 is a block diagram showing connection between a wireless communication control module and control modules of a bathroom facility device according to the present disclosure.

As shown in FIG. 8, control modules perform Wi-Fi communication with each of a mood lamp panel 2200, a beauty lamp 2330, a cooler 2400, and a heating sheet (e.g., a defrost sheet) of a mirror cabinet device 2000 and control power on/off operation.

A wireless communication control module 4000 is automatically connected with a side lamp panel control module 440*a*, a mood lamp control module 200*a*, a beauty lamp control module 330*a*, a cooling power control module 400*a*, a heating power control module 450*a* through Wi-Fi communication.

When the power is turned on, each of the side lamp panel control module 440*a*, the mood lamp control module 200*a*, the beauty lamp control module 330*a*, the cooling power control module 400*a*, and the heating power control module 450a transmits unique ID consisting of a preset pattern string based on a Wi-Fi signal. The wireless communication control module 4000 analyzes the unique IDs through the Wi-Fi signals received in real time and is automatically connected to the corresponding control module when the unique ID is identical to the unique ID consisting of the preset pattern string.

The wireless communication control module 4000 may be automatically connected to the control modules of the added mirror cabinet device 2000 even if another mirror cabinet device 2000 is added within a Wi-Fi communication radius.

For example, the side lamp panel control module 440a, the mood lamp control module 200a, the beauty lamp control module 330a, the cooling power control module 400a, and the heating power control module 450a of the added mirror cabinet device 2000 transmits unique ID consisting of the preset pattern string based on Wi-Fi signal when the power is turned on.

In this case, the wireless communication control module 4000 also analyzes the unique IDs through the Wi-Fi signals received in real time, and is automatically connected to the corresponding control module when the unique ID is identical to the unique ID consisting of the preset pattern string.

Similarly, each of the towel management 1300, the drawer type console 1400, the at least one sensor, and the dryer of the sink cabinet device 1000 includes a control module that controls a power on/off operation while performing the Wi-Fi communication. The wireless communication control module 4000 is automatically connected to the towel management control module 300a, the console power control module 430a, the sensor control module 220a, and the dryer control module 600a through the Wi-Fi communication.

When the power is turned on, the towel management control module 300a, the console power control module 430a, the sensor control module 220a, and the dryer control module 600a also transmit the unique ID consisting of the preset pattern string based on the Wi-Fi signal. The wireless communication control module 4000 analyzes the unique IDs through the Wi-Fi signals received in real time and is automatically connected to the corresponding control module when the unique ID is identical to the unique ID consisting of the preset pattern string.

When another sink cabinet device 1000 is added within the Wi-Fi communication radius, the wireless communication control module 4000 is also automatically connected to the control modules of the added sink cabinet device 1000. The control modules of the added sink cabinet device 1000 also transmit a unique ID consisting of a preset pattern string based on the Wi-Fi signal when the power is turned on. The wireless communication control module 4000 also analyzes the unique IDs through the Wi-Fi signals received in real time and is automatically connected to the corresponding control modules when the unique ID is identical to the unique ID consisting of the preset pattern string.

The wireless communication control module 4000 may be in association with a side lamp panel 440, a mood lamp 200, a beauty lamp 2330, a cooling power supply 400, a heating sheet, a towel management 1300, a drawer type console 1400, at least one sensor, and a dryer and may control on/off operations thereof.

To this end, the wireless communication control module 4000 may include a display 4001, a Wi-Fi communicator 4002, a connection controller 4003, and a serial pattern storage 4004.

The display 4001 displays a control state and a communication connection state of each of the home appliance through an image or a text. In detail, the display 4001 may be configured as an LED panel, an organic light emitting diode (OLED) panel, a liquid crystal display panel, and the like. The display 4001 displays control information, power consumption information, Wi-Fi communication connection information, and the like, of each of the home appliances through video or the text under the control of the connection controller 4003.

The Wi-Fi communicator 4002 receives the Wi-Fi communication signal in real time when the power is turned on and transmits the Wi-Fi communication signal to the connection controller 4003.

The serial pattern storage 4004 stores a Wi-Fi unique ID consisting of a preset pattern string, for example, a string pattern of a unique ID and shares it with the connection controller 4003.

Specifically, the serial pattern storage 4004 transmits information on the preset string pattern of the unique ID to the connection controller 4003 when the power is turned on. The Wi-Fi unique ID consisting of the preset string pattern is generated by each of manufacturers to allow for the Wi-Fi unique ID not to be mixed with the Wi-Fi unique ID of each of other Wi-Fi communication devices.

The connection controller 4003 analyzes the unique ID through the Wi-Fi communication signal received by the Wi-Fi communicator 4002 to perform an automatic connection operation, and controls power on/off operations of the home appliances connected according to a process of a preset program. Specifically, when the power is turned on, the connection controller 4003 analyzes the unique ID through the Wi-Fi communication signal received by the Wi-Fi communicator 4002 and is automatically connected in the case of the unique ID consisting of the preset pattern string.

The connection controller 4003 sequentially analyzes the unique IDs through the Wi-Fi communication signals sequentially received and is automatically connected. The connection controller 4003 controls home appliances disposed in the sink cabinet device 1000 and the mirror cabinet device to operate in association with one another according to the preset program. For example, the position of the user may be sensed by a sensor disposed in the mirror cabinet device 2000, and when the user approaches the mirror cabinet device 2000, the mood lamp of the mirror cabinet device 2000 may be turned on. In some cases where a specific home appliance such as lamp disposed in the mirror cabinet device 2000 is used, a control operation may be performed, for example, prevention of the operations of the home appliances such as the lamp disposed in the sink cabinet device 1000.

Figure 9:
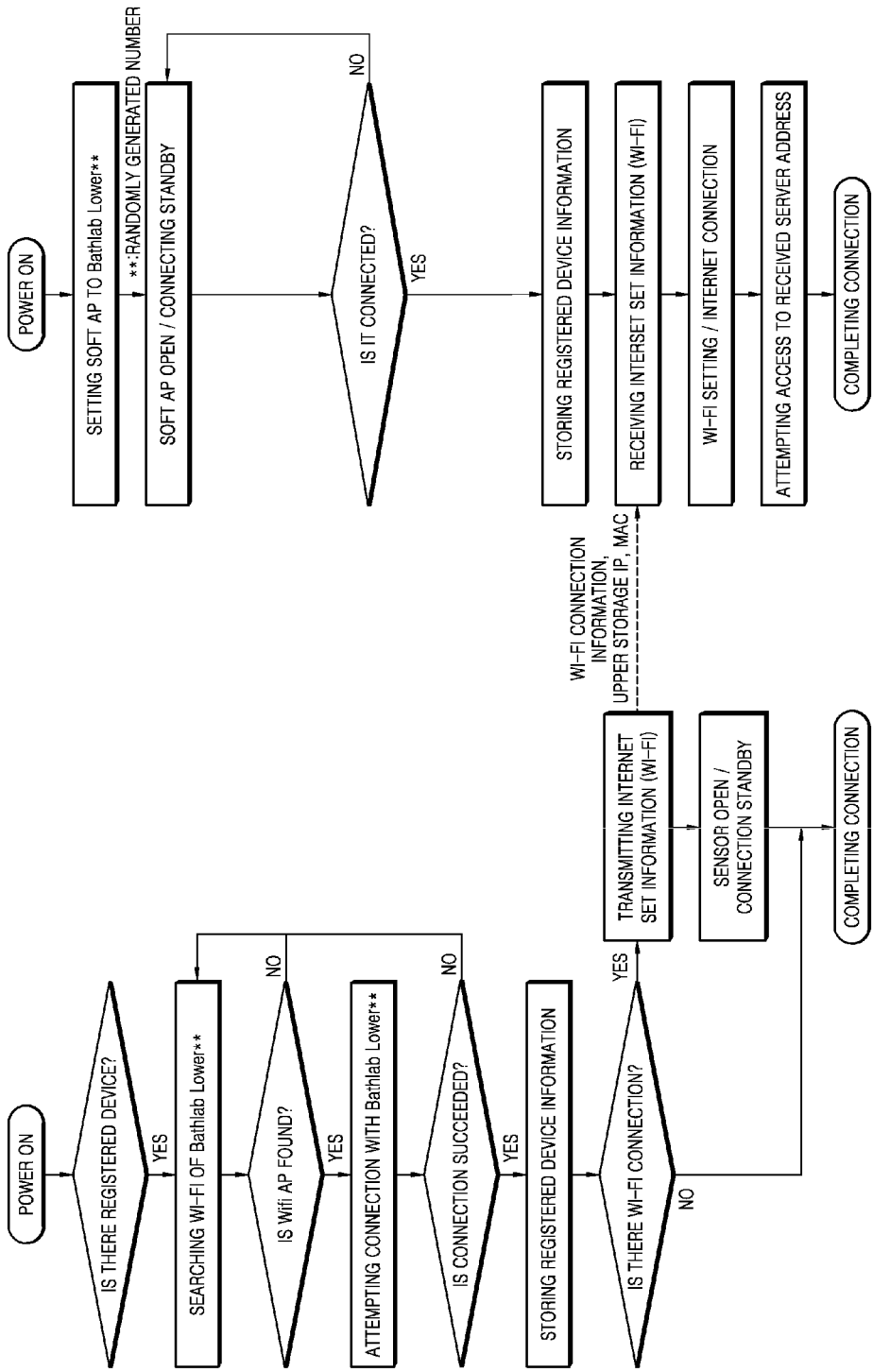
FIG. 9 is a flowchart sequentially showing a method for automatically connecting the wireless communication control module in FIG. 8.

FIG. 9 is a flowchart sequentially showing a method for automatically connecting a wireless communication control module in FIG. 8.

Referring to FIG. 9, when a power is turned on, each of the control modules generates a unique ID consisting of a preset pattern string for Wi-Fi communication and transmits it based on a Wi-Fi communication signal.

The Wi-Fi communicator 4002 of the wireless communication control module 4000 receives surrounding Wi-Fi communication signals in real time and transmits them to the connection controller 4003.

The connection controller 4003 checks the unique ID through the Wi-Fi communication signal received by the Wi-Fi communicator 4002 when the power is turned on, and is automatically connected in the case of the unique ID (e.g., BathlabLower**) consisting of the preset pattern string. The control modules of the home appliances automatically connected register the unique ID and sequentially analyze the unique IDs of other control modules.

The connection controller 4003 may sequentially analyze the unique ID through the Wi-Fi communication signal received in sequence and may be automatically connected. If the received unique ID is different from a unique ID consisting of a preset string pattern (e.g., BathlabLower), the connection controller 4003** may not perform the connection operation with the device having the unique ID.

The connection controller 4003 is automatically connected to each of the side lamp panel control module 440*a*, the mood lamp control module 200*a*, the beauty lamp control module 330*a*, the cooling power control module 400*a*, and the heating power control module 450*a*. The connection controller 4003 is also automatically connected to the towel management control module 300*a*, the console power control module 430*a*, the sensor control module 220*a*, and the dryer control module 600*a* through the Wi-Fi communication.

Figure 10:
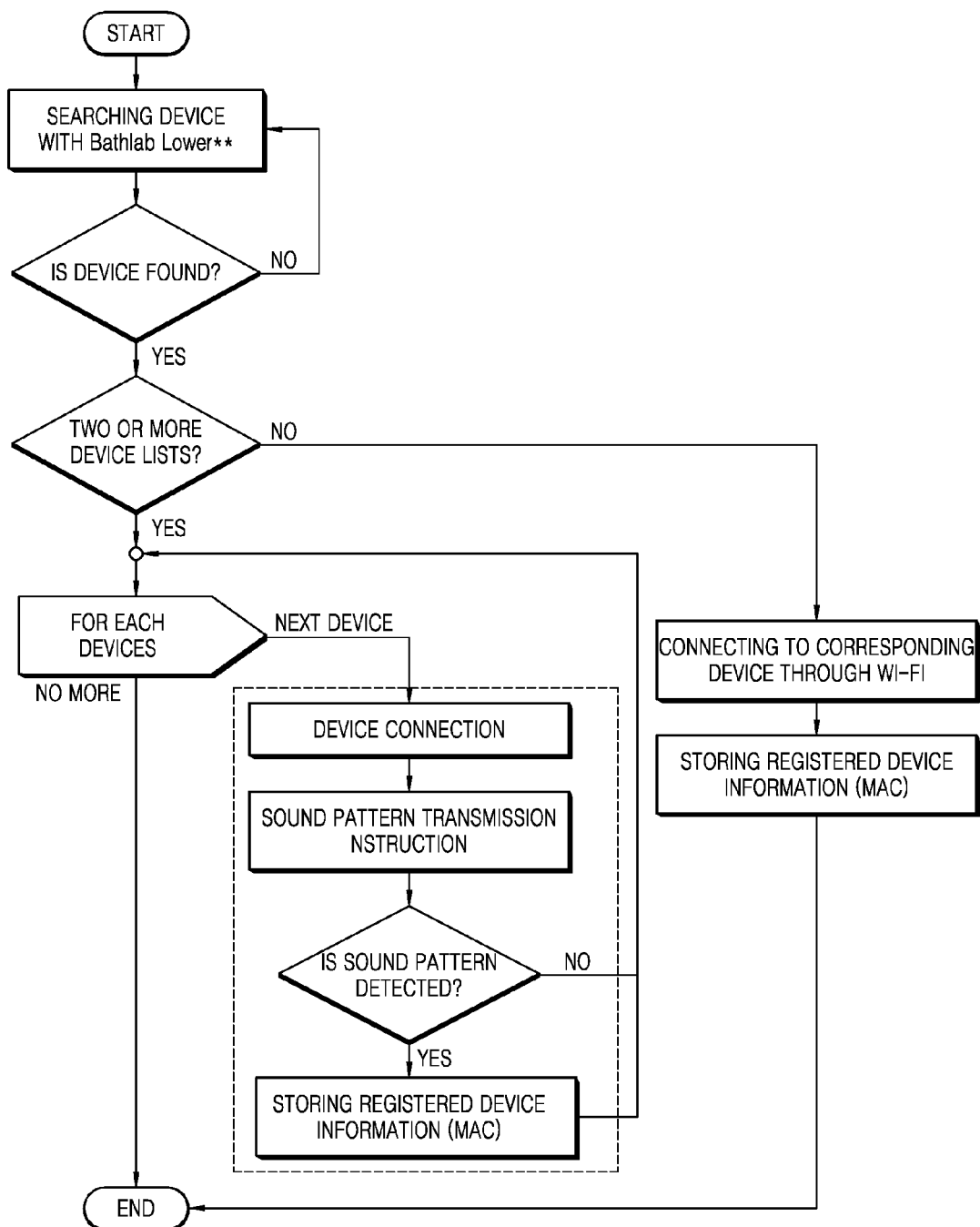
FIG. 10 is a flowchart sequentially showing another method for automatically connecting to another wireless control module in a bathroom space.

FIG. 10 is a flowchart sequentially showing another method for automatically connecting with other wireless control modules in a bathroom space.

Referring to FIG. 10, a wireless communication control module 4000 receives a Wi-Fi signal in a predetermined period unit to perform automatic connection operation. In this case, when a Wi-Fi communication signal is received from any one of the control modules, the wireless communication control module 4000 is automatically connected thereto based on analysis that a unique ID is a unique ID consisting of a preset pattern string.

When a plurality of Wi-Fi communication signals are received at the wireless communication control module 4000, automatic connection operations are sequentially performed. In this case, a preset operation may be performed to notify connection with the control module connected during the sequential automatic connection process. For example, when the wireless communication control module 4000 is connected to the control module that generates the Wi-Fi communication signal through the Wi-Fi communication, the wireless communication control module 4000 may transmit a sound transmission instruction to transmit a sound having a preset pattern to the connected control module. The control module that has received the sound transmission instruction may operate a home appliance controlled by itself to transmit the sound and may transmit a sound transmission instruction execution completion signal back to the wireless communication control module 4000. The wireless communication control module 4000 determines the sound transmission instruction execution completion signal to be connected to the control module.

Figure 11:
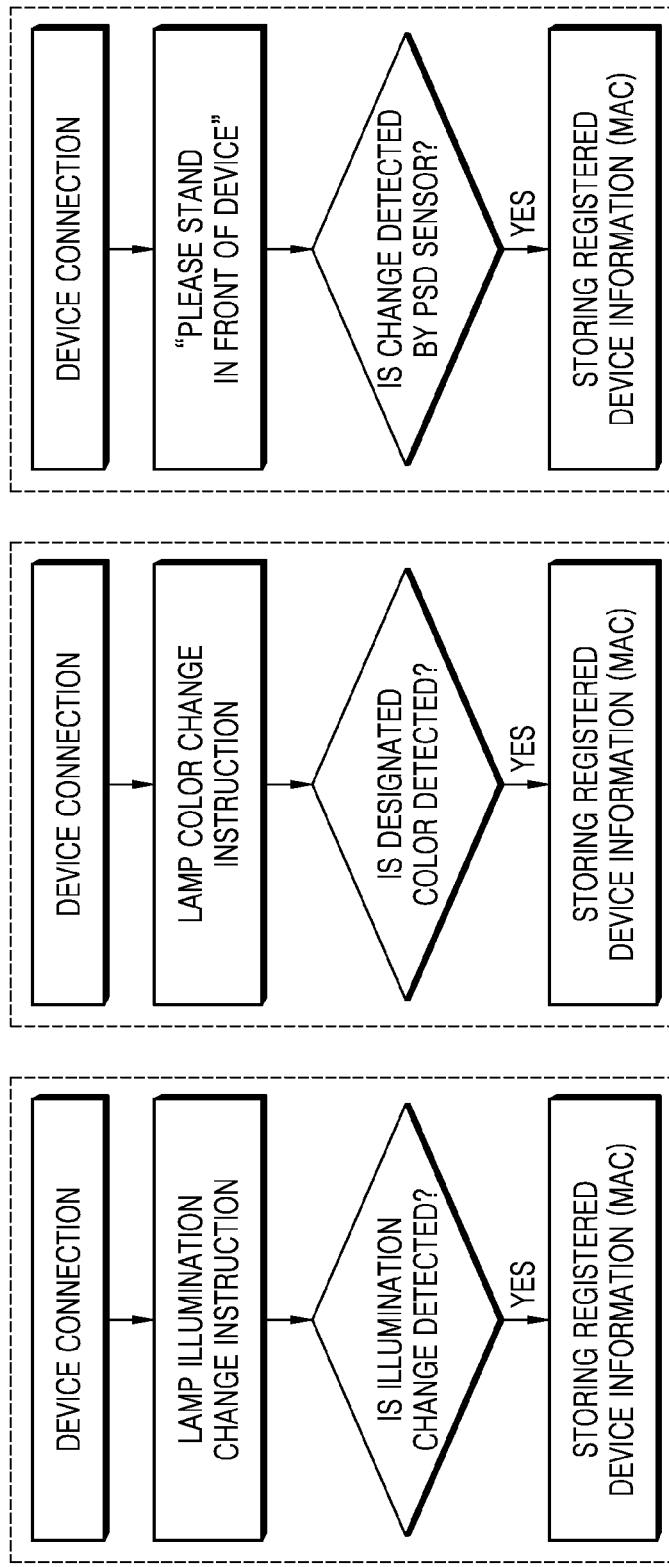
FIGS. 11A-11C are flowcharts showing other methods for automatically connecting to another wireless control module.

FIGS. 11A-11C are flowcharts showing other methods for automatically connecting to another wireless control module.

Referring to FIGS. 11A-11C, in a sequential automatic connection process, other preset operations in addition to the sound transmission operation may be performed to inform the connection process of the control module.

For example, when a wireless communication control module 4000 is connected to the control module that has generated a Wi-Fi communication signal through Wi-Fi communication, the wireless communication control module 4000 may transmit, to the connected control module, a light emission instruction to illuminate a lamp of a preset color.

The control module that has received the light emission instruction may operate the home appliance controlled by itself to illuminate a lamp of a specific color and may transmit the light emission operation execution completion signal back to the wireless communication control module 4000. The wireless communication control module 4000 may identify the light emission operation execution completion signal to be connected to the corresponding control module.

When the wireless communication control module 4000 is connected to the control module that generates the Wi-Fi communication signal through the Wi-Fi communication, sensing instruction may be transmitted to the connected control module to perform a sensing operation.

The control module that receives the sensing instruction may operate the sensor controlled by itself to perform the sensing operation and may transmit a sensing execution completion signal back to the wireless communication control module 4000. The wireless communication control module 4000 may identify the sensing execution completion signal to be connected to the corresponding control module.

An embodiment is described below in which a first wireless control module 4000*a* is disposed in a mirror cabinet device 2000 and a second wireless control module 3000*a* is disposed in a sink cabinet device 1000 with reference to FIGS. 12 to 15.

Figure 12:
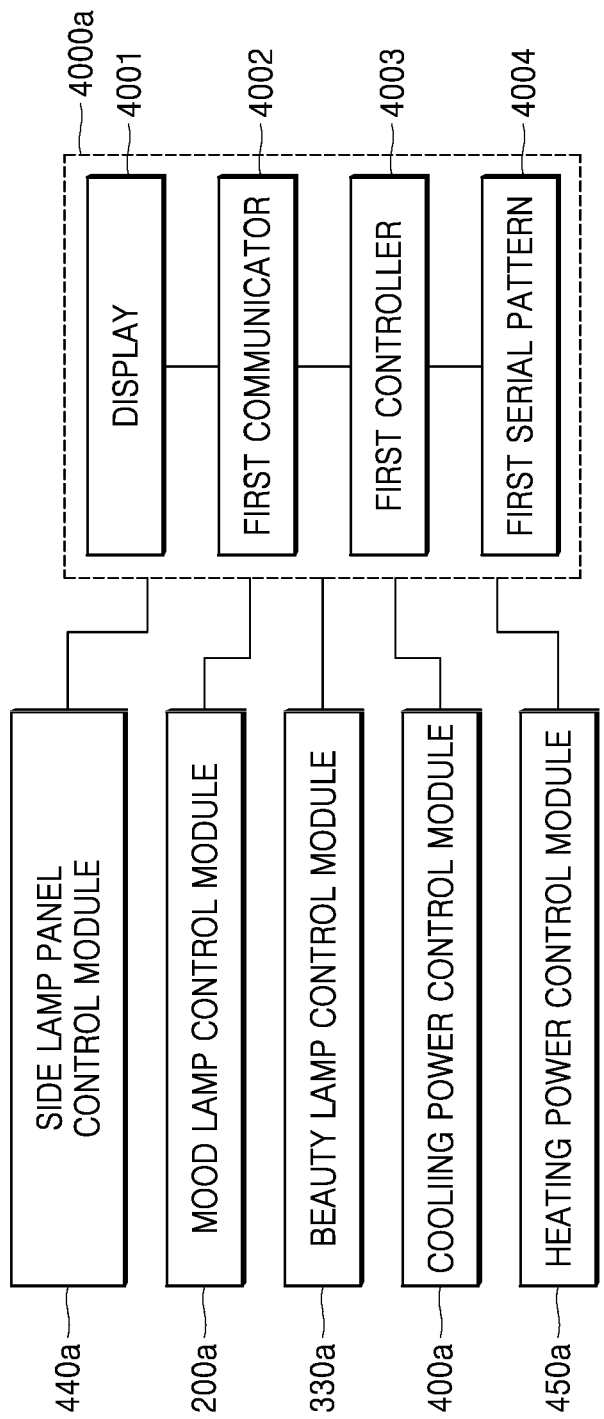
FIG. 12 is a block diagram showing a first wireless control module disposed in a mirror cabinet device in detail.

FIG. 12 is a block diagram showing a first wireless control module disposed in a mirror cabinet device in detail.

As shown in FIG. 12, a first wireless control module 4000*a* is automatically paired with each of a side lamp panel control module 440*a*, a mood lamp control module 200*a*, a beauty lamp control module 330*a*, a cooling power control module 400*a*, and a heating power control module 450*a* through Bluetooth communication.

The first wireless control module 4000*a* performs the Bluetooth communication with the side lamp panel control module 440*a*, the mood lamp control module 200*a*, the beauty lamp control module 330*a*, the cooling power control module 400*a*, and the heating power control module 450*a* in real time.

When the power is turned on, each of the side lamp panel control module 440*a*, the mood lamp control module 200*a*, the beauty lamp control module 330*a*, the cooling power control module 400*a*, and the heating power control module 450*a* transmits a unique communication ID consisting of a preset pattern string based on a Bluetooth signal.

The first wireless control module 4000*a* analyzes communication IDs through the Bluetooth signals received in real time and is automatically paired with the corresponding control module when the communication ID is identical to the communication ID consisting of the preset pattern string.

When a mirror cabinet device 2000 is added within the Bluetooth communication radius, the first wireless control module 4000*a* is automatically paired with the control modules of the added mirror cabinet device 2000. For example, the first wireless control module 4000*a* may be automatically paired with each of the side lamp panel control module 440*a*, the mood lamp control module 200*a*, the beauty lamp control module 330*a*, and the cooling power control module 400*a* of the added mirror cabinet device 2000.

The first wireless control module 4000*a* controls power on/off operation of each of the side lamp panel 440, the mooed lamp 200, the beauty lamp 2330, the cooling power supply 400, and the heating sheet through the control modules in association with the second wireless control module 3000*a*.

The first wireless control module 4000*a* includes a display 4001, a first serial pattern 4004, a first communicator 4002, and a first controller 4003.

The display 4001 displays a control state and a communication pairing state of each of power devices through an image or text. In detail, the display 4001 may be configured as an LED panel, an OLED panel, a liquid crystal display panel, and the like. The display 4001 displays the control state and the communication pairing state of each of the power devices through the image or the text under the control of the first controller 4003.

The first serial pattern 4004 randomly generates a Bluetooth communication ID consisting of a preset pattern string. In detail, when the power is turned on, the first serial pattern 4004 randomly generates a Bluetooth communication ID consisting of a preset pattern string and transmits the randomly generated Bluetooth communication ID to the first controller 4003. The Bluetooth communication ID consisting of the preset pattern string may be generated by each of manufacturers to allow for the Bluetooth communication ID not to be preferably mixed with the Bluetooth communication IDs of other Bluetooth communication devices.

The first communicator 4002 receives a Bluetooth communication signal in real time or transmits the randomly generated Bluetooth communication ID based on a Bluetooth communication signal. In detail, when the power is turned on, the first communicator 4002 repeats a process of receiving an external Bluetooth communication signal in real time or transmitting its own Bluetooth communication ID based on a Bluetooth communication signal.

The controller 4003 analyzes the communication ID through the Bluetooth communication signal received by the first communicator 4002 to perform an automatic pairing operation and controls power on/off operation of the paired power devices according to a preset program. In detail, when the power is turned on, the first controller 4003 analyzes the communication ID through the Bluetooth communication signal received by the first communicator 4002 and performs the automatic pairing in the case of the communication ID consisting of the preset pattern string. In this case, the first controller 4003 sequentially analyzes the communication IDs through the sequentially received Bluetooth communication signals and is automatically paired. If the Bluetooth communication ID transmitted by the first communicator 4002 is received and paired by the second wireless control module 3000a, the second wireless control module 3000a operates in a master mode and the first wireless communication module 3000a operates in a slave mode.

When the first controller 4003 of the first wireless control module 4000a receives the communication ID of the second wireless control module 3000a and is paired, the first wireless control module 4000a operates in the master mode to control the operation of the second wireless control module 3000a.

The first wireless control module 4000a pairs with the second wireless control module 3000a to control the power devices of the sink cabinet device 1000 and the mirror cabinet device to be operated in association with each other according to a preset program. For example, the position of the user may be sensed by the sensor disposed in the mirror cabinet device 2000, and when the user approaches the mirror cabinet device 2000, the mood lamp of the mirror cabinet device 2000 may be turned on. When a specific power device such as the lamp disposed in the mirror cabinet device 2000 is used, a control operation may be performed, for example, prevention of the operations of the power devices such as the lamp disposed in the sink cabinet device 1000.

Figure 13:
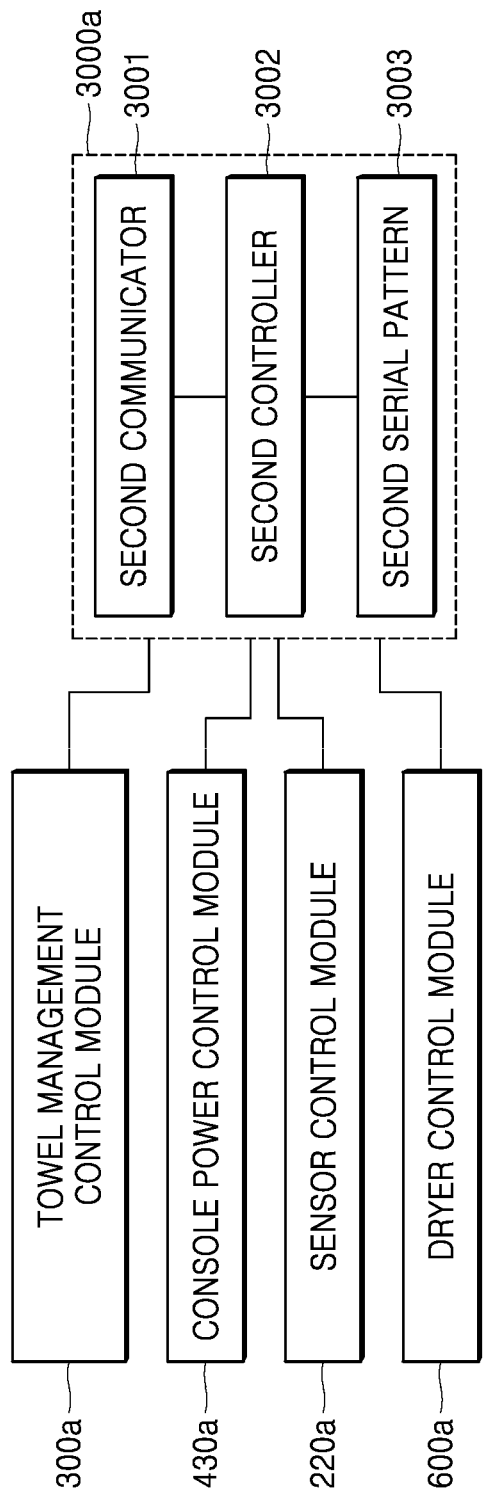
FIG. 13 is a block diagram showing a second wireless control module disposed in a sink cabinet device in detail.

FIG. 13 is a block diagram showing a second wireless control module disposed in a sink cabinet device in detail.

As shown in FIG. 13, each of a towel management 1300, a drawer type console 1400, at least one sensor, and a dryer of a sink cabinet device 1000 includes a control module that performs Bluetooth communication and controls power on/off operation. A second wireless control module 3000a is automatically paired with each of a towel management control module 300a, a console power control module 430a, a sensor control module 220a, and a dryer control module 600a through Bluetooth communication.

When the power is turned on, each of the towel management control module 300a, the console power control module 430a, the sensor control module 220a, and the dryer control module 600a transmits a communication ID consisting of the preset pattern string based on Bluetooth signals. The second wireless control module 3000a analyzes the communication IDs through the Bluetooth signals received in real time and is automatically paired with the corresponding control module when the communication ID is identical to the communication ID consisting of the preset pattern string.

When another sink cabinet device 1000 is added within the Bluetooth communication radius, the second wireless control module 3000a is automatically paired with the control modules of the added sink cabinet device 1000. For example, the second wireless control module 3000a may be automatically paired with the towel management control module 300a, the console power control module 430a, the sensor control module 220a, and the dryer control module 600a of the added sink cabinet device 1000. The second wireless control module 3000a controls the power on/off operation of the towel management 1300, the drawer type console 1400, at least one sensor, and the dryer through control modules in association with the first wireless control module 4000a.

To this end, the second wireless control module 3000a includes a second serial pattern 3003, a second communicator 3002, and a second controller 3002.

When the power is turned on, the second serial pattern 3003 randomly generates a Bluetooth communication ID consisting of a preset pattern string and transmits the randomly generated Bluetooth communication ID to the second controller 3002.

When the power is turned on, the second communicator 3001 repeats a process of receiving external Bluetooth communication signals in real time or transmitting its own Bluetooth communication ID based on the Bluetooth communication signal.

When the power is turned on, the second controller 3002 analyzes the communication ID through the Bluetooth communication signal received by the second communicator 3001 and is automatically paired with the communication ID in the case of the communication ID consisting of the preset pattern string. In this case, the second controller 3002 sequentially analyzes communication IDs through Bluetooth communication signals received sequentially and is automatically paired. If the Bluetooth communication ID transmitted by the second communicator 3001 is received and paired by the first wireless control module 4000a, the first wireless control module 4000a operates in the master mode and the second wireless control module 3000a operates in the slave mode.

When the second controller 3002 of the second wireless control module 3000a receives the communication ID of the first wireless control module 4000a and is paired, the second wireless control module 3000a operates in the master mode to control the operation of the first wireless control module 4000a.

Figure 14:
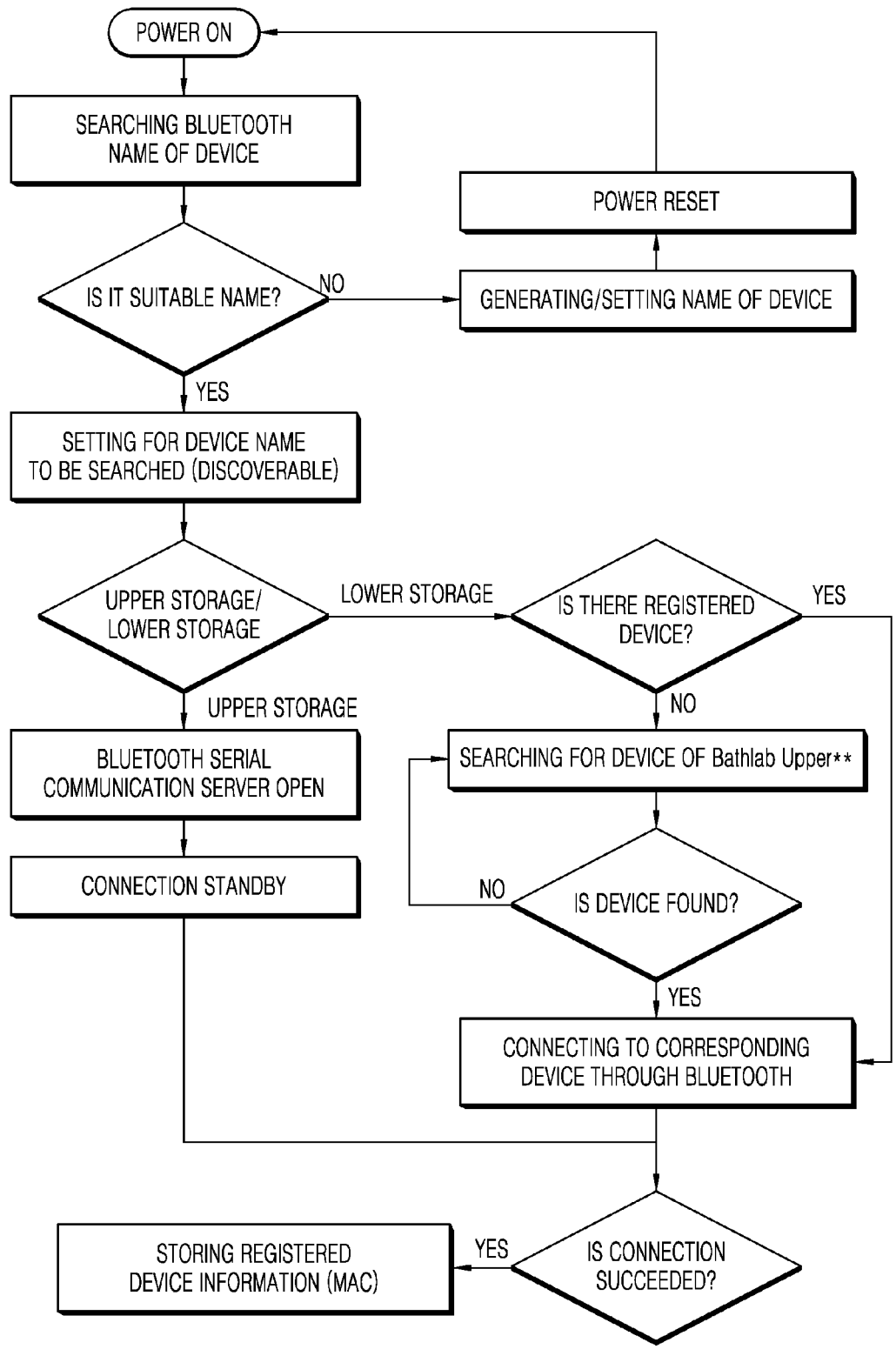
FIG. 14 is a flowchart sequentially showing an automatic pairing method of the first wireless control module in FIG. 12.

FIG. 14 is a flowchart sequentially showing an automatic pairing method of the first wireless control module in FIG. 12.

Referring to FIG. 12, when a power is turned on, each of control modules randomly generates a Bluetooth communication ID consisting of a preset pattern string and transmits the generated Bluetooth communication ID based on a Bluetooth communication signal. In this case, a first wireless control module 4000a also randomly generates the Bluetooth communication ID consisting of the preset pattern string and transmits the randomly generated Bluetooth communication ID to a first controller 4003.

The first communicator 4002 repeats a process of receiving an external Bluetooth communication signals in real time or transmitting its own Bluetooth communication ID based on the Bluetooth communication signal.

When the power is turned on, the first controller 4003 checks the communication ID through the Bluetooth communication signal received by the first communicator 4002 and is automatically paired in the case of the communication ID consisting of the preset pattern string. The control module of the automatically paired power device is registered and the communication IDs of other control modules are analyzed. The first controller 4003 may sequentially analyze the communication IDs through the sequentially received Bluetooth communication signals and may be automatically paired. If the received communication ID is different from the ID consisting of the preset pattern string, the pairing operation with the device having the corresponding communication ID is not performed. Accordingly, the first controller 4003 may be automatically paired with the side lamp panel control module 440a, the mood lamp control module 200a, the beauty lamp control module 330a, the cooling power control module 400a, and the heating power control module 450a.

When the second communicator 3001 of the second wireless control module 3000a transmits the Bluetooth communication signal and the first communicator 4002 receives the Bluetooth communication signal, the first controller 4003 analyzes it and is automatically paired. In this case, the first wireless control module 4000a may operate as the master control module by the first controller 4003.

Figure 15:
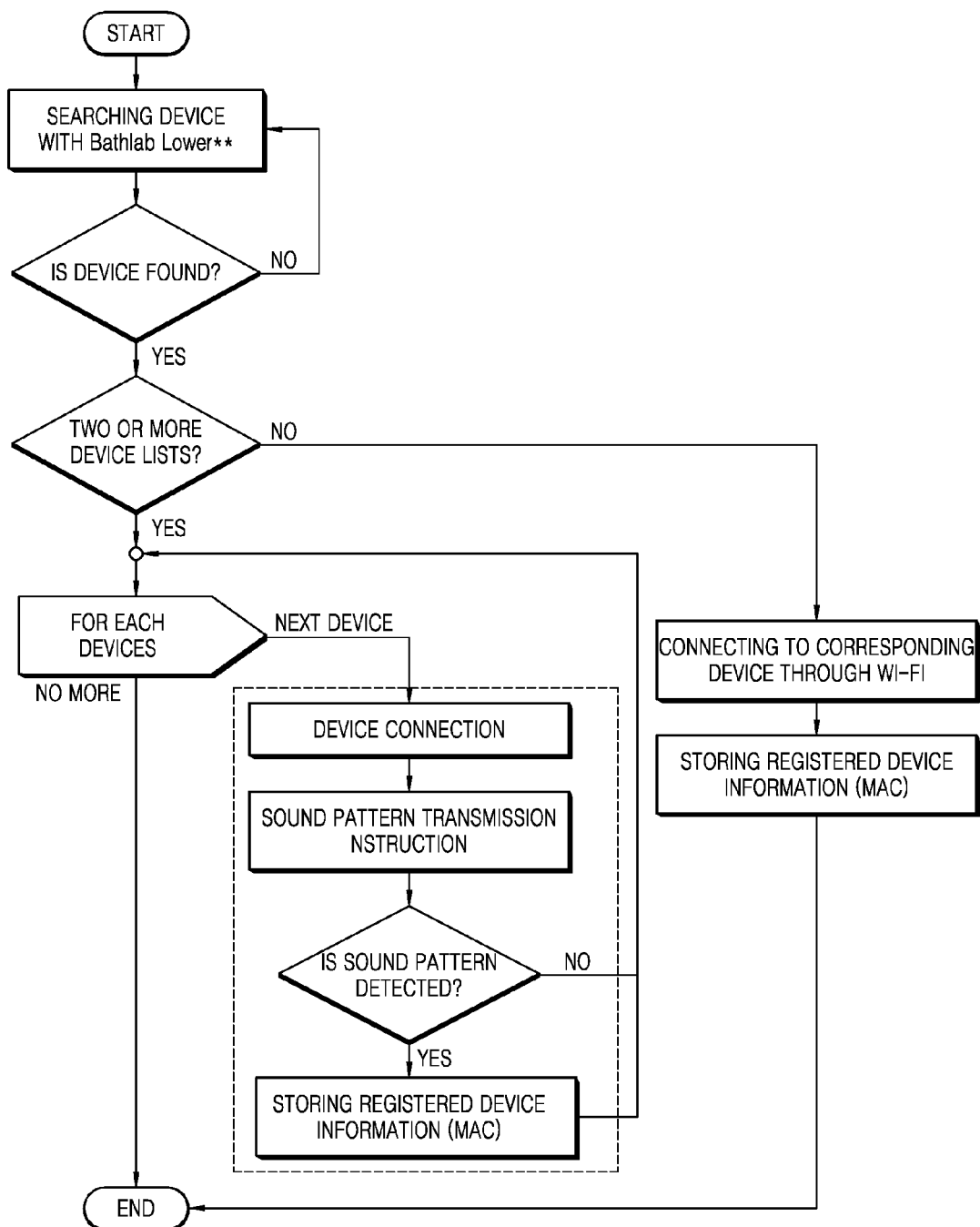
FIG. 15 is a flowchart sequentially showing another method for automatically pairing with another wireless control module in a bathroom space.

FIG. 15 is a flowchart sequentially showing another method for automatically pairing with another wireless control module in a bathroom space.

Referring to FIG. 15, a first wireless control module 4000a or a second wireless control module 3000a receives a Bluetooth signal in units of preset periods to perform an automatic pairing operation. In this case, when a Bluetooth communication signal is received from one of the control modules, it is automatically paired based on analysis that the communication ID is a communication ID consisting of the preset pattern string.

When a plurality of Bluetooth communication signals are received, the automatic pairing operations are sequentially performed. In the sequential automatic pairing process, a preset operation may be performed to notify a process of pairing with the control module. For example, when the first wireless control module 4000a is connected to the control module that generates the Bluetooth communication signal through the Bluetooth communication, the first wireless control module 4000a may transmit a sound transmission instruction to transmit a sound having a preset pattern to the connected control module. The control module receiving the sound transmission instruction may operate the power device controlled by the controller to transmit the sound and may transmit the sound transmission instruction execution completion signal back to the first wireless control module 4000a. The first wireless control module 4000a checks the sound transmission instruction execution completion signal to be paired with the corresponding control module.

A bathroom facility device including a voice recognition-based artificial intelligence device is described with reference to FIGS. 16 to 19.

Figure 16:
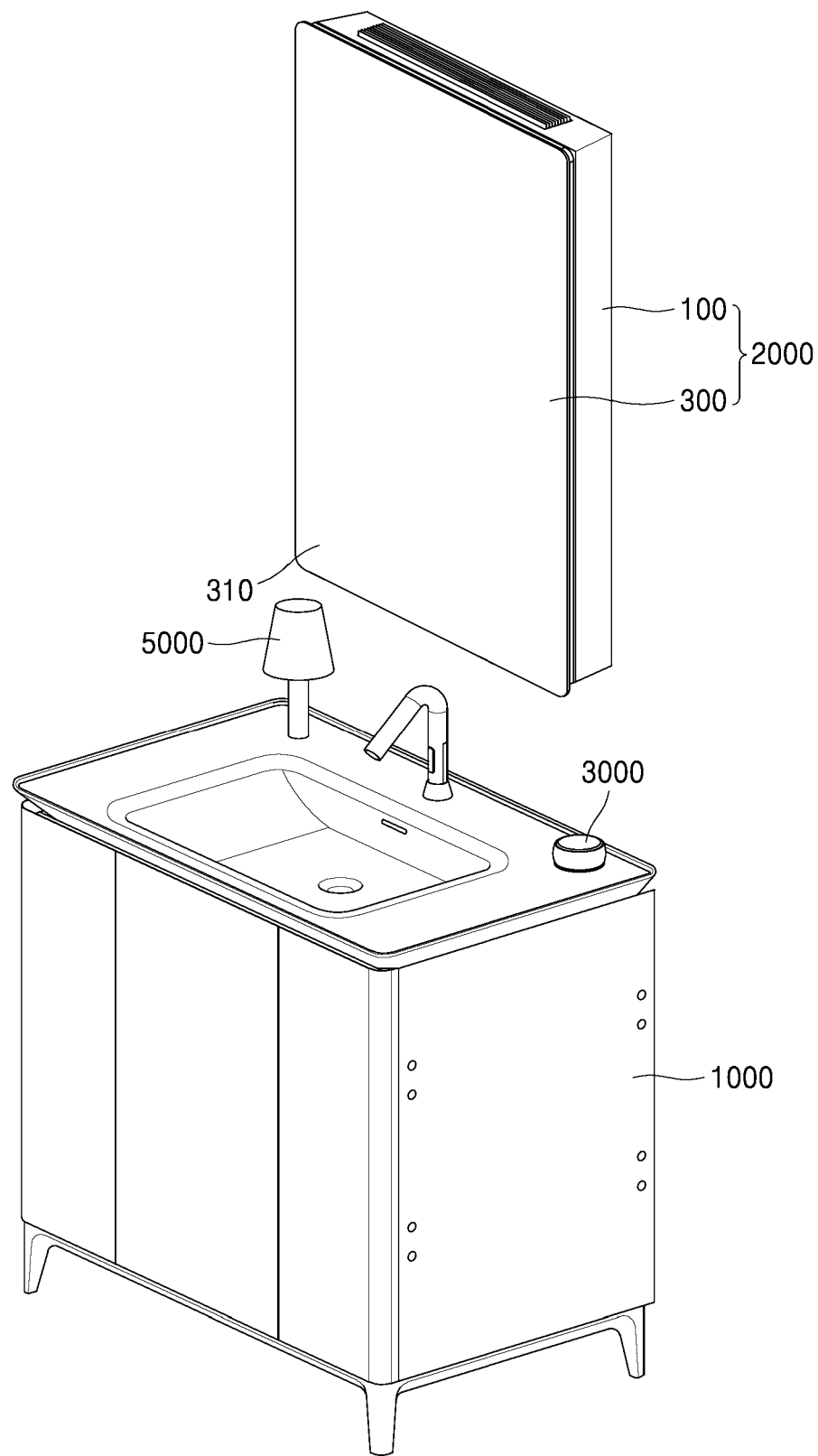
FIG. 16 is a perspective view showing a bathroom facility device including a voice recognition-based artificial intelligence device according to an embodiment of the present disclosure.

FIG. 16 is a perspective view showing a bathroom facility device including a voice recognition-based artificial intelligence device according to an embodiment of the present disclosure.

Referring to FIG. 16, according to an embodiment of the present disclosure, a bathroom facility device includes a mirror cabinet device 2000 attached to the wall of a bathroom, a sink cabinet device 1000 disposed on the floor and the wall of the bathroom, and a voice recognition-based artificial intelligence device 5000.

An integrated operation switch 3000 is disposed to operate the mirror cabinet device 2000 and the sink cabinet device 1000. For user convenience, the integrated operation switch 3000 may preferably be disposed in the sink cabinet device 1000.

When the artificial intelligence device 5000 is automatically connected to control modules of the home appliances disposed in the mirror cabinet device 2000 and the sink cabinet device 1000, the artificial intelligence device 5000 monitors and controls the home appliances based on the voice recognition.

The artificial intelligence device 5000 is wirelessly connected to the control module of the home appliances disposed in the mirror cabinet device 2000 and the sink cabinet device 1000 in real time and maintains a wireless connection state. Even if the mirror cabinet device 2000 or the sink cabinet device 1000 is added to a bathroom or an adjacent space, the artificial intelligence device 5000 is automatically wirelessly connected to the control module of the home appliances disposed in the added mirror cabinet device 2000 or sink cabinet device 1000.

The artificial intelligence device 5000 monitors the operation of each home appliance in real time through a control module of the home appliances disposed in the mirror cabinet device 2000 and the sink cabinet device 1000. The artificial intelligence device 5000 controls the home appliances preset according to control instructions based on voice recognition and a preset process to be operated in compatible with one another or the operations of the home appliances to be stopped. For example, the home appliances disposed in the mirror cabinet device 2000 and the sink cabinet device 1000 are selectively operated and the operations thereof are stopped according to the control instructions based on the voice recognition. When a specific home appliance such as a lamp disposed in the mirror cabinet device 2000 is used according to a preset process, a control operation may be performed, such as prevention of the operation of the home appliance such as the lamp disposed in the sink cabinet device 1000.

The artificial intelligence device 5000 may be disposed in at least one of the mirror cabinet device 2000 or the sink cabinet device 1000. For example, the artificial intelligence device 5000 may be disposed in or disposed at a side of outside or a front surface of at least one of the mirror cabinet device 2000 or the sink cabinet device 1000. In some examples, the artificial intelligence device 5000 may be disposed on the bathroom wall, may be configured as a mobile device, or may be built in the integrated operation switch 3000. Hereinafter, in the present disclosure, an example is described below in which the artificial intelligence device 5000 is disposed at an outer portion of an upper portion of the sink cabinet device 1000. Detailed configurations and operation features of the artificial intelligence device 5000 are described in more detail with reference to the accompanying drawings.

Figure 17:
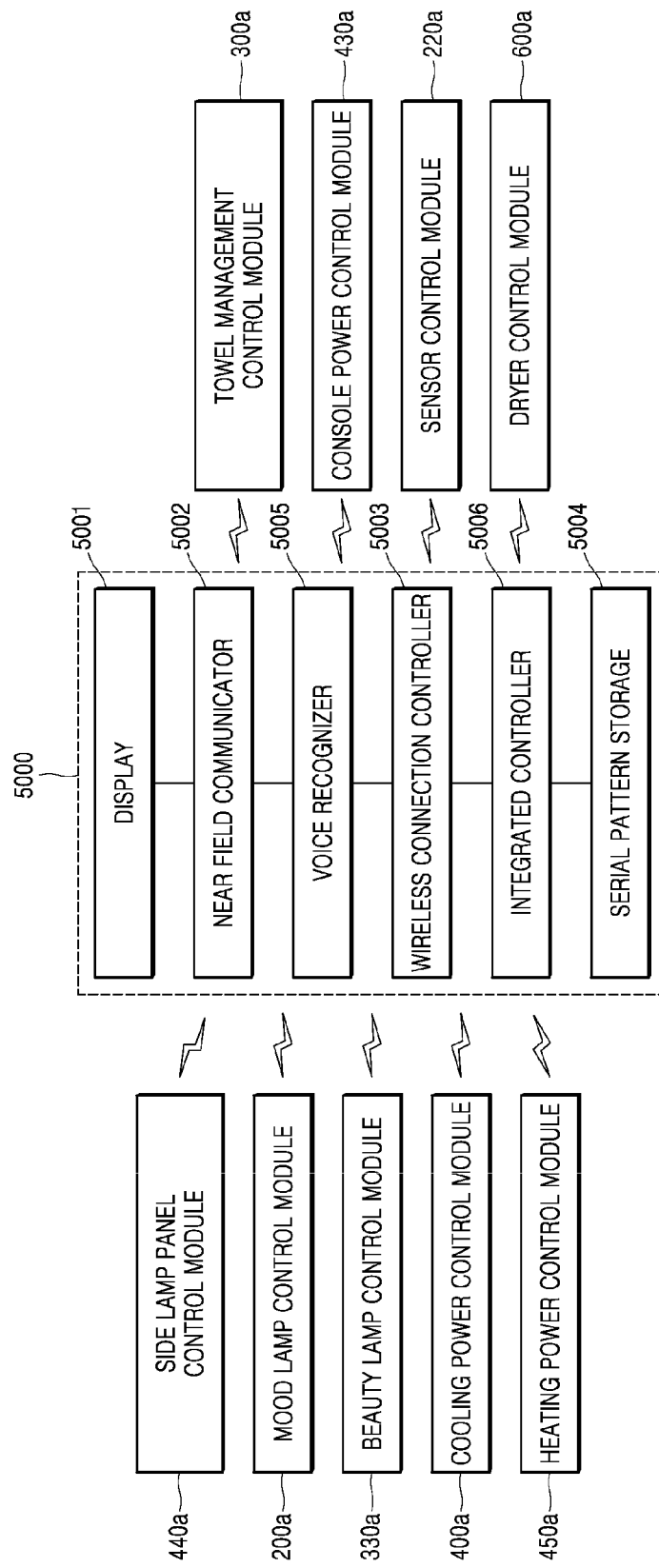
FIG. 17 is a block diagram showing connection between an artificial intelligence device and the control modules in FIG. 16 in detail.

FIG. 17 is a block diagram showing connection between the artificial intelligence device and the control module in FIG. 16 in detail.

As shown in FIG. 17, an artificial intelligence device 5000 is automatically connected to a side lamp panel control module 440*a*, a mood lamp control module 200*a*, a beauty lamp control module 330*a*, a cooling power control module 400*a*, and a heating power control module 450*a* through a NFC such as Zigbee.

Each of the side lamp panel control module 440*a*, the mood lamp control module 200*a*, the beauty lamp control module 330*a*, the cooling power control module 400*a*, and the heating power control module 450*a* may be operated as an end device. The artificial intelligence device 5000 may be operated as a kind of coordinator device.

When the power is turned on, each of the side lamp panel control module 440*a*, the mood lamp control module 200*a*, the beauty lamp control module 330*a*, the cooling power control module 400*a*, the heating power control module 450*a* transmits a unique ID (e.g., an Extended PAN ID) consisting of the preset pattern string based on a Zigbee signal.

The artificial intelligence device 5000 analyzes the unique IDs through the Zigbee signals received in real time and is automatically connected to the corresponding control module when the unique ID is identical to a unique ID consisting of the preset pattern string.

The artificial intelligence device 5000 may be automatically connected to the control modules of the added mirror cabinet device 2000 even if another mirror cabinet device 2000 is added within the Zigbee communication radius. For example, when the power is turned on, each of the side lamp panel control module 440*a*, mood lamp control module 200*a*, a beauty lamp control module 330*a*, the cooling power control module 400*a*, and the heating power control module 450*a* of the added mirror cabinet device 2000 transmits the unique ID consisting of the preset pattern string based on the Zigbee signal.

In this case, the artificial intelligence device 5000 also analyzes the unique IDs through the Zigbee signals received in real time and is automatically connected to the corresponding control module when the unique ID is identical to a unique ID consisting of the preset pattern string.

Similarly, each of the towel management 1300, the drawer type console 1400, the at least one sensor, and the dryer of the sink cabinet device 1000 includes a control module that controls a power on/off operation while performing the Zigbee communication. The artificial intelligence device 5000 is automatically connected to the towel management control module 300*a*, the console power control module 430*a*, the sensor control module 220*a*, and the dryer control module 600*a* through the NFC such as Zigbee.

As the artificial intelligence device 5000 operates as a coordinator device, each of the towel management control module 300*a*, the console power control module 430*a*, the sensor control module 220*a*, and the dryer control module 600*a* also operates as an end device.

When the power is turned on, each of the towel management control module 300*a*, the console power control module 430*a*, the sensor control module 220*a*, and the dryer control module 600*a* transmits the unique ID (e.g., an Extended PAN ID) consisting of the preset pattern string based on the Zigbee signal. The artificial intelligence device 5000 analyzes the unique IDs through the Zigbee signals received in real time and is automatically connected to the corresponding control module when the unique ID is identical to the unique ID consisting of the preset pattern string.

The artificial intelligence device 5000 is automatically connected to the control modules of the added sink cabinet device 1000 when another sink cabinet device 1000 is added within the Zigbee communication radius. The control modules of the added sink cabinet device 1000 also transmit a unique ID consisting of the preset pattern string based on a Zigbee signal when the power is turned on. The artificial intelligence device 5000 also analyzes the unique IDs through the Zigbee signals received in real time and is automatically connected to the corresponding control module when the unique ID is identical to the unique ID consisting of the preset pattern string.

The artificial intelligence device 5000 is in association with the side lamp panel 440, the mood lamp 200, the beauty lamp 2330, the cooling power supply 400, the heating sheet, the towel management 1300, the drawer type console 1400, at least one sensor, and the dryer and controls power on/off operations thereof.

To this end, the artificial intelligence device 5000 includes a display 5001, a near field communicator 5002, a wireless connection controller 5003, a serial pattern storage 5004, a voice recognition 5005, and an integrated controller 5006.

The display 5001 displays a control state and a communication connection state of each home appliance through a video or voice (or audio). Specifically, the display 5001 may include an LED panel, an OLED panel, a liquid crystal display panel, and the like, and may be configured as an audio device. The display 5001 displays control information, power consumption information, Zigbee communication connection information, and the like, of each of the home appliances through video and audio under the control of the integrated controller 5006.

The near filed communicator 5002 receives a Zigbee communication signal in real time when the power is turned on and transmits it to the connection controller 5003. The near filed communicator 5002 also transmits the control signal from the integrated controller 5006 to the corresponding control module.

The serial pattern storage 5004 stores a Zigbee unique ID consisting of a preset pattern string, that is, a string pattern of a unique ID and shares it with a wireless connection controller 5003. Specifically, the serial pattern storage 5004 transmits the preset string pattern of the unique ID to the wireless connection controller 5003 when the power is turned on. The Zigbee unique ID consisting of the preset pattern string may be generated by each of manufacturers to allow for the Zigbee unique ID not to be preferably mixed with the Zigbee unique ID of other Zigbee communication devices.

The wireless connection controller 5003 analyzes the unique ID through the Zigbee communication signal received by the near field communicator 5002 and performs the automatic connection operation. In detail, when the power is turned on, the connection controller 5003 analyzes the unique ID through the Zigbee communication signal received by the near field communicator 5002 and is automatically connected in the case of the unique ID consisting of the preset pattern string.

The connection controller 5003 sequentially analyzes unique IDs through ZigBee communication signals received in sequence and is automatically connected. The voice recognizer 5005 recognizes the user's voice in real time and transmits, to the integrated controller 5006, code data corresponding to the voice. The integrated controller 5006 generates and outputs control signals for controlling the home appliances of the sink cabinet device 1000 and the mirror cabinet device 2000 according to the voice of the user.

The integrated controller 5006 may control power on/off operations of the connected home appliances according to a process of a preset program as well as the voice instruction of the user.

The integrated controller 5006 controls the home appliances of the sink cabinet device 1000 and the mirror cabinet device 2000 to operate in association with each other according to the preset program. For example, the position of the user may be sensed by a sensor disposed in the mirror cabinet device 2000, and when the user approaches the mirror cabinet device 2000, a mood lamp of the mirror cabinet device 2000 may be illuminated. When a specific home appliance such as lamp disposed in the mirror cabinet device 2000 is used, a control operation may be performed, for example, prevention of the operation of the home appliances such as the lamp disposed in the cabinet device 1000.

Figure 18:
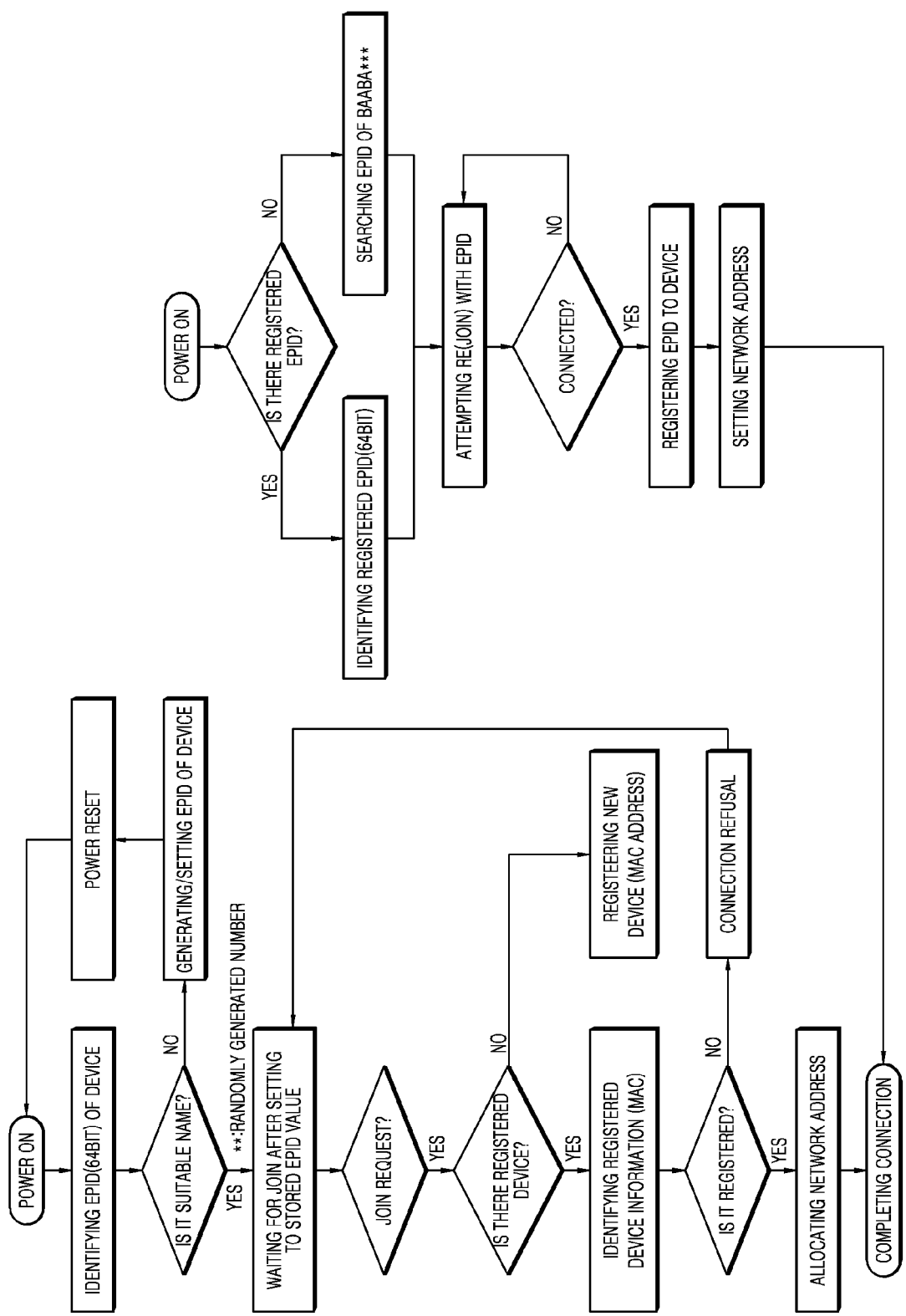
FIG. 18 is a flowchart sequentially showing an automatic connection method of the artificial intelligence device in FIG. 17.

FIG. 18 is a flowchart sequentially showing an automatic connection method of an artificial intelligence device in FIG. 17.

Referring to FIG. 18, each of control modules generates a unique ID consisting of a preset pattern string for a Zigbee communication and transmits it based on a Zigbee communication signal when the power is turned on.

A near field communicator 5002 of the artificial intelligence device 5000 receives a Zigbee communication signal of a surrounding in real time and transmits it to a wireless connection controller 5003.

The wireless connection controller 5003 checks the unique ID through the Zigbee communication signal received by the near field communicator 4002 when the power is turned on and is automatically connected when the unique ID is an unique ID (e.g., Bathlab Lower**) consisting of a preset pattern string.

The automatically connected control module of the home appliance registers a unique ID and analyzes a unique ID of another control module in sequence. The wireless connection controller 5003 may sequentially analyze the unique ID through the Zigbee communication signal received in sequence and may be automatically connected.

If the received unique ID is different from a unique ID (e.g., Bathlab Lower**) consisting of the preset string pattern, the wireless connection controller 5003 does not perform a connection operation with the device having the corresponding unique ID. The wireless connection controller 5003 is automatically connected to the side lamp panel control module 440a, the mood lamp control module 200a, the beauty lamp control module 330a, the cooling power control module 400a, and the heating power control module 450a. The wireless connection controller 5003 is automatically connected to the towel management control module 300a, the console power control module 430a, the sensor control module 220a, and the dryer control module 600a through the Zigbee communication.

Figure 19:
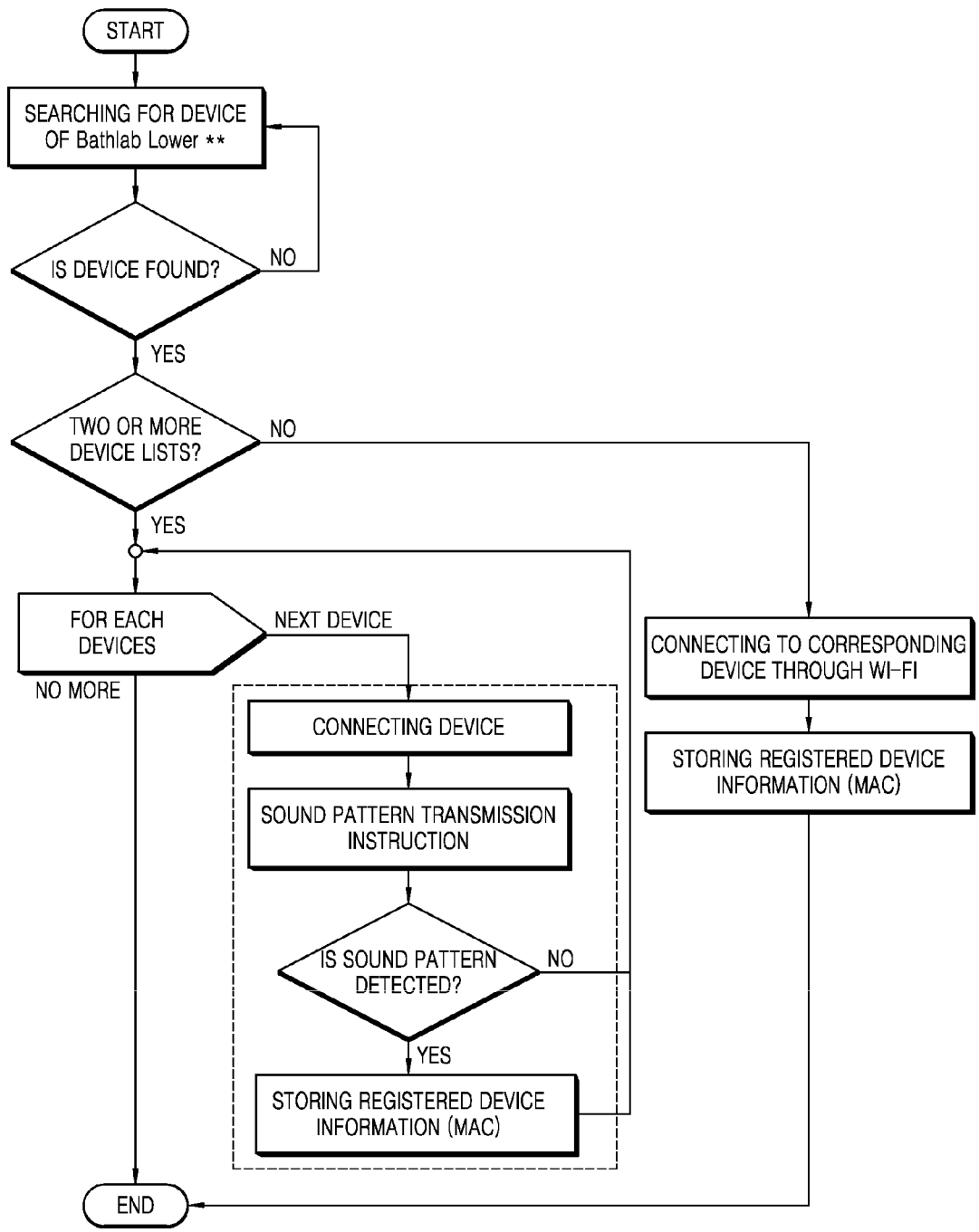
FIG. 19 is a flowchart sequentially showing another method for automatically connecting with another wireless control module in a bathroom space.

FIG. 19 is a flowchart sequentially showing another method for automatically connecting with another wireless control module in a bathroom space.

Referring to FIG. 19, an artificial intelligence device 5000 receives a Zigbee signal in a predetermined period unit to perform an automatic connection operation. In this case, when a Zigbee communication signal is received from any one of the control modules, the artificial intelligence device 5000 is automatically connected based on analysis that the unique ID is a unique ID consisting of a preset pattern string.

When a plurality of Zigbee communication signals are received at the artificial intelligence device 5000, the automatic connection operation is sequentially performed. In this case, in the sequential automatic connection process, a preset operation may be performed to inform a process of connecting with the control module. For example, when the artificial intelligence device 5000 is connected to the control module that has generated the Zigbee communication signal through Zigbee communication, the artificial intelligence device 5000 may transmit a sound transmission instruction to transmit a sound of a preset pattern to the connected control module.

The control module that receives the sound transmission instruction may operate the home appliance controlled by itself to transmit the sound and may transmit the sound transmission instruction execution completion signal back to the artificial intelligence device 5000. The artificial intelligence device 5000 identifies the sound transmission instruction execution completion signal to be connected to the corresponding control module.

As described above, according to the present disclosure, the bathroom facility device may integrate the bathroom furniture with the bathroom appliances, thereby improving user convenience and improving efficiency of space utilization.

In addition, even if bathroom facility devices are disposed in or added to a near field space such as a bathroom for the first time, control modules of bathroom appliances of the bathroom facility devices may be automatically connected to one another through wireless communication, thereby improving user convenience and user satisfaction. The bathroom facility device and the voice recognition-based artificial intelligence device are linked with each other to organically control or smartly manage a plurality of bathroom appliances in association with one another, thereby improving electrical stability of home appliances and improving user satisfaction in convenience.

Figure 20:
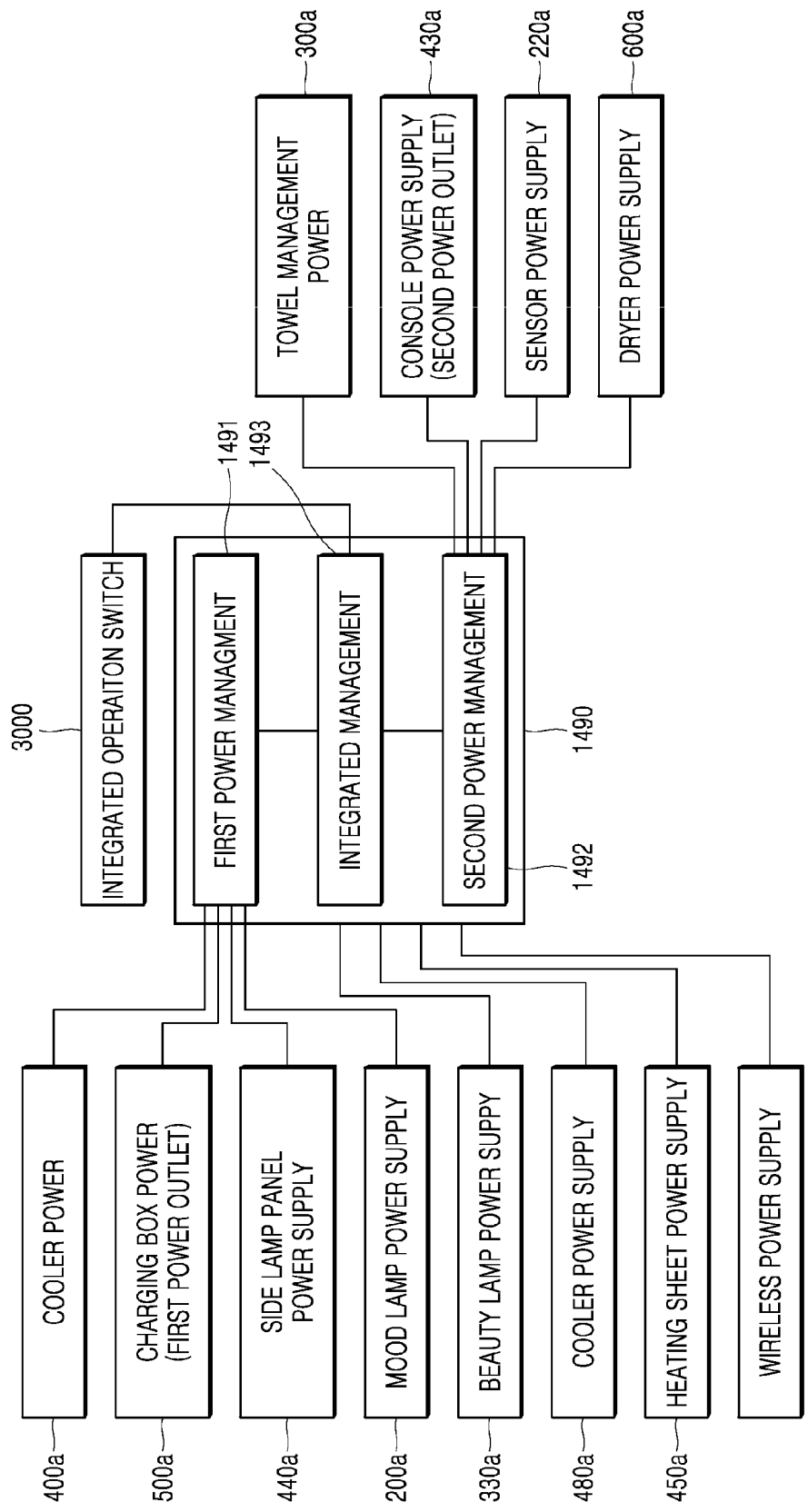
FIG. 20 is a block diagram showing a power management module that manages power of power devices and outlets disposed in each of a sink cabinet device and a mirror cabinet device according to the present disclosure.

FIG. 20 is a block diagram showing a power management module that manages power of power devices and outlets disposed in a sink cabinet device and a mirror cabinet device according to the present disclosure.

A power management module 1490 shown in FIG. 20 includes a first power management 1491, a second power management 1492, and an integrated management 1493.

The first power management 1491 is electrically connected to each of a cooler power supply 400a, a charging box power supply (or a first power outlet 500a), a side lamp panel power supply 440a, a mood lamp power supply 200a, a beauty lamp power supply 330a, a power supply 480a of a cooler, a power supply 450a of a heating sheet, and a power supply 550a of a wireless power supply. The power supply of each of power devices is a power input terminal that receives power through a plug.

The first power management 1491 detects power use and power consumption of each power device in real time through the power supply of each of the power devices disposed in the mirror cabinet device 2000.

If power consumption of at least one of a first power outlet or at least one power device of a cooler 2400, a charging box 2500, a mood lamp panel 2200, a beauty lamp 2330, a cooler, a heating sheet, and a wireless power supply is greater than a preset reference power consumption, the first power management 1491 determines that they are in an over-current or overload state. The first power management 1491 cuts off the power supply of the power supply of the power device with high power consumption or cuts off the power supply in a sequence of the outlet based on the determination that they are in the over-current or overload state.

The second power management 1492 controls on/off of the power supplied to the at least one power device of a towel management 1300 of the sink cabinet device 1000, a console power supply 430a including a second power outlet, a dryer, a sensor, a lamp, and a second power outlet 430.

Specifically, the second power management 1492 is electrically connected to each of the towel management power supply 300a, the console power supply 430a including the second power outlet, the power supply 220a of the sensor, and the power supply 600a of the dryer. As described above, the power supply of each of the power devices is a power input terminal that receives power through the plug.

The second power management 1492 detects power use and power consumption of each of the power devices in real time through the power supply of each of the power devices disposed in the sink cabinet device 1000. If the power consumption of at least one of the towel management 1300, the dryer, the sensor, and the lamp or the second power outlet 430 is greater than the preset reference power consumption, the second power management 1492 determines that they are in an over-current or overload danger state. The second power management 1492 cuts off the power supply of the power supply of the power device with high power consumption and or cuts off the power supply in a sequence of the second power outlet 430 based on the determination that it is in the over-current or overload state.

The integrated manager 1493 integratedly manages the electrical connection (on/off) among the power devices controlled by the first power management 1491 and the second power management 1492. In detail, the integrated manager 1493 receives information on power consumption of each power device disposed in the mirror cabinet device 2000 from the first power management 1491. In addition, the information on the power consumption of each of the power devices disposed in the sink cabinet device 1000 is received from the second power management 1452. The integrated management 1493 monitors the integrated power consumption of the power devices disposed in the mirror cabinet device 2000 and power devices disposed in the sink cabinet device 1000 in real time. The integrated management 1493 may selectively cut off the power supply to the power devices disposed in the mirror cabinet device 2000 or the power devices disposed in the sink cabinet device 1000 according to a preset program.

The integrated manager 1493 transmits, to the integrated operation switch 270, power consumption information of each power device disposed in the mirror cabinet device 2000 and power consumption information of each power device disposed in the sink cabinet device 1000. The integrated management 1493 also transmits, to the integrated operation switch 270, the integrated power consumption information of power devices disposed in the mirror cabinet device 2000 and power devices disposed in the sink cabinet device 1000. The integrated management 1493 supports the integrated power consumption information to be displayed on the display of the integrated operation switch 270.

Figure 21:
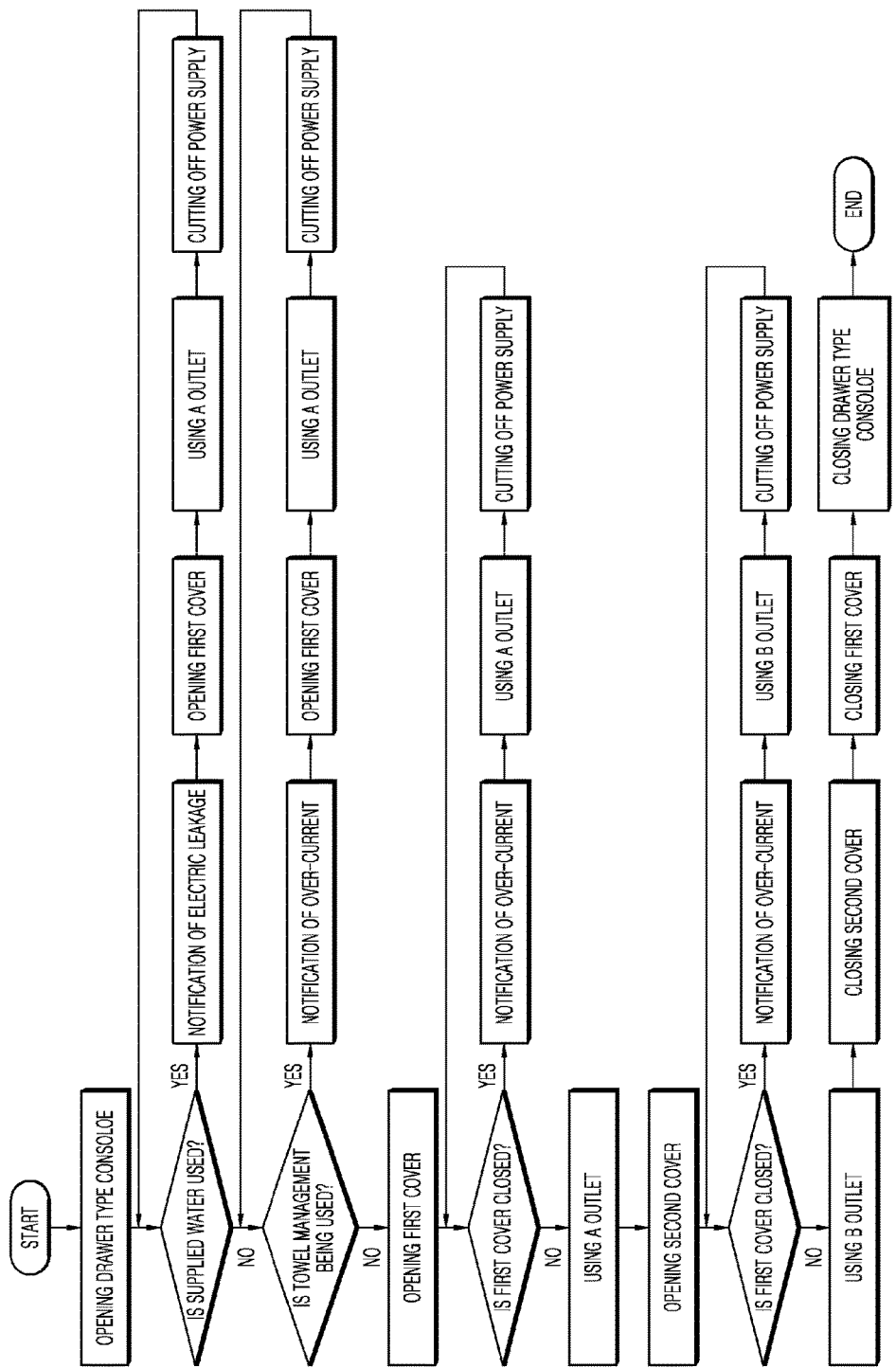
FIG. 21 is a flowchart sequentially showing a power management method of the second power management in FIG. 20.

FIG. 21 is a flowchart sequentially showing a power management method of the second power management in FIG. 20.

As described above, the towel management 1300, the dryer, and the like disposed in the sink cabinet device 1000 are home appliances that use a high current. Hair dryers or heating devices that receive power through a second power outlet 430a of a drawer type console 1400 are all high-current products. In some cases where the power devices and the high-current home appliances disposed in the sink cabinet device 1000 are used at the same time, there is a risk of occurrence of over-current and overload, and thus, power consumption management is further needed.

To this end, the second power management 1452 first determines whether the drawer type console 1400, an outlet cover 1432 (FIG. 6) of the second power outlet 1430 (FIG. 6) are opened. When the outlet cover 1432 of the second power outlet 1430 is opened, the second power management 1452 expects that the high-current product is used to sequentially cut off the powers of the power devices such as the towel management 1300 or the dryer.

For example, as shown in FIG. 6, when the drawer type console 1400 and the outlet cover 1432 of the second power outlet 1430 are open, use of supplied water is first determined. If the outlet cover 1432 of the second power outlet 430 is opened or electric appliances are being used through the second power outlet 430 when the water supply is used, the second power outlet 430 may be turned off due to a risk of electric leakage during water supply.

If the supplied water is not used when the outlet cover 1432 is opened, the second power management 1492 determines power use of the towel management 1300 to detect the over-current or the overload of the towel management 1300 based on prediction that the high-current product is used, and to selectively cut off the power of the power management 1300.

In some cases where a plurality of second power outlets 1430 are provided and a plurality of outlet covers 1432 are also provided, the above-described selective power cut-off operation of the power device is performed in the same manner depending on whether the outlet cover 1432 is opened.

For example, even if a plurality of outlet covers 1432 are also provided, the second power management 1452 determines in real time whether the outlet cover 1432 is opened and monitors the power use of the second power outlet 1430, the use of the towel management 1300 and the dryer. When the at least one outlet cover 1432 is opened during the use of the towel management 1300 and the dryer, the power of the power device such as the towel management 1300 or the dryer is cut off in a predetermined sequence.

According to the present disclosure, the power management device of a bathroom facility device may integrate bathroom furniture with bathroom appliances, thereby improving user convenience and improving efficiency of space utilization. In addition, the power management device monitors the power supply of the plurality of power devices disposed in the bathroom facility device and an overload state of the power outlet in real time and controls the power supply to use the power devices safely to improve reliability thereof.

In addition, the power management device senses and checks the power outlet cover of the sink cabinet device in which the high-current power device is mainly used to automatically cut off the power of the power outlet to prevent occurrence of the electric leakage and the over-current, thereby reducing a risk of electric leakage or the overload and improving the user satisfaction.

Figure 22:
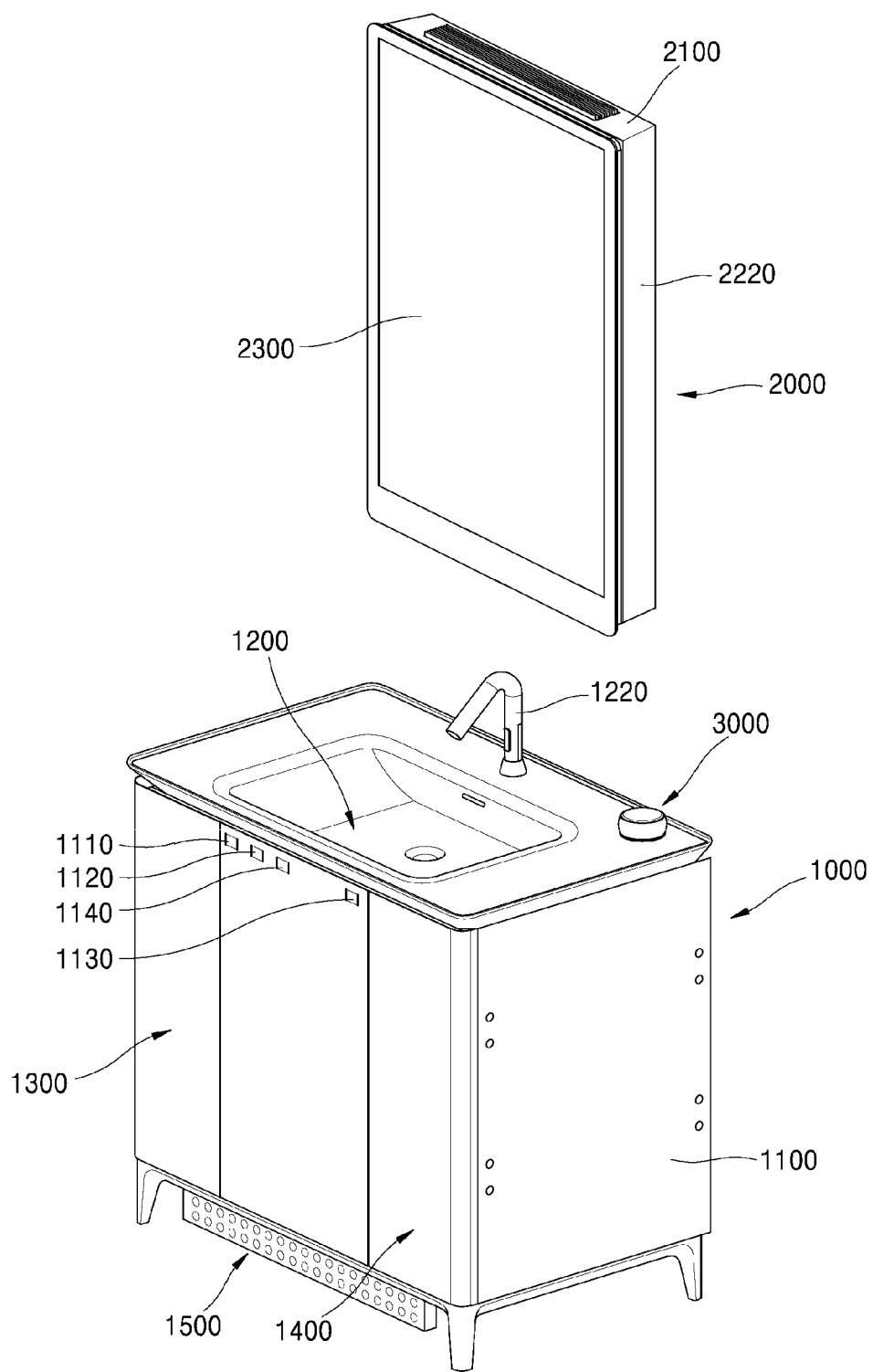
FIG. 22 is a perspective view showing a bathroom facility device including a sink cabinet device and a mirror cabinet device according to the present disclosure.

FIG. 22 is a perspective view showing a bathroom facility device including a sink cabinet device and a mirror cabinet device according to the present disclosure.

As shown in FIG. 22, according to the present disclosure, the bathroom facility device includes a mirror cabinet device 2000 attached to the wall of a bathroom, a sink cabinet device 1000 disposed on the bathroom floor and including a bath sink 1200, and a controller that controls the mirror cabinet device 2000 and the sink cabinet device 1000.

The mirror cabinet device 2000 includes a mirror cabinet body 2100 that defines an accommodation space and a mirror door 2300 disposed on a front surface of the mirror cabinet body 2100 to open and close the mirror cabinet body 2100. A cooler that cools contents to a low temperature and a charging box are disposed in the mirror cabinet body 2100 described below.

In addition, the mirror cabinet body 2100 may include a mood lamp panel 2200 at a side surface of the mirror cabinet body 2100 to illuminate the inside of the bathroom, in particular, the front portion of the mirror cabinet device 2000 with special brightness and color.

A controller is disposed at a side of the mirror cabinet body 2100. The controller controls the mirror cabinet device 2000 and the sink cabinet device 1000 to maintain the bathroom in a comfortable and clean state, and automatically drives the mirror cabinet device 2000 and the sink cabinet device 1000 to use the bathroom conveniently by users.

The controller may have a console box, may be disposed at a side of an inner space of the mirror cabinet body 2100 and may also be directly embedded in the mirror cabinet body 2100. The controller may also be disposed in the sink cabinet device 1000 and may also be disposed in a place outside the mirror cabinet device 2000 and the sink cabinet device 1000, for example, the bathroom wall or the wall in the living room.

The sink cabinet device 1000 includes a sink cabinet body 1100, a bath sink 1200 disposed on the sink cabinet body 1100 and including a faucet 1220, a towel management 1300 disposed in the sink cabinet body 1100 to stores and manages the towels, and a console 1400 disposed in the sink cabinet body 1100 to accommodate small home appliances such as hair dryers or shavers.

The sink cabinet body 1100 includes a temperature sensor 1110 that measures a temperature inside the bathroom, a humidity sensor 1120 that measures humidity in the bathroom, an odor sensor 1130 that measures a degree of odor in the bathroom, and a human body sensing sensor 140 that detects whether a user approaches toward a front of the sink cabinet device 1000 at a front surface thereof.

In this case, the temperature sensor 1110, the humidity sensor 1120, the odor sensor 1130, and the human body sensing sensor 140 may be all disposed in the mirror cabinet device 2000, not in the sink cabinet device 1000, some sensors may be disposed in the sink cabinet device 1000, and some sensors may be disposed in the mirror cabinet device 2000.

The temperature sensor 1110, the humidity sensor 1120, and the odor sensor 1130 may also be disposed at other positions of the bathroom, as well as the mirror cabinet device 2000 and/or the sink cabinet device 1000. For example, the temperature sensor 110 and the humidity sensor 1120 may be disposed on the wall or the ceiling of the bathroom and the odor sensor 1130 may be disposed near a toilet stool with a high degree of odor.

When the temperature sensor 1110, the humidity sensor 1120, and the odor sensor 1130 are disposed in a structure of the bathroom, in addition to the mirror cabinet device 2000 and/or sink cabinet device 1000, an additional operation of attaching the sensor to the wall or the ceiling is needed to install the sensors. In some cases where the temperature sensor 1110, the humidity sensor 1120, and the odor sensor 1130 are disposed in the mirror cabinet device 2000 and/or the sink cabinet device 1000, the mirror cabinet device 2000 and the sink cabinet device 1000 may be disposed without additional operation to detect a bathroom environment.

When the mirror cabinet device 2000 and the sink cabinet device 1000 are connected to each other through an internal communication network such as Bluetooth and the controller and the sensor are disposed at different positions, the information detected by the sensor is transmitted to the controller through the internal communication network.

Figure 23:
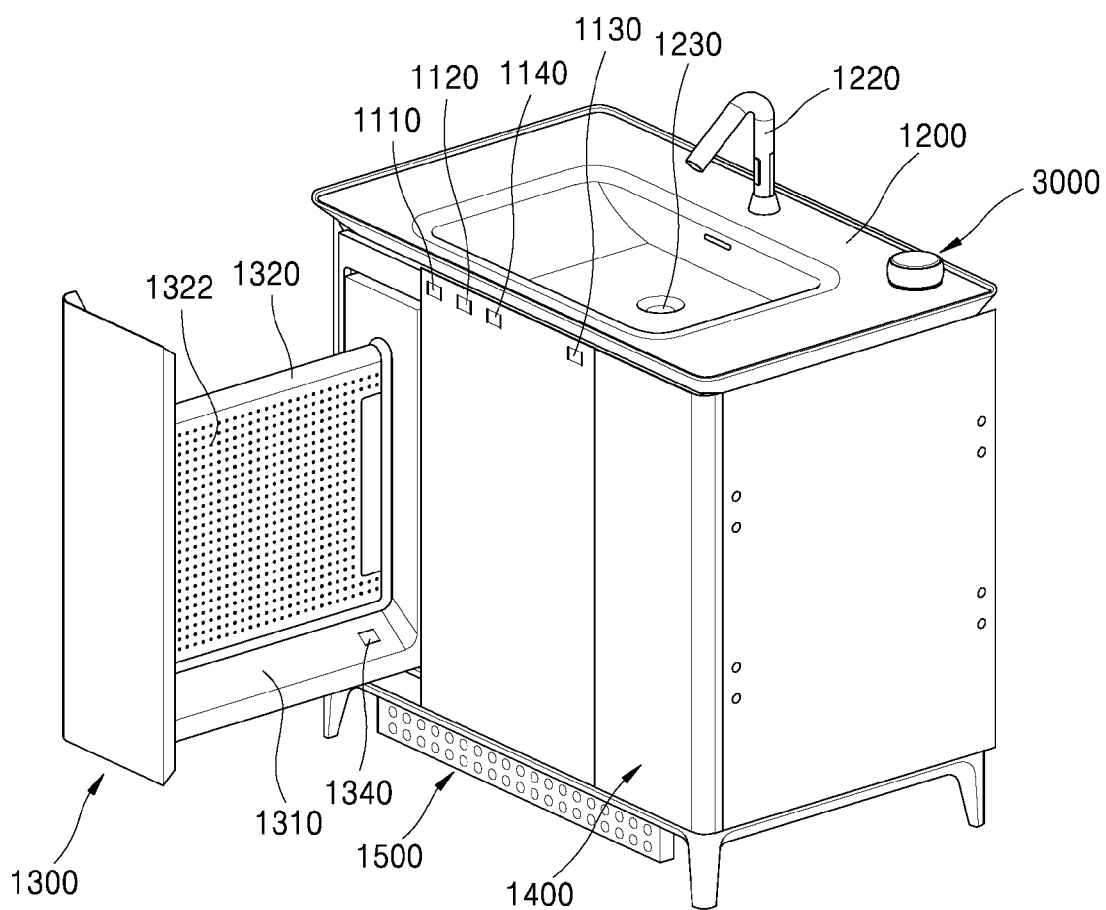
FIG. 23 shows a towel management pulled out from a sink cabinet device.
Figure 24:
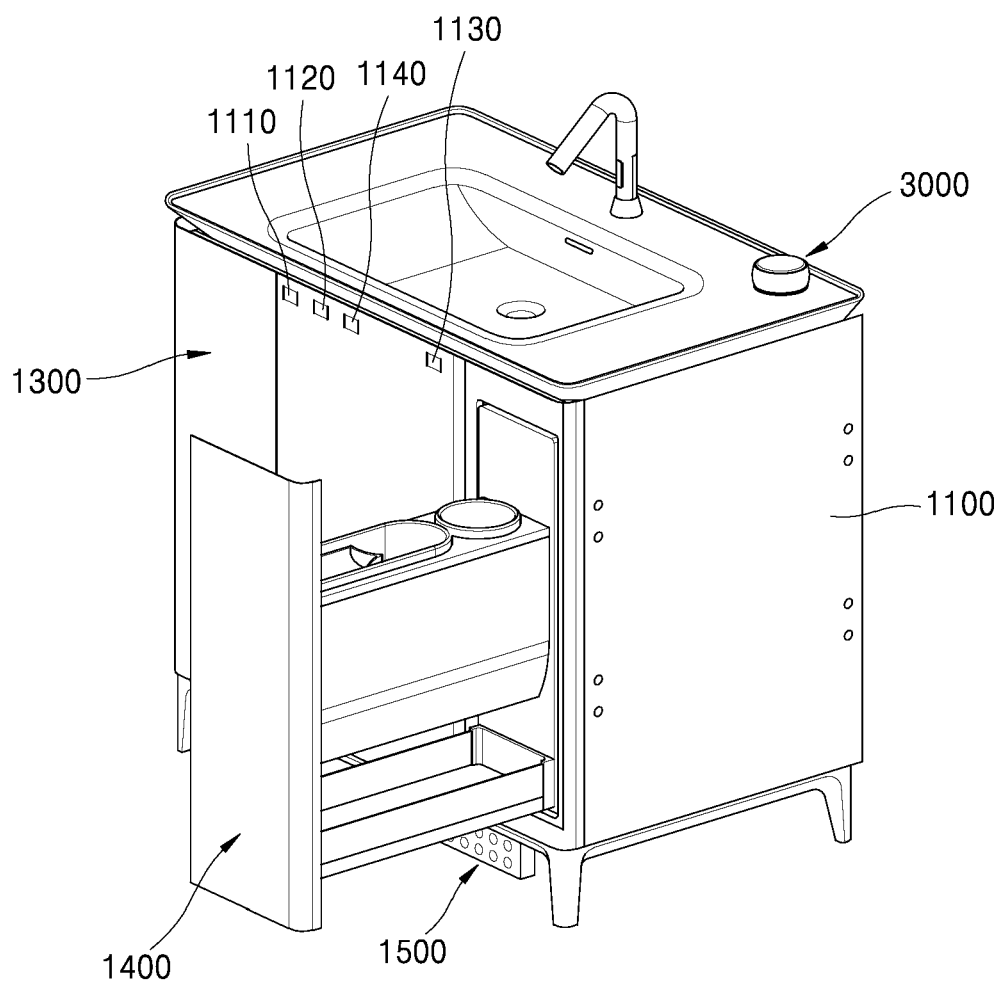
FIG. 24 shows a drawer type console pulled out from a sink cabinet device.

FIGS. 23 and 24 respectively show a sink cabinet device 1000 of a bathroom facility device according to an embodiment of the present disclosure. FIG. 23 shows a towel management pulled out from a sink cabinet device 1000. FIG. 24 shows a drawer type console pulled out from a sink cabinet device 1000.

As shown in FIG. 23 and FIG. 24, the sink cabinet device 1000 may be disposed on the floor of the bathroom and may be integrated with a bath sink 1200 including a faucet 1220. The sink cabinet device 1000 may include a sink cabinet body 1100, a bath sink 1200 disposed on the sink cabinet body 1100, a drawer type towel management 1300 disposed in the sink cabinet body 1100, a drawer type console 1400, and a hot air supplier 1500 disposed below the sink cabinet body 1100 to discharge heated hot air.

The bath sink 1200 includes a bath sink body 1210, a faucet 1220, and a pop-up valve 1230 disposed at a bottom of the bath sink body. The faucet 1220 of the bath sink 1200 is connected to a water supply pipe and the pop-up valve 1230 is connected to a drain pipe to supply and discharge the water. In this case, the water supply pipe to which the faucet 1220 is connected may include a cold water pipe and a hot water pipe.

The faucet 1220 includes an additional handle to adjust an amount and a temperature of discharged water by operating the handle by the user. In addition, an electronic valve that controls the faucet 1220 may be provided to electronically control the temperature and the amount of water supplied through the faucet 1220.

The sink cabinet body 1100 includes a human body sensing sensor 1140 to detect whether the user is located in front of the sink cabinet body 1100. A position sensing device (PSD) or an infrared sensor may be used as the human body sensing sensor 1140, but the sensors are not limited thereto and various types of sensors may be used.

The human body sensing sensor 1140 may be disposed in the mirror cabinet device 200. As the mirror cabinet device 2000 is disposed at a predetermined height from the floor, the human body sensing sensor 1140 disposed in the mirror cabinet device 2000 is also disposed at a predetermined height from the floor. When the human body sensing sensor 1140 is disposed in the mirror cabinet device 2000, the human body sensing sensor 1140 may not be able to detect a small user such as a child, and thus, the human body sensing sensor 1140 is preferably disposed in the sink cabinet body 1100.

The towel management 1300 and the console 1400 are disposed in the sink cabinet body 1100. In the figure, the towel management 1300 and the console 1400 are disposed on the left and right sides of the sink cabinet body 1100, respectively, but the towel management 1300 and the console 1400 are not disposed at a specific position but may be provided at various positions as necessary. For example, the towel management 1300 and the console 1400 may be disposed on the right and left sides of the sink cabinet body 1100, respectively. In addition, in the case of a large sink cabinet device 1000 having a relatively long length, a plurality of towel managements 1300 or consoles 1400 may be disposed or at least one additional accommodating drawer may be disposed.

The type of each of the towel management 1300 and the console 1400 may also be a drawer type, but is not limited thereto, and may have various shapes as necessary.

The towel management 1300 heats and dries the stored towels. The towel management 1300 includes a towel management body 1310 connected to and pulled out from the sink cabinet body 1100 and a heat transfer plate 1320 on which the towel is supported and that transfers heat to towels.

The heat transfer plate 1320 is made of metal having a high thermal conductivity, defines a cavity, and has an 'inversed U-shaped' cross section. The heated air is supplied into the heat transfer plate 1320 to heat the heat transfer plate 1320. In addition, the heat transfer plate 1320 defines a plurality of cavities and heated air introduced into the heat transfer plate 1320 is supplied to the towel supported on the heat transfer plate 1320 to smoothly dry the towel.

Although not shown in the figure, a heater and a blower are disposed in the sink cabinet body 1100. In this case, a first flow path (not shown) is defined between the heater and the blower, and the heat transfer plate 1320 and the hot air heated by the heater is supplied into the heat transfer plate 1320 to dry the towels by increasing a temperature inside the towel management 1300.

A towel humidity sensor 1340 may be disposed in the towel management 1300. The towel humidity sensor 1300 measures humidity of the towel accommodated in the towel management 1300 to drive and stop the driving of the heater and the blower disposed inside the sink cabinet body 1100. For example, if the humidity of the towel inside the towel management 1300 is greater than or equal to set humidity, the towel manager 300 dries the towel by driving the heater and the blower, and as the towels are completely dried if the humidity of the towel is equal to or less than the set humidity, the towel manager 300 stops the driving of the heater and the blower.

In the figure, the towel humidity sensor 1340 is disposed below the heat transfer plate 1320, but is not limited to that position. If only the humidity of the towel accommodated in the towel management 1300 may be accurately measured, the towel humidity sensor 1340 may be disposed at any position inside the towel management 1300. For example, the towel humidity sensor 1340 may be disposed above the heat transfer plate 1320 or may be disposed on the wall of the towel management 1300.

A hot air supplier 1500 disposed below the sink cabinet body 1100 discharges the hot air toward the floor of the bathroom to increase the temperature of the bathroom or dries the user's wet body after taking a shower in a shower booth. In this case, the hot air supplier 1500 is connected to the heater and the blower disposed inside the sink cabinet body 1100 through a second flow path to supply the hot air heated by the heater to the hot air supply 1500 by the blower.

As the hot air supplier 1500 may dry the wet body of the user who has finished the shower, the hot air supplier 1500 may supply the hot air only to the user who has finished the shower in the sink cabinet device 1000 but may not supply the hot air to the user who does not take the shower. Whether the user approaching the sink cabinet body 1100 is a user who took a shower is determined by detection of driving of a shower and detection of the human body sensing sensor 1140 disposed on the sink cabinet body 1100. Water is supplied to the shower through the supply pipe when the user takes a shower. Therefore, taking a shower by the user is detected by detecting the driving of the valve disposed in a water supply pipe of the shower and the human body sensing sensor 1140 determines that the user after taking a shower approaches the sink cabinet device 1000 when the user's approach is detected by the human body sensing sensor 1140 within a preset period of time after the shower. The hot air supplier 1500 may dry the user's wet body by supplying the hot air when the user's approach who has finished the shower.

If the driving of a shower water supply valve is not detected and the user's approach is only detected by the human body sensing sensor 1140, the hot air supply 1500 does not discharge the hot air because the approaching user is not a user who finished taking a shower, but a user using a bathroom.

The hot air may be supplied for a period of time during which the wet body of the user may be dried. In this case, the drying period of time during which the user's wet body is dried is calculated under various conditions to determine a hot air supply time. In addition, the hot air is set to be supplied with more amount than during the drying time period for which the wet body of the user is dried to dry the wet body and dry the floor or the rug wet due to moisture dropped from the wet body.

Although not shown in the figure, both a first flow path to supply the hot air to the towel management 1300 and a second flow path to supply the hot air to the hot air supply 1500 are connected to a heater and a blower disposed inside the sink cabinet body 1100. In this case, an electronic valve is disposed in each of the first flow path and the second flow path to open and close passages of the first flow path and the second flow path. For example, when the towel management 1300 is operated according to towel humidity detection result of the towel humidity sensor 1340, an electronic valve of the first flow path is opened and an electronic valve of the second flow path is closed to supply the hot air to the towel management 1300. In addition, when the approach of the user who has finished the shower is detected, the electronic valve of the first flow path is closed and the electronic valve of the second flow path is opened to supply, by the hot air supplier 1500, the hot air to the user.

A console 1400 accommodates and stores small home appliances such as hair dryers or curling irons and supplies power to the small home appliances. The console 1400 may be separated from the sink cabinet body 1100 and includes a console body 1410 and a power outlet 1430 disposed at a side of the console body 1410.

The mirror cabinet body 2100 of the mirror cabinet device 2000 includes a controller. The controller checks the environment inside the bathroom in real time through a sensor disposed in the sink cabinet device 1000 and drives the mirror cabinet body 2100 and the sink cabinet device 1000 to maintain inside of the bathroom cleanly and comfortably and conveniently use the facilities by the user.

The controller may include hardware components, software components, and a combination of hardware components with software components. For example, various types of control devices such as processors, controllers, arithmetic logic units (ALUs), digital signal processors, microcomputers, field programmable arrays, programmable logic units (PLU), microprocessors, and the like may be used as the hardware components to execute and respond to the instructions.

The controller may also execute an operating system (OS) and one or more software applications executed through the operating system. It may be seen that the controller may include a plurality of processing elements and/or a plurality of types of processing elements. For example, the controller may include a plurality of processors, or one processor and one controller.

The software of the controller may include a computer program, a code, instructions, or a combination thereof.

The controller controls the environment inside the bathroom such as the temperature and the humidity and controls the driving of facilities disposed in the bathroom, to conveniently use, by the user, the bathroom in a comfortable environment. For example, the controller measures the temperature and the humidity inside the bathroom to maintain the set temperature and humidity inside the bathroom, and automatically implements the sink cabinet device 1000 and the mirror cabinet device 2000 as necessary to improve user convenience.

In addition, the controller monitors the state of the bathroom and the state of the bathroom facility device and informs the user of the states. For example, the controller detects the environment of the bathroom such as temperature and humidity in real time and informs the user using a specific device such as a display or a mobile phone. Further, the controller determines a current state of the bathroom facility, for example, an operation state of the facility and informs the user of the state.

As described above, according to the present disclosure, the bathroom control system determines the environment in the bathroom and the state of the facility in real time and adjusts the environment inside the bathroom as necessary and drives the facility to use, by the user, the bathroom in an optimal state.

Figure 25:
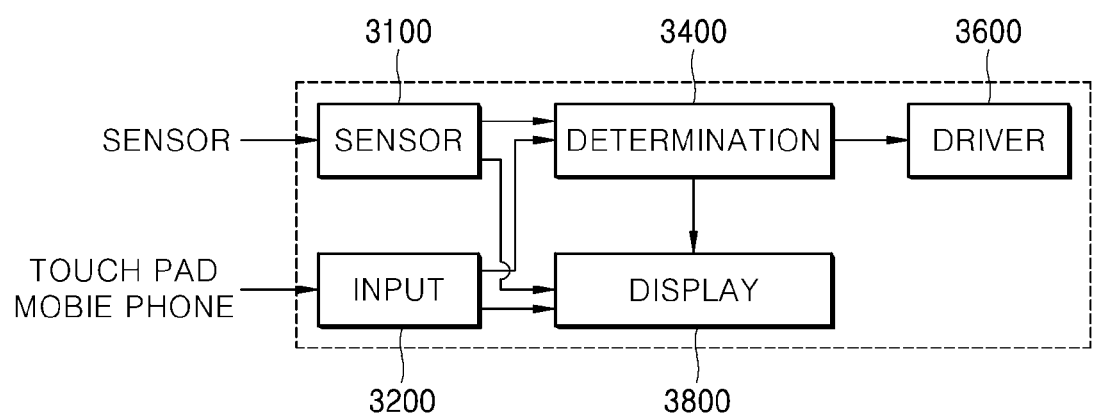
FIG. 25 is a block diagram showing a controller of a bathroom facility device according to the present disclosure in detail.

FIG. 25 is a block diagram showing a controller of a bathroom facility device according to the present disclosure in detail.

As shown in FIG. 25, the controller includes a sensor 3100 that detects an environment inside a bathroom, a use of bathroom by a user, and a state of a facility by a sensor disposed in the bathroom, an input 3200 that directly inputs instructions by the user for use of bathroom, a determining portion 3400 that determines whether to control the environment of the bathroom and to use a facility of the bathroom based on information and according to instructions input by the sensor 3100, a driver 3600 that drives various types of facilities based on the determination of the determining portion 3600, and a display 3800 that displays the environment in the bathroom and an operation state of the facilities to inform the user of the state.

The sensor 3100 senses environment such as a temperature, humidity, and a degree of odor of the bathroom, presence of the user, shower of the user, humidity in and an operation state of the towel management 1300, an operation state of a charging box 2500, and an opening and closing state of a cosmetic cooler 2400 based on information input by various types of sensors disposed in the bathroom.

The instruction of the user is directly input to the input 3200. For example, the user may input bathroom use plans and a scheduled time of use and may also input an operation start instruction of the facility in the bathroom. In this case, the input 3200 may be disposed in the bathroom or may be disposed in the living room spaced apart from the bathroom. In addition, the input 3200 may be connected to a user's mobile phone through a network to input, by the user, instructions through a dedicated application of the mobile phone.

The determining portion 3200 determines whether to control the environment inside the bathroom such as the temperature, the humidity, and the degree of odor based on various pieces of information sensed by the sensor 3100 and to drive the facility in the bathroom such as the sink cabinet device 1000 and the mirror cabinet device 2000. In this case, the determining portion 3200 compares sensed information, for example, a measured value with a set value stored inside to determine the adjustment of the environment in the bathroom and the driving of the facility.

The determining portion 3400 also determines the adjustment of the environment in the bathroom and the driving of the facility according to the user's instructions. For example, when the user inputs a bathroom use instruction to take a shower, the determining portion 3400 determines whether to operate a heater of the bathroom based on temperature information of a bathroom input by a temperature sensor disposed in the bathroom. The determining portion 3400 also determines whether the towel is suitable for use by the user after the shower based on the humidity of the towel accommodated in the towel management 1300, which is input by a towel humidity sensor 1340 disposed in the towel management 1300. The determining portion 3400 also determines whether to dry the wet body of the user who has finished the shower and decides whether to turn on the beauty lamp for the make-up of the user.

The driver 3600 drives a heater, a dehumidifier, a ventilation system, a towel dryer, a hot air supply, a charger, and a beauty lamp in the bathroom based on the determination of the determining portion 3400.

The display 3600 displays various pieces of information to inform the user of the information. The information displayed on the display 3600 may include various pieces of information on the environment and facilities inside the bathroom, user's instruction, presence or absence of the user sensed by the sensor 3100. The display 3600 may be a display disposed in a bathroom, for example, a mirror door 2300 on a front surface of the mirror cabinet body 2100, may also be a display disposed in the living room, and mal also be a mobile phone of the user. The display 3600 may also be a speaker that informs the information through a warning sound or a synthesized voice.

Each of components of the controller is described below in more detail.

Figure 26:
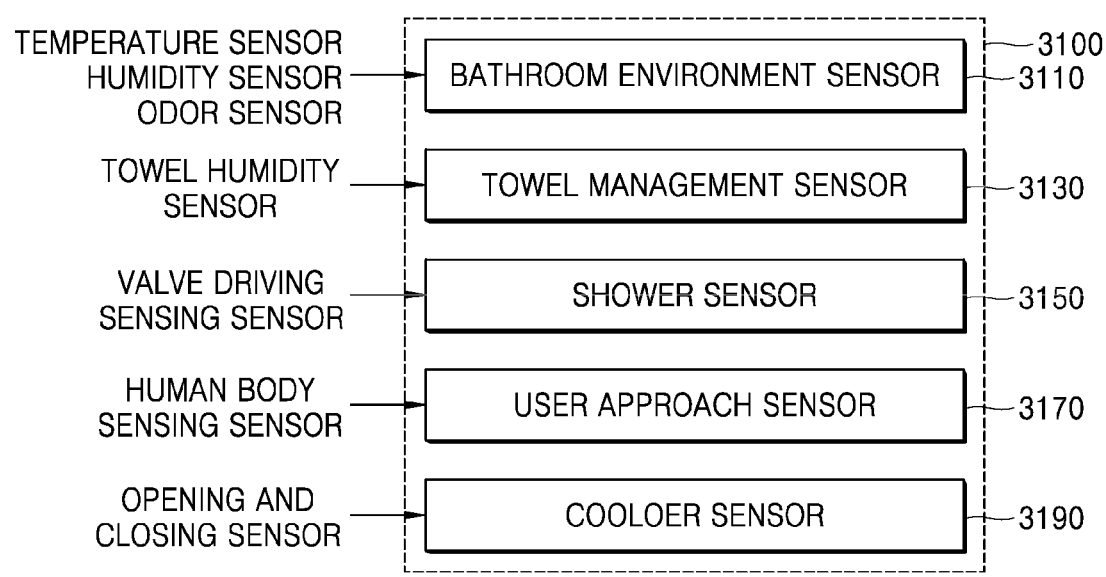
FIG. 26 is a block diagram showing a sensor of a controller of a bathroom facility device according to the present disclosure.

FIG. 26 is a block diagram showing a sensor 3100 of a controller of a bathroom facility device according to the present disclosure.

As shown in FIG. 26, the sensor 3100 of the controller includes a bathroom environment sensor 3110 that senses an environment in the bathroom by a sensor disposed in the bathroom, a towel management sensor 3130 that senses humidity of a towel accommodated in a towel management 1300 by a towel humidity sensor 1340 disposed in the towel management 1300, a shower sensor 3150 that senses shower of a user based on a driving of a valve of a shower, a user approach sensor 3170 that detects user's approach by a human body sensing sensor 1120 disposed in a sink cabinet device 1000 (or a mirror cabinet device 2000), and a cooler sensor 3190 that senses a state of a cooler 2400 by an opening and closing sensor that detects the opening and closing of a cosmetic cooler 2400.

The bathroom environment sensor 3110 detects a temperature, humidity, and an odor inside the bathroom. The temperature, the humidity, and the odor of the bathroom are sensed by a temperature sensor, a humidity sensor, and an odor sensor disposed in the bathroom, respectively. The temperature sensor, the humidity sensor, and the odor sensor are not limited to a specific sensor, but all currently known sensors may be used.

The shower sensor 3150 detects that the user takes the shower by detecting that water is supplied through a shower water supply pipe. The shower water supply pipe includes a valve that opens and closes the water supply pipe and a valve driving sensing sensor that detects driving of the valve. Therefore, the shower sensor 3150 senses opening of the valve through the valve driving sensing sensor to detect water supply to the shower, thereby detecting that the user takes a shower.

The user approach sensor 3170 senses a user's approach toward the sink cabinet device 1000 (or the mirror cabinet device 2000) through the human body sensing sensor 1140. In this case, as the human body sensing sensor 1140 detects the human body only within a set distance, the human body sensing sensor 1140 may detect the user's approach only when the user approaches within a set distance from the sink cabinet device 1000.

The result detected by the user approach sensor 3170 is used together with the detection result of the shower sensor 3150, rather than being used alone. For example, as the user approach sensor 3170 functions to detect the approach of the user who has finished the shower, the user approach sensor 3170 does not determine whether the user whose approach is determined is a user who has finished the shower or a user who does not take a shower when being used alone. Therefore, the shower sensor 3150 detects the user's shower and the user approach sensor 3170 detects the approach of the user continuously (or at regular intervals) to determine the approach of the user who has finished the shower.

The cooler sensor 3190 detects the opening and closing of the cooler 2400 by an opening and closing sensor 2440 disposed in the cooler 2400. Opening a cosmetic cooler 2400 refers to using cosmetics by a user, that is, putting on make-up by the user. The detection of the opening and closing of the cooler 2400 by the cooler sensor 3190 refers to putting on the make-up by the user.

Figure 27:
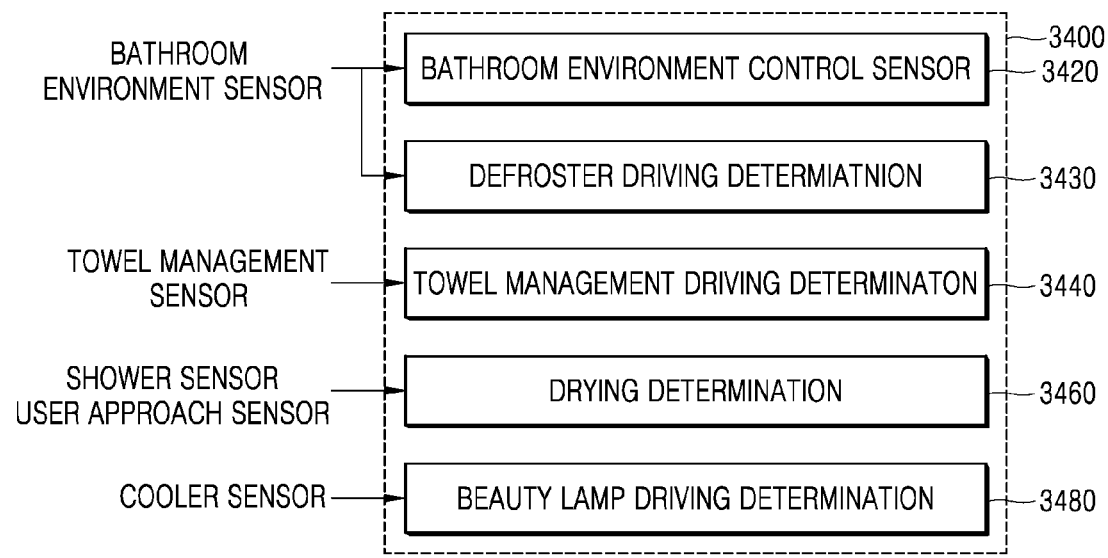
FIG. 27 shows a determining portion of a controller of a bathroom facility device according to the present disclosure.

FIG. 27 shows a determining portion 3400 of a controller according to the present disclosure.

As shown in FIG. 27, the determining portion 3400 of the controller includes a bathroom environment control determining portion 3420 that determines whether to control a bathroom environment based on information input through a bathroom environment sensor 3110, a defrosting driving determining portion 3430 that determines driving of a defrost sheet of an exterior mirror and an interior mirror of a mirror cabinet device 2000 based on humidity information input through the bathroom environment sensor 3110, a towel management driving determining portion 3440 that determines driving of the towel management 1300 based on information input through the towel management sensor 3130, a drying determining portion 3460 that determines drying of a user who has finished a shower, the bathroom floor, and a rug based on information input through the shower sensor 3150 and the user approach sensor 3170, and a beauty lamp driving determining portion 3480 that determines driving of a beauty lamp need to put on make-up by the user based on information input by the cooler sensor 3190.

The bathroom environment control determining portion 3420 determines that, if a temperature, humidity and a degree of odor of the bathroom input by the bathroom environment sensor 3100 exceeds a set temperature, humidity, and degree of odor, the bathroom environment is needed to be improved and determines the adjustment of the bathroom environment.

The defroster driving determining portion 3420 determines that fogging or water drops on an interior mirror and an exterior mirror may be removed and determines the driving of a defroster, if the humidity of the bathroom input by the bathroom environment sensor 3100 is greater than set humidity, for example, humidity configured such that fogging or water drops are generated on the mirror.

The drying determining portion 3460 determines whether to dry the wet body of the user who has finished the shower and to dry the floor and/or a rug wet due to water drops falling from the wet body. In this case, the drying determining portion 3560 determines the drying of the wet body, the floor/the rug based on the user's shower detection result detected by the shower sensor 3150 and the user's approach detection result detected by the user approach sensor 317.

The beauty lamp driving determiner 3480 determines that the user intends to start the makeup based on the opening information of the cooler 2400 input by the cooler sensor 3190 and determines the driving of the beauty lamp for makeup.

Figure 28:
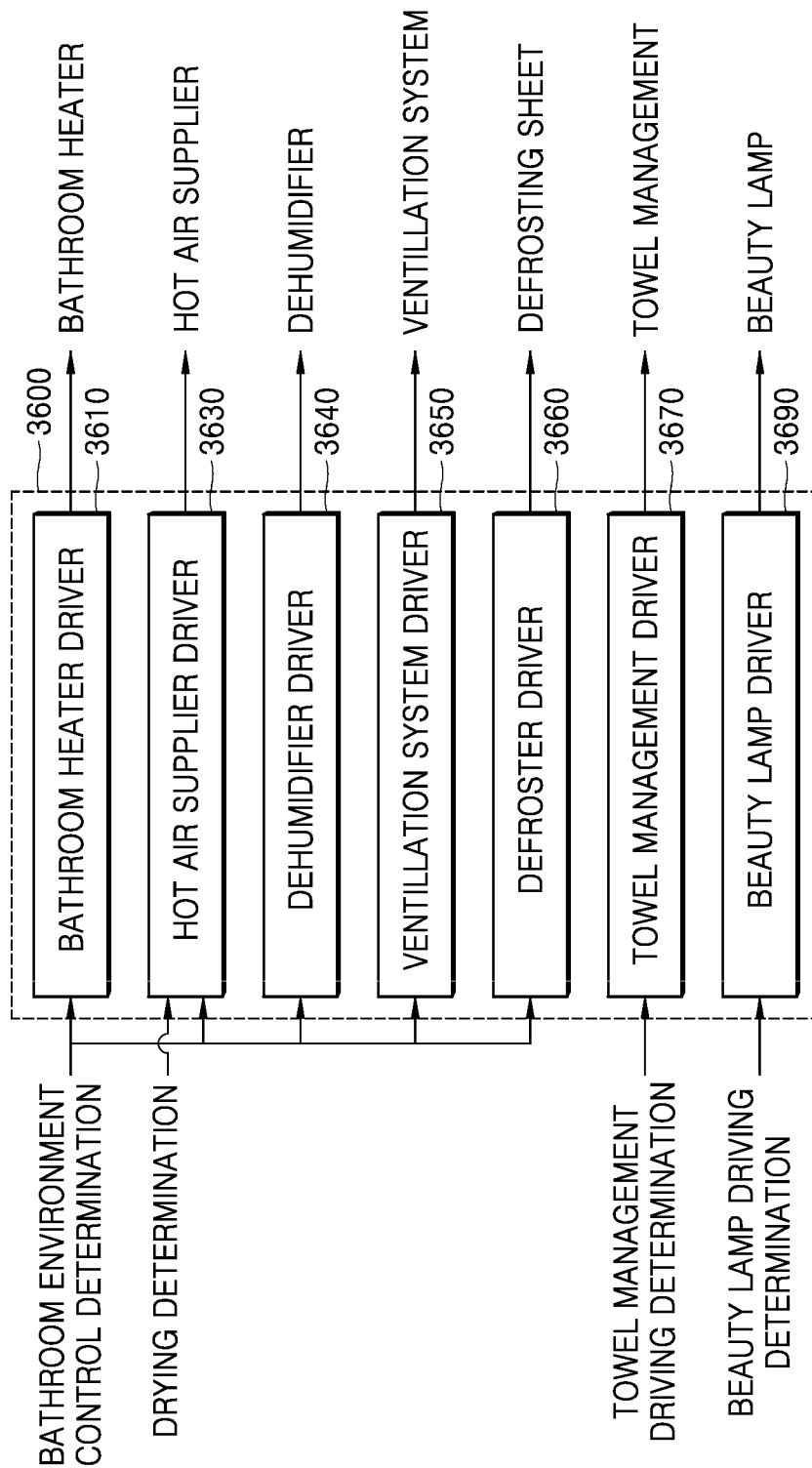
FIG. 28 is a block diagram showing a driver of a controller of a bathroom facility device according to the present disclosure.

FIG. 28 is a block diagram showing a driver 3600 of a controller according to the present disclosure.

As shown in FIG. 28, the driver 3600 includes a bathroom heater driver 3610 that drives a heater disposed in a bathroom and controls a temperature of the bathroom, a hot air supplier driver 3630 that drives a hot air suppler 1500 of a sink cabinet device 1000, a dehumidifier driver 3640 that drives a dehumidifier disposed in the bathroom, a ventilation system driver 3650 that drives a ventilation system that ventilates the bathroom, a defroster driver 3660 that drives a defrosting sheet disposed in a mirror, a towel management driver 3670 that drives a towel management 1300 that drives accommodated towels, and a beauty lamp driver 3690 that drives a beauty lamp 2330 of a mirror cabinet device 2000.

The bathroom heater driver 3610 drives the heater in the bathroom according to instructions of a bathroom environment control determining portion 3420 and increases a temperature in the bathroom to a set temperature. The hot air supply driver 3630 also supplies hot air to the inside of the bathroom according to the instructions of the bathroom environment control determining portion 3420 to increase the temperature inside the bathroom to the set temperature.

For example, the bathroom heater driver 3610 or the hot air supplier driver 3630 may independently drive the bathroom heater or the hot air supply 1500 to raise a bathroom temperature to the set temperature, and the bathroom heater driver 3610 and the hot air supplier driver 3630 simultaneously drive the bathroom heater and the hot air supplier 1500 to rapidly increase the bathroom temperature to the set temperature.

In addition, the hot air supplier driver 3630 drives the hot air supplier 1500 according to the instructions of the drying determining portion 3460 and supplies hot air to the user near the sink cabinet device 1000 to dry the user's wet body, the wet bathroom floor and rug.

The defroster driver 3660 drives the defrosting sheet according to the instructions of the defroster driving determining portion 3430. The defrosting sheet includes a heat transfer sheet attached to the interior mirror or the exterior mirror of the mirror cabinet device 2000. Therefore, the defroster driver 3600 may apply current having a set magnitude to the defrosting sheet and may increase the temperature of the defrost sheet to remove the fogging or the water drops generated on the interior mirror and the exterior mirror.

The towel management driver 3670 drives the towel management 1300 according to the instructions of the towel management driving determining portion 3440. The towel management 1300 may dry the towel as the hot air is supplied from the heater and the blower inside the sink cabinet body 1100 to the heat transfer plate 1320, and thus, driving the towel management 1300 refers to driving the heater and the blower in the cabinet body 1100.

Meanwhile, the towel management 1300 may dry the towel as the hot air is supplied into the heat transfer plate 1320 from the heater and the blower inside the sink cabinet body 1100 through a first flow path. In addition, the hot air supplier 1500 also receives the hot air from the heater and the blower inside the sink cabinet body 1100 through a second flow path. Accordingly, the driving of the hot air supply 1500 by the hot air supplier driver 3630 and the driving of the towel management 1300 by the towel management driver 3670 are performed by driving the heater and the blower in the sink cabinet body 1100 and opening an electronic valve of the first flow path and an electronic valve of the second flow path.

As described above, according to the present disclosure, the bathroom facility device includes a controller that monitors the environment inside the bathroom and adjusts it to a set environment, thereby maintaining an interior of the bathroom comfortably and cleanly.

In addition, the controller monitors driving states of the sink cabinet body 1100 and the mirror cabinet device 2000 disposed in the bathroom and automatically drives the devices to use, by the user, the bathroom comfortably.

A control method of the bathroom according to an embodiment of the present disclosure is described below in detail with reference to the accompanying drawings.

Figure 29:
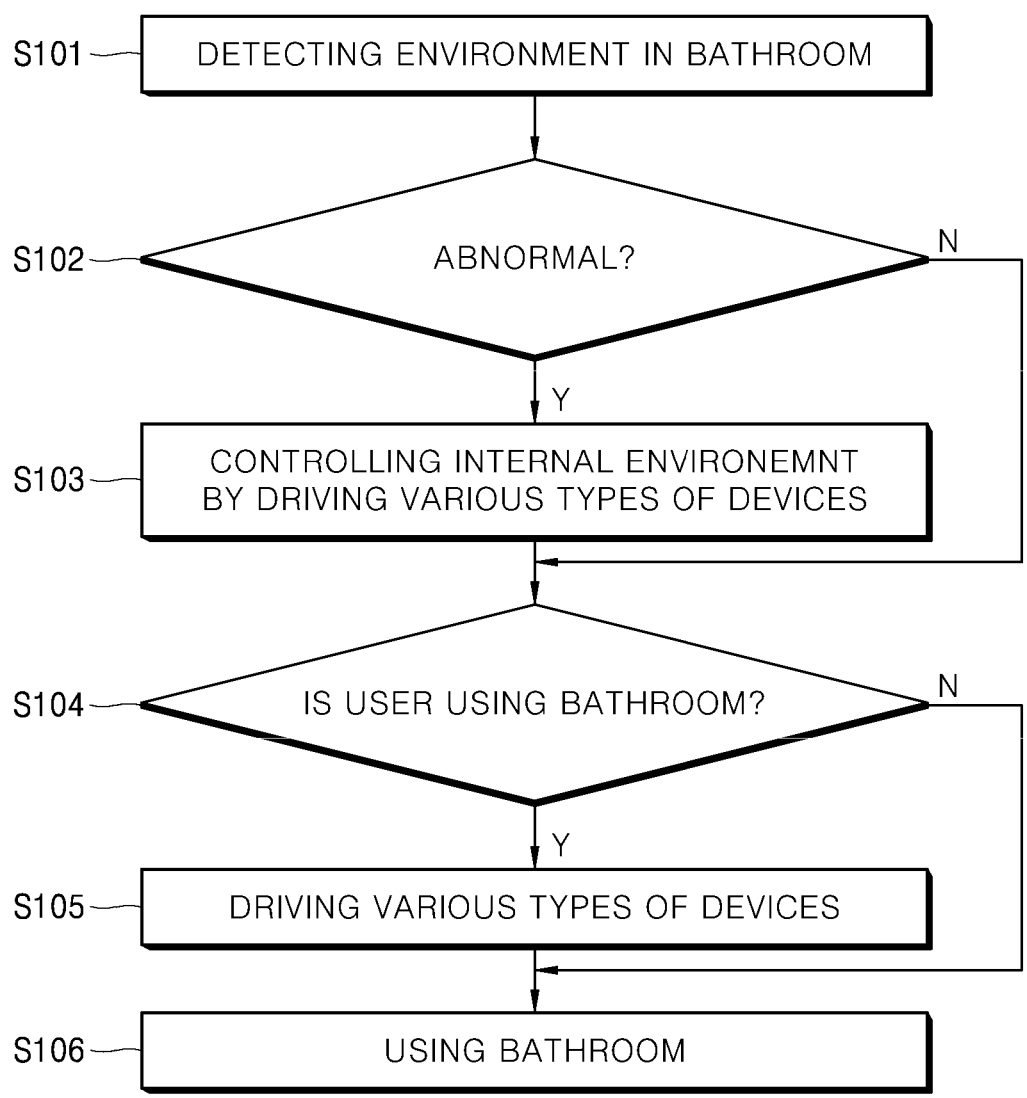
FIG. 29 is a flowchart showing a schematic control method of a bathroom according to the present disclosure.

FIG. 29 is a flowchart showing a schematic control method of a bathroom according to the present disclosure.

As shown in FIG. 29, a temperature sensor, a humidity sensor, and an odor sensor disposed in a sink cabinet body 1100 disposed inside the bathroom detect a bathroom environment such as a temperature, humidity, and an odor in the bathroom (S101).

If an abnormality occurs in the detected bathroom environment, for example, when the bathroom temperature is lower than a set temperature, or the humidity is higher than set humidity, or an odor level is greater than a set odor level, it is determined that the abnormality has occurred in the bathroom environment (S102) and various types of facilities (e.g., a heater and a hot air supplier, a dehumidifier, a ventilation system, and the like) disposed in the bathroom are driven to adjust the internal environment to a set environment (S103).

In addition, if it is detected that the user is using the bathroom (S104), various types of facilities inside the bathroom are driven to allow a bathroom environment to be suitable for the user to use the bathroom (S105 and S106).

In this case, the detection of the use of bathroom by the user may be determined by user's instruction to use the bathroom, the detection of the human body sensing sensor 1140, and the use of a faucet and a shower.

Figure 30:
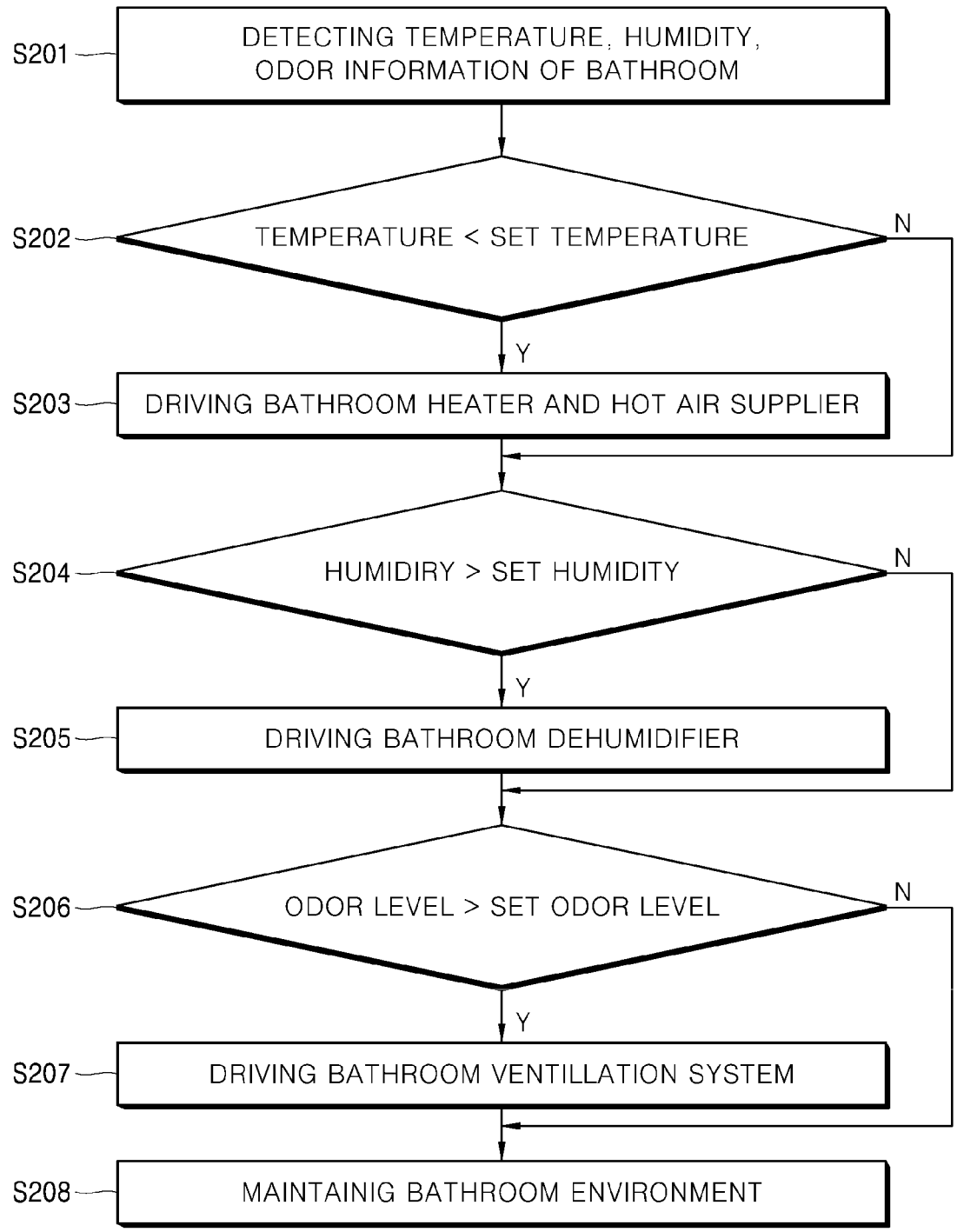
FIG. 30 is a flowchart showing a control method for controlling a bathroom environment in detail.

FIG. 30 is a flowchart showing a control method for controlling an environment of a bathroom in detail.

As shown in FIG. 30, a temperature sensor 1110, a humidity sensor 1120, and an odor sensor 1140 disposed in a sink cabinet device 1000 of a bathroom measure a temperature, humidity, and a degree of odor of an interior of a bathroom, respectively. (S201).

Subsequently, if the measured bathroom temperature is lower than a set temperature (S202), a heater disposed in the bathroom and a hot air supplier 1500 disposed below the sink cabinet device 1000 are driven to increase a temperature to a set temperature (S203).

If the measured humidity of the bathroom is higher than the set humidity (S204), a dehumidifier disposed in the bathroom is driven to lower the humidity than set humidity (S205).

In addition, if the measured odor level of the bathroom is higher than a set odor level (S206), the inside of the bathroom is ventilated by driving a ventilation system disposed in the bathroom to remove the odor, thereby maintaining a comfortable and clean bathroom environment (S207 and S208).

Meanwhile, in the drawings and the above description, the bathroom environment is controlled in a sequence of temperature control, humidity control, and the odor removal of the bathroom, but the bathroom environment control of the present disclosure is not limited to the above sequence, but three control processes may be performed in various sequences and may be performed at the same time.

FIGS. 31 to 34 respectively show controlling a bathroom by driving a facility disposed in a bathroom in a control system according to the present disclosure.

FIGS. 31 to 34 show different control methods, but two or more control methods among the control methods are combined into one continuous or simultaneous control method (i.e., a control method for executing two or more control continuously or simultaneously). Therefore, the steps of the control methods shown in FIGS. 31 to 34 are not given in separate sequence but in successive sequence.

Figure 31:
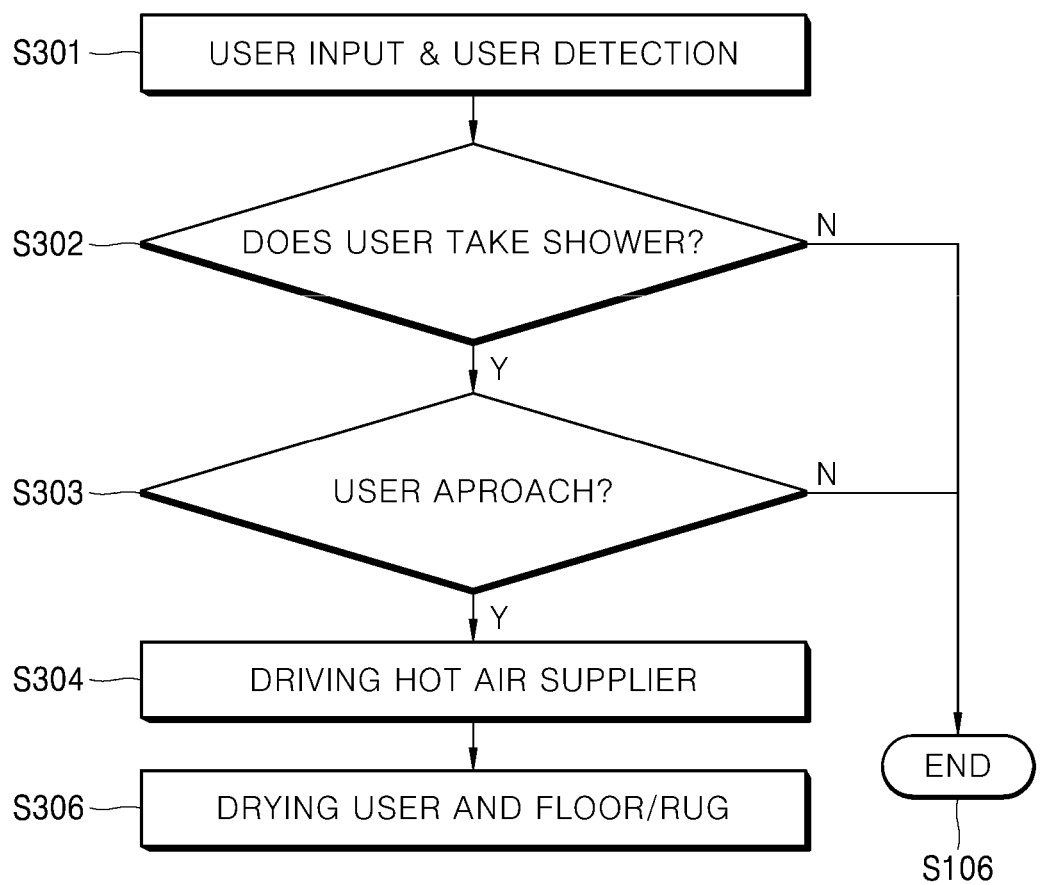
FIGS. 31 to 34 respectively show controlling a bathroom by driving a convenience device disposed in a bathroom in a control system according to the present disclosure.

FIG. 31 shows a method for automatically drying a user's wet body or a bathroom floor/rug by controlling a bathroom facility device when a user takes a shower.

As shown in FIG. 31, if the user directly inputs the use of the bathroom or it is determined that the user uses the bathroom (S301), driving of a valve disposed in a shower water supply pipe that supplies water to a shower is detected and it is detected that the user is taking a shower (S302).

Subsequently, when the user who has finished the shower is detected by the human body sensing sensor 1140, it is determined that the user who has finished the shower approaches a sink cabinet device 1000 (S303), and a hot air supplier 1500 is driven to supply the hot air to the user, and the wet body of the user and the wet bathroom floor/rug are dried (S304 and S305).

If the user does not take a shower, there is no need to dry the user, and thus, the hot air supplier 1500 is not driven. If the user who has finished the shower does not approach toward the sink cabinet device 1000 or does not approach within a certain period of time, the hot air supplier 1500 is not driven based on determination that the user has no intention to dry the wet body by the hot air supplier.

Figure 32:
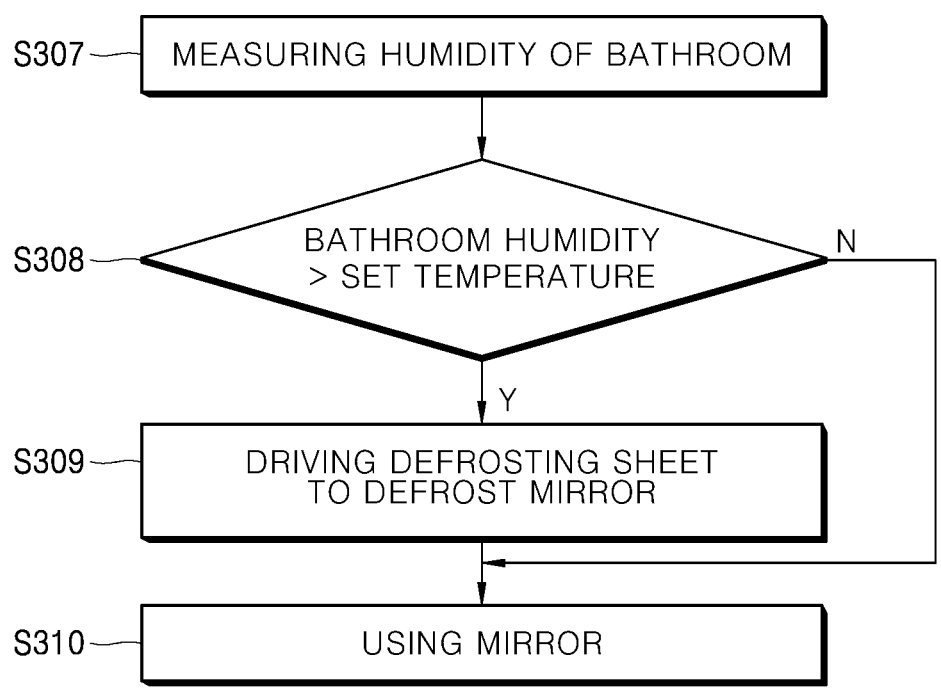

FIG. 32 shows a method for removing fogging and water drops generated on an exterior mirror and an interior mirror of a mirror cabinet device 2000 in a bathroom control system according to the present disclosure.

As shown in FIG. 32, a humidity sensor 1120 disposed in a sink cabinet device 1000 measures humidity of a bathroom (S307).

Subsequently, the measured humidity is compared with set humidity (S308). In this case, the set humidity may not refer to set optimal humidity inside the bathroom, but refer to humidity to the extent that the fogging and water drops are generated on the exterior mirror and the interior mirror.

If the measured humidity is greater than the set humidity, it is expected that the fog or the water drops may be generated on the exterior mirror and the interior mirror of the mirror cabinet device 2000, a defrosting sheet disposed in the exterior mirror and the interior mirror is driven to defrost the exterior mirror and the interior mirror (S309) and the defrosted exterior mirror and interior mirror are used (S310).

Figure 33:
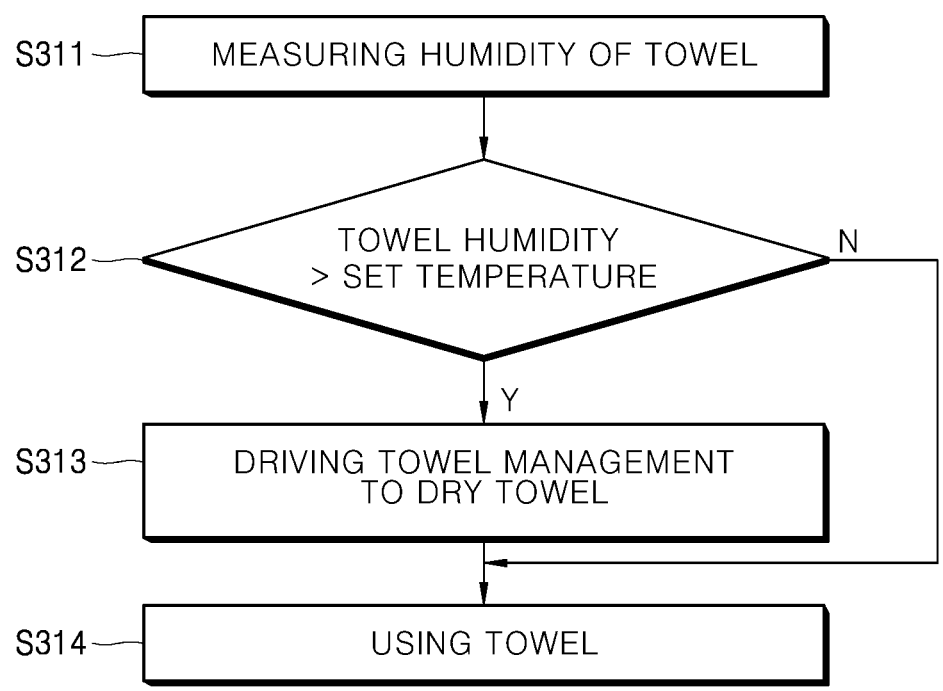

FIG. 33 shows controlling driving of a towel management in a bathroom control system according to the present disclosure.

As shown in FIG. 33, a towel humidity sensor 1340 disposed in a towel management 1300 measures humidity of a towel accommodated in a towel management 1300.

The measured humidity is compared with set humidity (S312). In this case, the set humidity of the towel refers to humidity enough to allow the user to comfortably use the towel.

When the measured humidity of the towel is higher than the set humidity of the towel, it is determined that the towel is not suitable for use by the user, and the towel management 1500 is driven to dry the accommodated towels and the dried towels are dried (S313 and S314). In this case, the driving of the towel management 1500 is performed by receiving hot air by a heater and a blower disposed under the sink cabinet device 1000.

Figure 34:
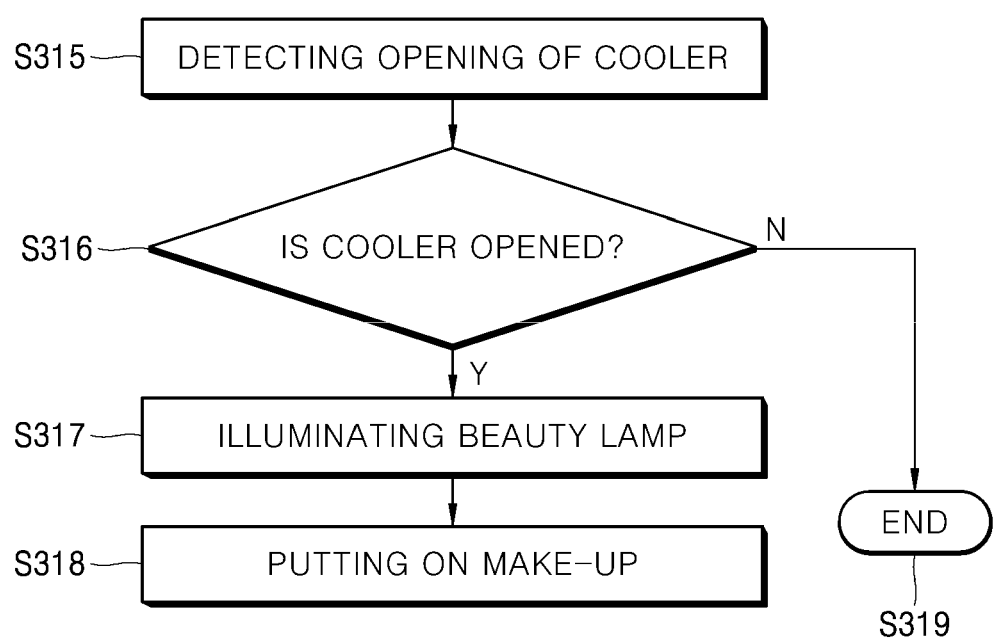

FIG. 34 shows illuminating a beauty lamp in a bathroom control system according to the present disclosure.

As shown in FIG. 34, it is detected whether a cooler 2400 is opened by an opening/closing sensor 2440 disposed in the cooler 2400 (S315).

As opening the cooler 2400 refers that the user uses cosmetics accommodated in the cooler 2400, it is determined that the user is putting on the make-up and a beauty lamp 2330 for make-up is illuminated (S317) and the user puts on the make-up under the illuminated beauty lamp 2330 (S318).

If the cooler 2400 is not opened, it is determined that the user has no intention to put on the make-up and does not turn on the beauty lamp 2330 (S319).

The control methods shown in FIGS. 31 to 34 are performed individually to control the bathroom facilities, but may be controlled continuously or simultaneously. For example, after drying the user who has finished the shower shown in FIG. 31 (S306), measuring the humidity of the bathroom for defrosting shown in FIG. 32 (S307) may be performed. In addition, steps of drying the wet body of the user (S301 to S306) and steps for defrosting (S307 to S310) may be performed simultaneously.

Figure 35:
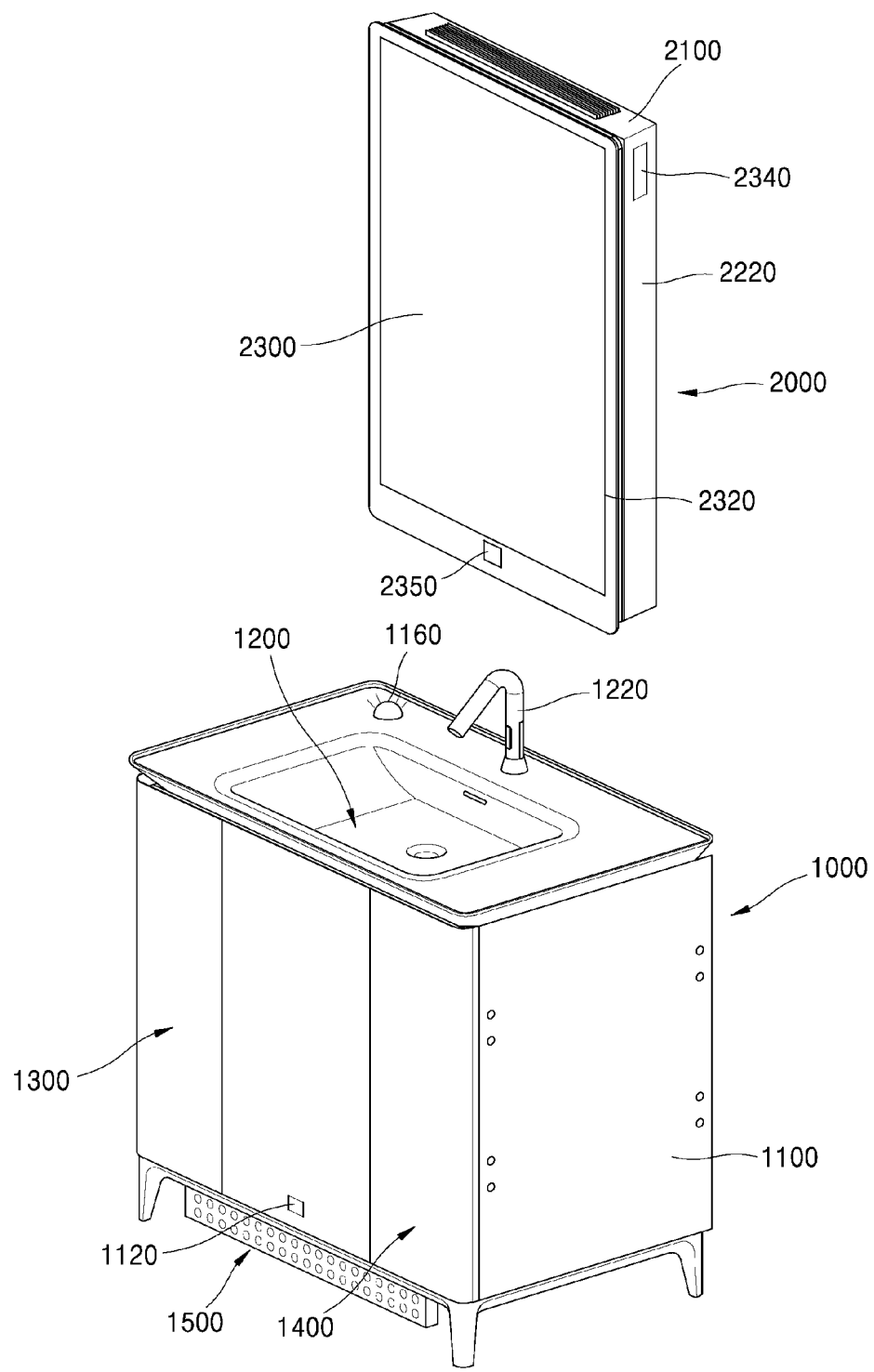
FIG. 35 is a perspective view showing a bathroom facility device including a sink cabinet device and a mirror cabinet device according to the present disclosure.

FIG. 35 is a perspective view showing a bathroom facility device including a sink cabinet device and a mirror cabinet device according to the present disclosure.

As shown in FIG. 35, the bathroom facility device according to the present disclosure includes a mirror cabinet device 2000 attached to the wall of a bathroom, and a sink cabinet device 1000 disposed on the bathroom floor and including a bath sink 1200.

The mirror cabinet device 2000 includes a mirror cabinet body 2100 that defines an accommodation space and a door 2300 disposed on a front surface of the mirror cabinet body 2100 to open and close the mirror cabinet body 2100. A cooler that cools the contents to a low temperature and a charging box are disposed in the mirror cabinet body 2100 described below.

In addition, a mood lamp panel 2200 may be disposed at a side of the mirror cabinet body 2100 to illuminate the inside of the bathroom, in particular, the front portion of the mirror cabinet device 2000 with a special brightness and color. In addition, speakers 2340 are disposed at both sides of the mirror cabinet body 2100. The speaker 2340 allows the user using the bathroom to listen to music and the like in the bathroom. The speaker 2340 also outputs a voice and the like when a phone event is executed in the bathroom.

Although the speaker 2340 is disposed at both sides of the mirror cabinet body 2100 in the figure, the arrangement place of the speaker 2340 is not limited thereto, but may be disposed on an upper surface or a lower surface of the mirror cabinet body 2100 or may be disposed in a sink cabinet device 1000. The speaker 2340 may also be disposed on the wall of the bathroom.

A first human body sensing sensor 2350 is disposed at a lower end of the mirror cabinet body 2100. The first human body sensing sensor 2350 is configured as a position sensing device (PSD) or an infrared sensor to detect that the user is approaching toward the mirror cabinet device 2000 to thereby detect whether the user is currently in a bathroom. In the figure, the first human body sensing sensor 2350 is disposed in a specific area of the mirror cabinet body 2100, but the arrangement position thereof in the mirror cabinet body 2100 is not limited to this area, but the first human body sensing sensor 2350 may be disposed in various areas of the mirror cabinet body 2100.

A display 2320 is disposed on a front surface of the door 2300 of the mirror cabinet device 2000 to display information when the door 2300 is closed. In this case, the display 2320 is configured as a flat panel display device such as a liquid crystal display device or an organic light emitting display device and displays video such as movies or TV dramas, various pieces of information such as the bathroom environment, notification of the phone event when the phone event is received at the cell phone, and details of the phone event.

In this case, the display 2320 functions as a mirror to totally reflect light in a driving mode. In addition, a mirror may be disposed in a predetermined area of the front surface of the door 2300 and a display may be separately disposed in the other area. The display 2320 may include a touch panel to input, by a user, information by directly touching a display screen.

The sink cabinet device 1000 includes a sink cabinet body 1100, a bath sink 1200 disposed on the sink cabinet body 1100 and including a faucet 1220, a towel management 1300 disposed in the sink cabinet body 1100 and to store and manage towels, and a console 1400 disposed in the sink cabinet body 1100 to accommodate small home appliances such as hair dryers and shavers.

The second human body sensing sensor 1120 is disposed on a front surface of the sink cabinet body 1100. The second human body sensing sensor 1120 is configured as a PSD or an infrared sensor to detect a user. In particular, the second human body sensing sensor 1120 may function to detect the user and to inform user's decision-making. For example, when inquiring the user of use of the phone event of the cellular phone, in the bathroom, if the user is performing a specific operation (e.g., using a bath sink or putting on a make-up), a touch panel of the display 2320 may not be operated to not immediately notify the decision making on the use. In this case, the user may intentionally turn on/off (i.e., sense and not sense) the second human body sensing sensor 1120 to make a decision on the response of the phone event.

In addition, an LED 1160 is disposed on at least one side of the bath sink 1200 of the sink cabinet body 1100. The LED 1160 notifies the user using the bath sink 1200 of specific information, for example, a phone event.

Although not shown in the figure, the sink cabinet body 1100 may include a temperature sensor that measures the temperature inside the bathroom, a humidity sensor that measures the humidity inside the bathroom, and an odor sensor that measures a degree of odor inside the bathroom.

The temperature sensor, the humidity sensor, and the odor sensor detect an environment in a bathroom and inform the user of it through a display 2320.

The mirror cabinet device 2000 and the sink cabinet device 1000 are connected to one another through an internal communication network such as Bluetooth.

Figure 36:
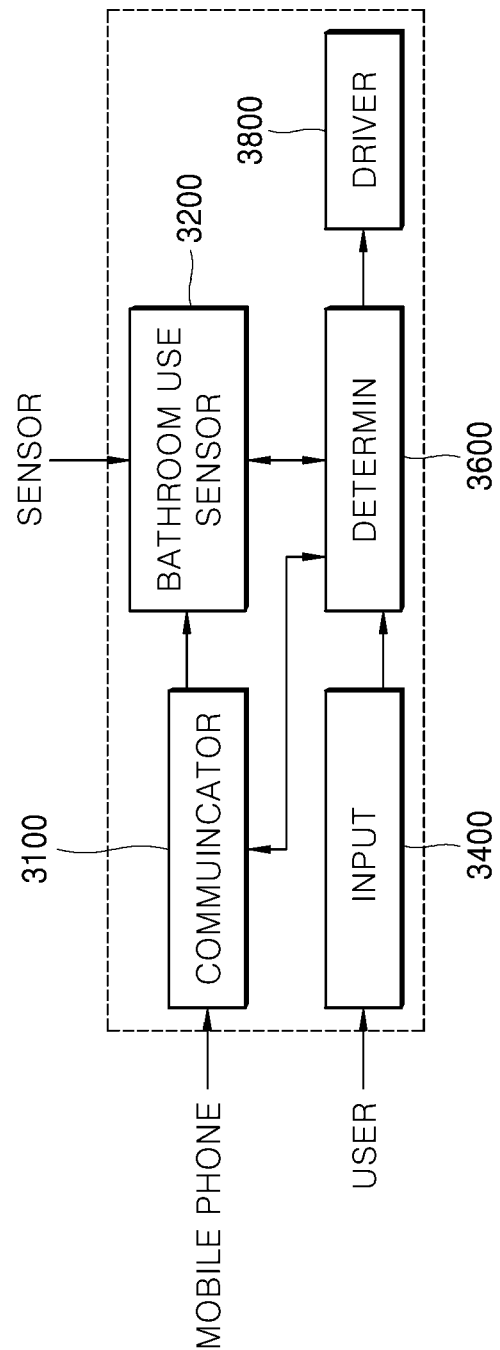
FIG. 36 shows a controller of a bathroom control system according to the present disclosure.

FIG. 36 shows a controller of a bathroom control system according to the present disclosure.

As shown in FIG. 36, according to the present disclosure, the controller of the bathroom control system includes a communicator 3100, a bathroom use sensor 3200 that detects whether a user is in the bathroom or the bathroom is in use, an input 3400 that inputs whether the user responds to or rejects a phone event in the bathroom when the phone event occurs, a determining portion 3600 that determines whether to receive a phone event from a mobile phone by transmitting a result input through the bathroom use sensor 3200 to the mobile phone and determines whether to display the phone event in the bathroom based on user's decision input through the input 3400, and a driver 3800 that drives various types of facilities in the bathroom based on the determination of the determining portion 3600 to notify the user of the phone event and allows the bathroom environment to be an optimal state for executing the phone event.

The communicator 3100 may communicate with a mobile phone to transmit and receive various pieces of data according to transmission and reception of voice signals, image signals, voice and image call signals, and text/multimedia messages.

The communicator 3100 may include a wireless Internet module and an NFC module. Various types of wireless Internet modules such as wireless LAN (WLAN), wireless-fidelity (Wi-Fi), wireless broadband (Wibro), and the like may be used. Bluetooth, radio frequency identification (RFID), infrared data association (IrDA), and the Wi-Fi may be used as examples of the NFC module.

The bathroom use sensor 3200 detects driving states of various types of sensors disposed in the bathroom, bathroom facility devices and equipment to detect whether the user is in a bathroom or the user is using a bathroom.

As the first human body sensing sensor 2350 and the second human body sensing sensor 1120 are disposed in the bathroom, the user is detected by the first human body sensing sensor 2350 and the second human body sensing sensor 1120 when the user is in the bathroom. In addition, as a valve is disposed in each of the bath sink faucet 1212 in the bathroom, a bathtub faucet, and a supply pipe of a shower, the bathroom use sensor 3200 may detect the driving of the valves to detect that the user is using the bathroom.

In addition, the mirror cabinet device 2000 and the sink cabinet device 1000 disposed in the bathroom includes the beauty lamp 2330, the cooler 2400, and the hot air supplier 1500 and the illumination of the beauty lamp 2330, the opening of the cooler 2400, and the operation of the hot air supplier 1500 refer to using the device by the user in the bathroom. The bathroom use sensor 3200 detects that the user is using the bathroom based on detection of the illumination of the beauty lamp 2330, the opening of the cooler 2400, and the driving of the hot air supplier 1500.

The determining portion 3600 determines whether the user uses the bathroom based on the detection result detected by the bathroom use sensor 3200. If it is determined that the user does not use the bathroom, the phone event received from the mobile phone through the communicator 3100 is not transmitted to the bathroom. If it is determined that the user uses the bathroom, the phone event received from the mobile phone through the communicator 3100 is transmitted to the bathroom and displayed.

In addition, the determining portion 3600 determines whether the user uses the phone event displayed in the bathroom.

The input 3400 inputs a user's decision about whether to respond to a phone event. For example, when the user is located in the bathroom and the phone event is transmitted to the bathroom, the user determines whether to respond to or reject the phone event and inputs the decision result to the input 3400.

The input 3400 may be a display 2320 disposed on a front surface of the door 2300 of the mirror cabinet device 2000 in the bathroom or may be a second human body sensing sensor 1120 disposed in the sink cabinet device 1000. The input 3400 may also be a microphone disposed in the bathroom.

The driver 3800 drives various pieces of equipment in the bathroom when the phone event is received to notify the user in the bathroom that the phone event has been received from the mobile phone and allows the interior of the bathroom to be an optimal environment for executing the phone event.

In this case, the driver 3800 adjusts an amount of water discharged from the faucet of the bath sink, an amount of water discharged from a bathtub faucet, an amount of water discharged from a shower, brightness of the lamp disposed on the bath sink, brightness of the mood lamp panel 2200 of the mirror cabinet device 2000, brightness of the beauty lamp 2330 and notifies the user of the reception of the phone event. The driver 3800 may also reduce the amount of water discharged from the sink faucet, the amount of water discharged from the bathtub faucet, the amount of water discharged from the shower, reduce in strength or stop driving of the hot air supply 1500, reduce in strength or stop driving of the bathroom ventilation system, and reduce a volume or stop driving of a speaker to quiet the inside of the bathroom to thereby execute the phone event in the optimal environment.

As described above, in the present disclosure, the user may use the phone event in the bathroom by transmitting the phone event of the mobile phone to the bathroom. In particular, in the present disclosure, the phone event is notified and the bathroom environment is automatically adjusted to be the optimal conditions for executing the phone event to execute, by users, the phone event conveniently and comfortably.

A method for using a phone event in a bath control system according to the present disclosure is described below in detail with reference to the accompanying drawings.

Figure 37:
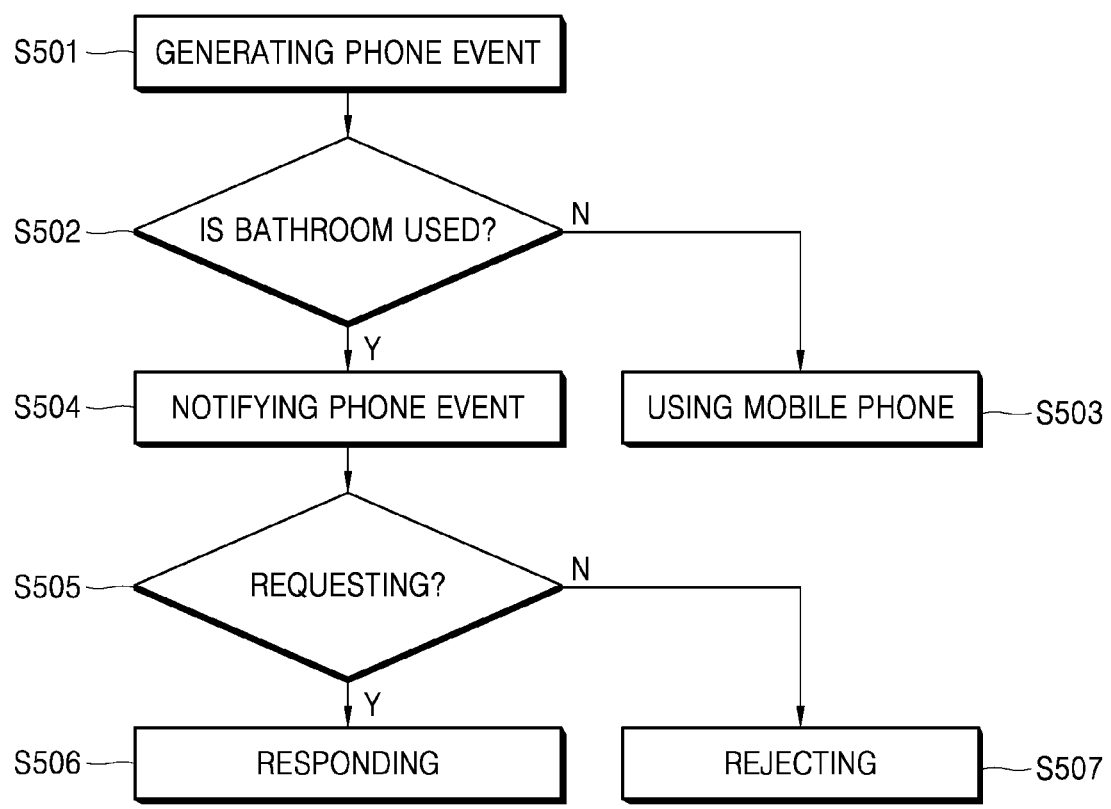
FIGS. 37 to 39 respectively show a method for using a phone event in a bathroom control system according to the present disclosure.
Figure 38:
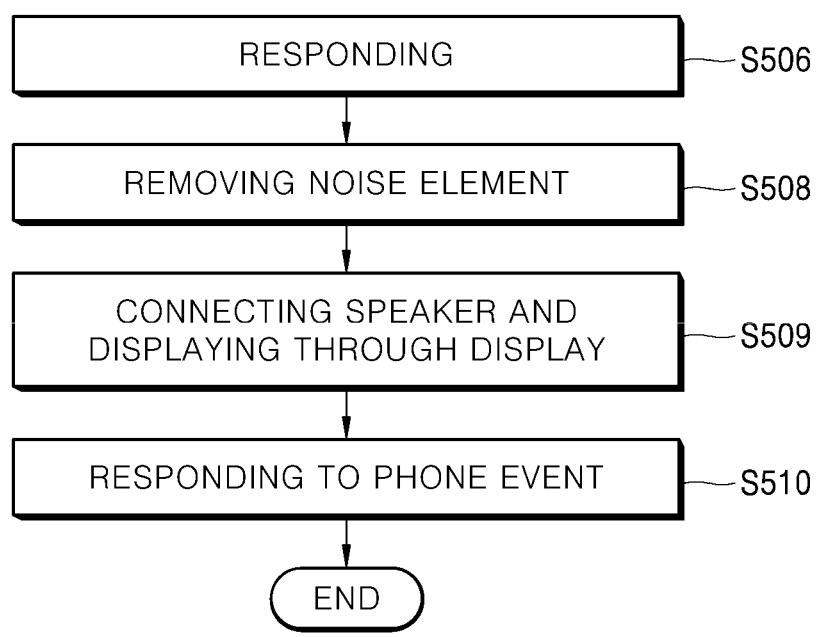
Figure 39:
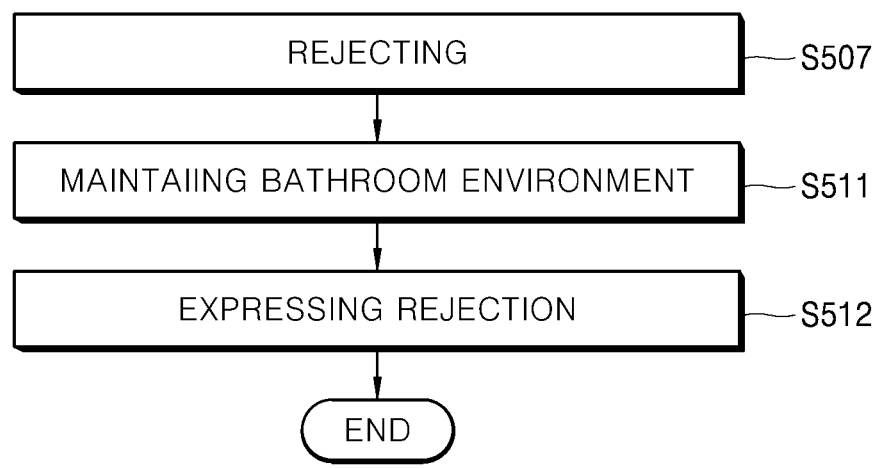

FIGS. 37 to 39 respectively show a method for using a phone event in a bathroom control system according to the present disclosure. FIG. 37 shows a method for notifying a user in a bathroom of a generated phone event. FIG. 38 shows a case in which a user responds to a phone event and uses a phone event. FIG. 39 shows a user rejecting a phone event.

As shown in FIG. 37, when the mobile phone registered with the transmission of a phone event to a bathroom, receives a phone event, for example, a voice call, a video call, a message, and a social networking service (SNS), the mobile phone transmits, to the determining portion 3600, the phone event generated in the mobile phone through the communicator 3100 of the bathroom control system 3000 (S501).

When the phone event is received, the determining portion 3600 determines whether the user is in the bathroom based on the detection result of the bathroom use sensor 3200 (S5.)

In this case, the bathroom use sensor 3200 detects the driving of each of the first human body sensing sensor 2350, the second human body sensing sensor 1120, the sink faucet 1220, the bathtub faucet, and the valve of the supply pipe of the shower, the illumination of the beauty lamp 2330, the opening of the cooler 2400, and the driving of the hot air supplier 1500 according to the position of the user to detect that the user is in the bathroom.

Table 1 shows detection means with respect to each position of the user in the bathroom. 'O' refers that the user may be detected by the corresponding sensing means and 'X' means that the user may not be detected by the corresponding sensing means.

When the user uses the mirror cabinet device 2000, for example, when the user puts on make-up or dries a wet body, the user is located in front of the sink cabinet device 1000 and the mirror cabinet device 2000, and thus, the first human body sensing sensor 2350 and the second human body sensing sensor 1120 may detect that the user is in the bathroom. In addition, when the beauty lamp 2330 is illuminated, the user senses that the user is putting on makeup by opening the cooler 2400 in the bathroom. When the hot air supplier 1500 is driven, the user senses that the user is drying the wet body in the bathroom.

When the user is not located in the bathroom, the phone event is executed by the mobile phone without displaying the phone event in the bathroom (S503).

When the user is located in the bathroom, the determining portion 3600 notifies, through the driver 3800, the user that the phone event has been received (S504).

TABLE 1

| Position of user | Sensing by human body sensing sensor | Water discharged from shower | Illumination of beauty lamp | Water discharged from bath sink faucet | Water discharged from bathtub faucet | Driving of hot air supplier |
|---|---|---|---|---|---|---|
| Bath sink | O | X | X | O | X | X |
| Bathtub | X | X | X | X | O | X |
| Shower booth | X | O | X | X | X | X |
| Mirror cabinet device | O | X | O | X | X | O |

As shown in Table 1, the user uses the water discharged from the faucet 1220 of the bath sink 1200 when using the bath sink. Therefore, the water discharged from the faucet 1220 may be detected (e.g., the driving of the valve that supplies the water to the faucet may be detected) to detect that the user is in front of the bath sink, that is, in the bathroom. In addition, the bath sink 1200 is disposed at an upper portion of the sink cabinet device 1000. Therefore, the user using the bath sink 1200 is located in front of the sink cabinet device 1000 and the mirror cabinet device 2000 and the first human body sensing sensor 2350 and the second human body sensing sensor 1120 detects that the user is in the bathroom. When the user uses the bathtub, the user uses the water discharged from the bathtub faucet and the water discharged from the faucet may be detected (e.g., the driving of the valve of the supply pipe that supplies the water to the bathtub faucet may be detected) to detect that the user is in the bathtub, that is, in the bathroom. When the user uses a shower booth (or a shower separate from the bathtub), the water discharged from the shower is used and the water discharged from the shower may be detected (e.g., the valve of the supply pipe that supplies the water to the shower may be detected) to detect that the user is in the shower booth, that is, in the bathroom.

Noise occurs due to water discharged from the sink faucet, the water discharged from the bathtub faucet, the water discharged from the shower in the bathroom where the user is using, and thus, the reception of the phone event may not be clearly transmitted to the user by sound emitted through the speaker. In addition, when the user washes his/her face, takes a shower and bath, the user may not determine the display of the phone event through the display 2320. Therefore, the driver 3800 drives various kinds of equipment in the bathroom to notify the user of the reception of the phone event in various ways.

Table 2 shows notification means of a phone event for each position of the user in the bathroom. O refers that the user may be notified of the reception of the phone event through the notification means and X refers that the user may not be notified of the reception of the phone event through the notification means.

TABLE 2

| Position of User | LED of bath sink | Adjust brightness of mood lamp | Notification through speaker | Notification through display | Adjustment of amount of water discharged from faucet | Adjustment of amount of water discharged from bathtub faucet | Adjustment of amount of water discharged from shower |
|---|---|---|---|---|---|---|---|
| Bath sink | O | X | O | X | O | X | X |
| Bathtub | X | O | O | X | X | O | X |
| Shower booth | X | X | O | X | X | X | O |
| Mirror cabinet device | X | O | O | O | X | X | X |

As shown in Table 2, when the user uses the bath sink, the reception of the phone event in the bathroom is notified by turning on the LED 1160 disposed at one side of the sink 1200. In addition, the speaker 2340 disposed in the bathroom informs that the phone event is received in the bathroom. In this case, the notification sound of the phone event by the speaker 2340 may be a warning sound or a synthesized sound, and when the music is being played, the reception of the phone event may be notified by lowering or removing the volume of the music to easily determine it by the user. In addition, as the user uses water discharged from the faucet 1220 in the bath sink, the amount of water discharged from the faucet 1220 is adjusted (e.g., reduced or increased) to easily determine it by the user to thereby notify the reception of the phone event. When the user uses the bathtub, the speaker 2340 disposed in the bathroom may notify that the phone event is displayed in the bathroom and the reception of the phone event may be notified by adjusting the amount of water discharged through the bathtub faucet to easily determine it by the user. Further, the reception of the phone event in the bathroom may be notified by changing the brightness of the mood lamp panel 2200 (e.g., increasing or decreasing the brightness or flickering the lamp) to easily determine it by the user.

When the user uses the shower booth, the speaker 2340 disposed indoor may notify the reception of the phone event and the reception of the phone event may be notified by adjusting the amount of water discharged from the to easily determine it by the user.

When the user uses the mirror cabinet device 2000, the speaker 2340 disposed indoor may notify that the phone event is displayed in the bathroom and the reception of the phone event in the bathroom may be notified by changing the brightness of the mood lamp panel 2200 to easily recognize it by the user. In addition, as the user is located in front of the mirror cabinet device 2000, the user may be notified that the phone event is received in the bathroom through the display 2320 disposed in the mirror cabinet device 2000.

As described above, according to the present disclosure, the display of the phone event is notified in various ways according to the position of the user in the bathroom, and the display of the phone event is notified by the plurality of notification means, to accurately determine the phone event by the user.

When the reception of the phone event is notified, the user is requested for decision on whether to use the phone event (S505).

The user may respond to and reject the request for decision (S506 and S507). The response corresponds to a decision to use a phone event and rejection corresponds to a decision to not use a phone event. In this case, the input to the response may be performed in various manners. For example, the reception of the phone event is notified and the decision making field on the response is displayed on the display 2320, and the user directly inputs the decision to the display 2320 by touch to input the response and the rejection. The user may also directly input the response and the rejection through a microphone.

When the user may not answer by touching the display 2320 or voice, the decision may be made in response to the request by the sensor disposed in the bathroom. For example, when a user requests for a phone event, the user intentionally allows his/her body to be detected by the second human body sensing sensor 1120 disposed in the sink cabinet device 1000 to input a response intention to the phone event. In this case, the user may not allow his/her body to be detected by the second human body sensing sensor 1120 for a certain period of time to input the rejection intention for the phone event.

As described above, in the present disclosure, the response and rejection to the phone event may be expressed even when the intention may not be expressed by the touch or the voice because the user is using the bath sink 1200 or putting on the make-up. Of course, the intention expression of the user on the phone event may not be performed only a specific sensor, but may be performed by various types of sensors in various manners.

As shown in FIG. 38, when a response to use the phone event is input (S506), the driver 3800 drives the equipment in the bathroom to allow an optimal environment for the user to use the phone event (S508).

Phone events include voice calls, video calls, message transmission, SNS, and the like. For example, in the case of the voice call or the video call, a quiet state may be maintained to talk with the other party. However, when the user uses the bathroom, a variety of noises occur, for example, noise due to water discharged from the faucet and the shower, noise due to driving of the hot air supplier, the noise of the ventilation system of the bathroom, which may result in difficulty in performing, by the user, the phone event such as the voice call or the video call.

The driver 3800 drives the bathroom devices and the bathroom facility devices to remove the noise, thereby allowing the bathroom environment to be in an optimal state for executing the phone event. For example, when the user expresses the intention to execute the phone event in response to the phone event, the driver 3800 decreases the amount of water discharged from the faucet 1220 of the bath sink 1200, the amount of water discharged from the bathtub faucet and the amount of water discharged from the shower or stops the driving thereof to minimize the noise due to the discharged water. In addition, the driver 3800 may minimize the noise by reducing an intensity of the driving of the blower of the hot air supplier 1500 and stopping the driving thereof and may minimize the noise by reducing the intensity of the ventilation system of the bathroom or stopping the driving thereof. The noise may also be minimized by reducing or removing the volume of music being played through the speaker.

Subsequently, the phone event is displayed on the display 2320 disposed on the front surface of the door 2300 of the mirror cabinet device 2000 and the speaker and the microphone are connected to allow the user to respond to the phone event (S509 and S510).

As shown in FIG. 39, when the user expresses the intention to reject the phone event (S507), the driver 3800 may not drive devices or facilities in a bathroom for executing a phone event, to maintain the environment in the bathroom without change (S511) and the rejection intention is transmitted to the mobile phone and the phone event is not transmitted to the bathroom (S512).

As described above, according to the present disclosure, when the phone event occurs in the mobile phone, the phone event is transmitted to the display and the speaker in the bathroom to execute the phone event in the bathroom by the user. According to the present disclosure, when the user executes the phone event in the bathroom, the bathroom environment may be automatically controlled to be the optimal environment to execute the phone event, thereby maximizing user satisfaction with respect to the phone event.

Although the present disclosure has been described with reference to embodiments shown in figures, it should be understood that these embodiments are given by way of illustration only, and that various modifications and other equivalent embodiments can be made by a person having an ordinary skill in the art to which the present disclosure pertains. Therefore, the true technical protection scope of the present disclosure should be defined only by claims below.

What is claimed is:

1. A bathroom facility device, comprising:
a mirror cabinet device comprising a cabinet body defining an accommodation space, a mirror door configured to open and close the accommodation space of the cabinet body, a cooler disposed inside the cabinet body and to cool a storage space, and a charging box disposed in the accommodation space of the cabinet device and comprising a power outlet, wherein the charging box is configured to accommodate a power plug connected to the power outlet; and
a sink cabinet device comprising a bath sink and a drawer type towel management comprising a heat transfer plate coupled to a towel management body to provide a flow path through which heating air is supplied, and to heat a towel supported on the heat transfer plate.

2. The bathroom facility device of claim 1, wherein the mirror door comprises an exterior mirror on an outer surface, and comprises an interior mirror and a beauty lamp on an inner surface.

3. The bathroom facility device of claim 2, wherein the beauty lamp is configured to control a color temperature of the beauty lamp.

4. The bathroom facility device of claim 1, wherein the cooler and the charging box are disposed adjacent to each other, and a body of the cooler and a body of the charging box are integrated with each other.

5. The bathroom facility device of claim 4, wherein the cooler comprises a Peltier element with a cooler and a heating portion,
wherein cold air of the Peltier element is configured to be circulated to a contents accommodation space inside the cooler, and
wherein hot air of the heating portion is configured to be discharged to an outside of the mirror cabinet device.

6. The bathroom facility device of claim 1, further comprising an electronic locking device for adjusting unlocking of the mirror door,
wherein the electronic locking device is configured to adjust the unlocking based on voice instruction or user recognition.

7. The bathroom facility device of claim 1, wherein the drawer type towel management is configured to be retracted into and pulled out from the sink cabinet body and heats or dries stored towels, and
wherein the sink cabinet device further comprises a drawer type console configured to be retracted into and pulled out from the sink cabinet body and that defines an accommodation space.

8. The bathroom facility device of claim 7, wherein the towel management body is configured to be retracted into and pulled out from the sink cabinet body.

9. The bathroom facility device of claim 7, wherein the sink cabinet device further comprises a dryer including a heater and a blowing fan to supply air to the drawer type towel management.

10. The bathroom facility device of claim 7, wherein the drawer type console comprises a console body configured to be retracted into and pulled out from the sink cabinet body and that defines the accommodation space, and a power outlet disposed in the console body.

11. The bathroom facility device of claim 10, wherein the power outlet is disposed at a side surface of the console body,
wherein the drawer type console comprises an outlet cover that opens and closes the power outlet, and
wherein when the power plug is plugged into the power outlet, the drawer type console is configured to not be retracted into the sink cabinet body.

12. The bathroom facility device of claim 11, wherein the mirror cabinet device and the sink cabinet device are connected to each other through wired or wireless communication, and
wherein the bathroom facility device further comprises an integrated operation switch for operating the sink cabinet device and the mirror cabinet device.

* * * * *